(12) United States Patent
Moriwaki

(10) Patent No.: US 7,605,698 B2
(45) Date of Patent: *Oct. 20, 2009

(54) SENSOR NETWORK SYSTEM AND DATA RETRIEVAL METHOD FOR SENSING DATA

(75) Inventor: Norihiko Moriwaki, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/176,727

(22) Filed: Jul. 21, 2008

(65) Prior Publication Data

US 2008/0288636 A1    Nov. 20, 2008

Related U.S. Application Data

(63) Continuation of application No. 11/727,038, filed on Mar. 23, 2007, now Pat. No. 7,403,114, which is a continuation of application No. 11/211,697, filed on Aug. 26, 2005, now Pat. No. 7,298,259.

(30) Foreign Application Priority Data

Mar. 3, 2005    (JP)    ............... 2005-058769

(51) Int. Cl.
*G08B 1/08*    (2006.01)

(52) U.S. Cl. .............. 340/539.22; 340/539.13; 340/572.1; 340/573.1; 340/5.1; 340/825.49; 709/223

(58) Field of Classification Search ............ 340/539.22, 340/593.13, 572.1, 5.1, 825.49; 705/9; 709/223
See application file for complete search history.

(56) References Cited

U.S. PATENT DOCUMENTS

| | | | |
|---|---|---|---|
| 6,509,829 B1 * | 1/2003 | Tuttle | 340/10.1 |
| 6,982,639 B2 * | 1/2006 | Brackett et al. | 340/539.13 |
| 6,985,750 B1 * | 1/2006 | Vicknair et al. | 455/519 |
| 7,061,376 B2 * | 6/2006 | Wang et al. | 340/539.13 |
| 7,103,460 B1 * | 9/2006 | Breed | 701/29 |
| 7,408,453 B2 * | 8/2008 | Breed | 340/442 |
| 7,463,986 B2 * | 12/2008 | Hayes | 702/62 |
| 2004/0093239 A1 | 5/2004 | Ott et al. | |
| 2004/0103139 A1 | 5/2004 | Hubbard et al. | |

FOREIGN PATENT DOCUMENTS

| | | |
|---|---|---|
| JP | 2002-6937 | 1/2002 |
| JP | 2003-319550 | 11/2003 |
| JP | 2004-280411 | 10/2004 |

* cited by examiner

*Primary Examiner*—Davetta W Goins
(74) *Attorney, Agent, or Firm*—Antonelli, Terry, Stout & Kraus, LLP.

(57) ABSTRACT

A sensor network system, including: a model list that stores preset model names; an event table that stores monitoring conditions of data transmitted from sensor nodes; an event generator that receives data corresponding to the model names from the sensor nodes, and notifies an occurrence of an event when receiving data satisfying the monitoring conditions from the sensor nodes; and an event-action controller including an action executer that executes processing previously specified when the occurrence of an event is indicated from the event generator.

19 Claims, 50 Drawing Sheets

EVENT TABLE (ETB)

| DATA ID (DID) | EVENT ENTRY (EVT) | ACTION |
|---|---|---|
| XXX | DATA VALUE > A1 | DATA HOLDER Yes |
| YYY | DATA HOLDER = p1 | DATA HOLDER No |
| | | |

SENSOR INFORMATION TABLE (STB)

| DATA ID | SENSOR TYPE | MEANING | MEASUREMENT | PLACE OF INSTALLATION | INTERVAL OBSERVATION | DATA LINK POINTER |
|---|---|---|---|---|---|---|
| 01 | IDENTIFICATION CARD | PLACE | NIL | 03 | 30s | DDS1/home/·· |
| 02 | AMBIENT TEMPERATURE | AMBIENT TEMPERATURE | AMBIENT TEMPERATURE | 03 | 60s | DDS2/home/·· |
| 03 | SIT | SIT | ON/OFF | 03 | EVENT | DDS1/home/·· |
|  |  |  |  |  |  |  |

*FIG.12*

ATTRIBUTE INTERPRETATION LIST (ATL)

1. TABLE OF NAME (ATL-m)

| RETURN VALUE | MEANING |
|---|---|
| 01 | MR. SUZUKI |
| 02 | MR. TANAKA |
| 03 | MR. YAMADA |

2. TABLE OF PLACE (ATL-p)

| RETURN VALUE | MEANING |
|---|---|
| 01 | OFFICE |
| 02 | MEETING ROOM A |
| 03 | ABSENT |

3. TABLE OF SEAT (ATL-s)

| RETURN VALUE | MEANING |
|---|---|
| 00 | PRESENT |
| 01 | ABSENT |

4. TABLE AMBIENT TEMPERATURE (ATL-t)

| RETURN VALUE | MEANING |
|---|---|
| x | y = f(x) |

5. TABLE OF NUMBER OF PERSONS (ATL-n)

| RETURN VALUE | MEANING |
|---|---|
| x | y = x |

*FIG.13*

| | DESCRIPTION | RETRIEVAL OF MEMBERS AT THE MEETING ROOM |
|---|---|---|
| STEP110 | DISPLAY THE REAL-WORLD MODEL (MDL) IN THE USER TERMINAL (UST) RETRIEVAL SCREEN AND SELECT THE DESIRED ITEM. | MEETING ROOM A — MEMBERS / NUMBER OF PERSONS / AMBIENT TEMPERATURE — UST |
| STEP111 | ACCESS THE DISTRIBUTED DATA PROCESSING SERVER (DDS) AND ACQUIRE THE ATTRIBUTE AND DATA | DSK4 / MEASURED DATA 4 |
| STEP112 | ACQUIRE THE MEANING OF THE RETURNED VALUE FROM THE ATTRIBUTE INTERPRETATION LIST (ATL). | ATTRIBUTE : NAME / DATA : 01, 02 / ATL-m TABLE OF NAME <br> RETURN VALUE \| MEANING <br> 01 \| MR. SUZUKI <br> 02 \| MR. TANAKA <br> 03 \| MR. YAMADA |
| STEP113 | DISPLAY THE MEANING INFORMATION ON THE USER TERMINAL SCREEN (UST) | UST / MR. SUZUKI AND MR. TANAKA AT THE MEETING ROOM A. |

FIG.24

SCREEN FOR ACTION SETTING REQUEST UST

NAME [▼] MR.

[▼] WHILE
IN THE SEATED STATE
IN THE MEETING
AT HOME

[▼] INFORMS BY
POP UP
E-MAIL

[ONCE] [EVERY TIME] [REGISTRATION]

FIG.29

SCREEN FOR ACTION SETTING REQUEST UST

NAME [SUZUKI ▼] MR.

[IN THE SEATED STATE ▼] WHILE

[POP UP ▼] INFORMS BY

[ONCE] [EVERY TIME] [REGISTRATION]

FIG.30

SCREEN FOR ACTION SETTING REQUEST UST

NAME [▼] MR. [▼] WHEN
[▼]
NAME [▼] MR. [▼] WHEN

[▼] INFORM
POP UP
E-MAIL

[ONCE] [EVERY TIME] [REGISTRATION]

FIG.35

SCREEN FOR ACTION SETTING REQUEST UST

NAME [SUZUKI ▼] MR. [HAS TAKEN A SEAT ▼] WHEN
[AND ▼]
NAME [TANAKA ▼] MR. [HAS TAKEN A SEAT ▼] WHEN

[E-MAIL ▼] INFORM
mailto_b@xyz.com

[ONCE] [EVERY TIME] [REGISTRATION]

FIG.36

SEQUENCE OF AN ACTION WITH PLURALITY OF EVENTS.

SCREEN FOR ACTION SETTING REQUEST                    UST

NAME [SUZUKI ▼] MR.
[AT THE MEETING ROOM A ▼] WHEN

[E-MAIL ▼] INFORM BY
[mailto_b@xyz.com]

[ONCE] [EVERY TIME] [REGISTRATION]

*FIG.43*

DDS EVENT ACTION TABLE                    EATB

| DATA ID | EVENT CONTENTS | ACTION | PARAMETER | DATA HOLDER |
|---------|----------------|--------|-----------|-------------|
| X1 | X1 = 02 | INFORM BY E-MAIL | E-MAIL ADDRESS mailto_b@xyz.com | No |
| | | | | |

AN EXAMPLE: WHEN THE POSITION OF MR. SUZUKI IS AT THE MEETING ROOM A (X1 DATA = 02)

SEND E-MAIL TO MR. B

*FIG.44*

SEQUENCE OF A SINGLE ACTION RESPONSE

EVENT-ACTION TABLE (EATB)

| DATA ID | EVENT CONDITION | ACTION | | | | | |
|---|---|---|---|---|---|---|---|
| | | DATA PROCESSING | PARAMETER | FORWARDING PROCESSING | PARAMETER | NOTIFICATION PROCESSING | PARAMETER |
| X1 | DATA ARRIVAL | UNIT CONVERSION (°C→°F) | DATA ID: X2 | LOOP-BACK | — | — | |
| X2 | DATA VALUE > 60 | — | | — | | MAIL NOTIFICATION | MAIL ADDRESS:A |
| | | | | | | | |

EVENT-ACTION TABLE (EATB)

| DATA ID | EVENT CONDITION | ACTION | | |
|---|---|---|---|---|
| | | DATA PROCESSING <br> PARAMETER | FORWARDING PROCESSING <br> PARAMETER | NOTIFICATION PROCESSING <br> PARAMETER |
| Y1 | DATA ARRIVAL | DATA HOLDING | — | — |
| Y2 | DATA ARRIVAL | ADDED WITH Y1DATA <br> DATA ID:Y3 | LOOP-BACK | — |
| Y3 | DATA ARRIVAL | — | DATA FORWARDING <br> IPADDRESS:B | |

EVENT-ACTION TABLE (EATB)

| DATA ID | EVENT CONDITION | ACTION | | | |
|---|---|---|---|---|---|
| | | DATA PROCESSING | FORWARDING PROCESSING | NOTIFICATION PROCESSING | EXCEPTIONAL PROCESSING |
| | | PARAMETER | PARAMETER | PARAMETER | PARAMETER |
| Z1 | DATA ARRIVAL | — | — | — | SCRIPT PROCESSING |
| | | | | | FILE NAME : C |
| | | | | | |
| | | | | | |

FIG.56

EXAMPLE OF XML SCRIPT FILE

SCF

```
< when event = "Data ID = Z1" >
< not >
< between >
< Param > Temperature < / Param >
< Value > 10 < / Value >
< Value > 20 < / Value >
< /between >
< / not >
< progn >
< sendIp Msg url = "133.144.xx.xx" > IT IS TOO HOT. THE AIR CONDITIONER IS ON
< / sendIp Msg >
< ask url = "cooler.com" >
< set switch = "activate" / >
< / ask >
< / progn >
< / when >
```

FIG.57

SENSOR NETWORK SYSTEM AND DATA RETRIEVAL METHOD FOR SENSING DATA

CROSS REFERENCE TO RELATED APPLICATION

This application is a continuation of application Ser. No. 11/727,038, filed Mar. 23, 2007, now U.S. Pat. No. 7,403,114 which is a continuation of application Ser. No. 11/211,697, filed Aug. 26, 2005 (now U.S. Pat. No. 7,298,259). This application relates to and claims priority from Japanese Patent Application No. 2005-058769, filed on Mar. 3, 2005. The entirety of the contents and subject matter of all of the above is incorporated herein by reference.

BACKGROUND OF THE INVENTION

This invention relates to a technology of using information supplied by a large number of sensors connected with the network.

The Internet and other networks have been used in recent years mainly for accessing documents, images, movies, sounds or other stored contents through search engines or previously set links. In other words, the technology of accessing the stored contents has been nearly completed.

On the other hand, a technology of transmitting the current information is streaming technology made up of continuously transmitting images captured by a camera installed at a fixed position (web camera). Lately sensor network technology of acquiring through a network sensing data acquired from a large number of small wireless sensor nodes is developing (JP 2002-006937 A, JP 2003-319550 A, JP 2004-280411 A, U.S. Patent Application Publication 2004/0093239 Specification, and U.S. Patent Application Publication 2004/0103139 Specification). In recent years, the expectation is growing high for a sensor network system enabling to capture real-world information through sensors and using this information at a remote place through a network. While the present service on the Internet is closed to services on a virtual space, the essential difference of the sensor network from the present Internet is that it is fused with the real world. The possibility of realizing fusion with the real world enables to provide a variety of services dependent on time, location and other situation. The connection of a large variety of objects present in the real world with a network enables to realize traceability and to address to the social needs for securing "safety" in a wide sense and to the needs of "improving efficiency" in inventory control and office work.

SUMMARY OF THE INVENTION

However, although the search engine shown in the related art indicated above enables to find out the position (address) in the network concerned of the data stored in the past, there is a problem in that it is not suited to efficient retrieval of real-time information from a huge amount of sensor information connected with the network concerned and for the retrieval of changes in information.

Accordingly, this invention aims at realizing a sensor network system that can easily acquire real-time information from a lot of sensors connected to networks, to monitor desired information in real time from a huge amount of information from the sensors and quickly grasp changes in information.

This invention connects plural distributed servers that store data transmitted from sensor nodes and a management server that manages the sensor nodes in a network. When executing specified processing based on data from the sensor nodes, the management server sets a distributed server of the information storage destination in which the data of the sensor nodes is stored, sets a preset model name for which a management server is preset and an information storage destination of the data corresponding to the model name in a model table, sets a correspondence relation with semantic information corresponding to the value of the data in a semantic information managing table, decides the data to be monitored based on the model name according to a request from the user terminal, and decides a monitoring condition of the data to be monitored in an event table based on the semantic information. The management server notifies the distributed server at the information storage destination of the data to be monitored and the monitoring condition that have been decided. The distributed server receives data transmitted from the sensor node based on the notification, monitors the data to be monitored while comparing with the monitoring condition, and executes processing previously set when the monitoring condition is satisfied.

Therefore, by monitoring data in the distributed servers that collect data, this invention can prevent loads from concentrating on the management server that manages a lot of distributed servers, and can smoothly manage a sensor network system even when the number of sensor nodes becomes enormous.

A user who uses a user terminal can monitor desired data from among data pieces of a lot of sensor nodes simply by setting model names and semantic information. Therefore, the user can obtain only desired information extremely easily and real time out of a lot of sensor information.

BRIEF DESCRIPTION OF THE DRAWINGS

FIG. 12 is a detailed description of the sensor information table.

FIG. 13 is a detailed description of the attribute interpretation list.

FIG. 24 is a detailed description of the steps required when the members of the meeting room A are designated from the model binding list.

FIG. 29 is an illustration of the screen setting the actions displayed in the user terminal UST at the time of registering the action table.

FIG. 30 is also an illustration of the screen setting actions.

FIG. 35 is an illustration of the screen for setting actions displayed on the user terminal UST when a single action with plural events is to be registered.

FIG. 36 is also an illustration of the screen for setting actions displayed on the user terminal UST when a single action with plural events is to be registered.

FIG. 43 is a second embodiment, which illustrates the screen for setting actions displayed on the user terminal UST when actions are to be registered.

FIG. 44 is the second embodiment, which illustrates entries in the event-action table of the distributed data processing server DDS.

FIG. 56 shows a fifth embodiment and is an explanatory diagram illustrating an example of an event-action table.

FIG. 57 shows a fifth embodiment and is an explanatory diagram illustrating an example of a script file stored in an exceptional event-action table.

DESCRIPTION OF THE PREFERRED EMBODIMENTS

We will describe below an embodiment of this invention with reference to drawings.

Figure 1:
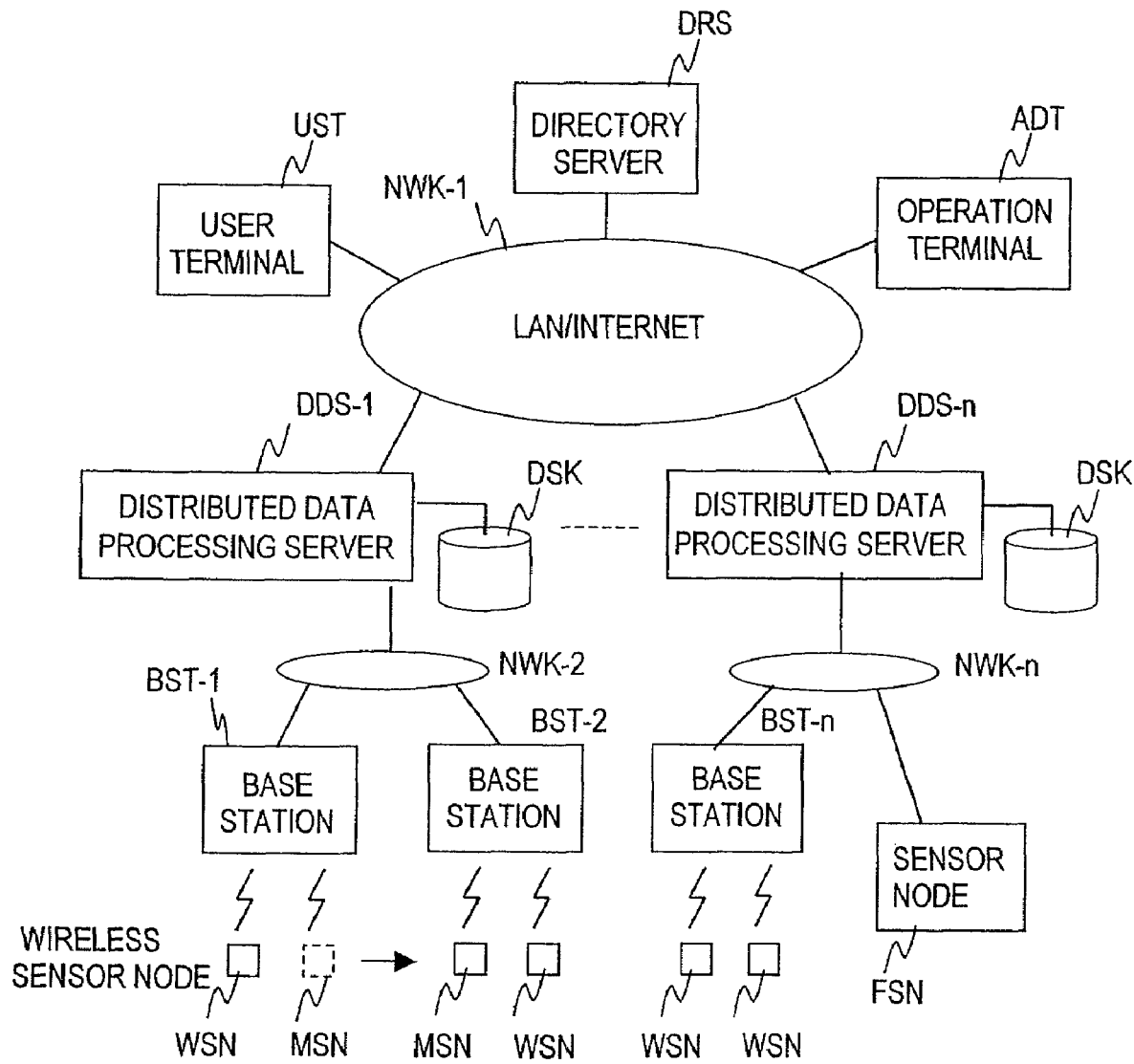
FIG. 1 is a block diagram showing the system of the sensor network representing the first embodiment of this invention.

FIG. 1 is an illustration of the basic configuration of the sensor network system showing the first embodiment of this invention.

<Outline of the System Configuration>

The wireless sensor nodes (WSN) and the wireless mobile sensor nodes (MSN) are nodes installed at predetermined positions, or fixed on a predetermined objects or persons, to gather information on the environment or information on the objects to which they are fixed, and to transmit the information to the base stations BST-1 to BST-n. The sensor nodes are made up of wireless sensor nodes WSN and MSN connected by wireless communication with the base stations BST-1 to BST-n and wired sensor nodes FSN connected by wired communication with the network NWK-n. Wireless sensor node WSN, MSN, and wired sensor node FSN are generically referred to simply as a sensor node.

The wireless sensor nodes WSN installed at fixed locations, for example with their sensor sensing the surrounding situation at regular intervals, transmit the sensing information to the base station BST previously set. The wireless mobile sensor nodes MSN are designed to be mobile being carried by a person or on a car and transmit information to the nearest base stations BST. Incidentally, when the term represents the whole (generic term) wireless sensor nodes, it will be represented by the acronym WSN or MSN, and when it represents specific wireless sensor nodes, it will be represented by the acronym plus extensions such as WSN-1 to WSN-n or MSN-1 to MSN-n. Other elements will also be represented likewise without any extension when the whole generic name is indicated, and when specific elements are indicated, they will be represented by the acronym plus extensions "−1 to n".

Each base station BST-1 to BST-n is connected with one or plural wireless sensor node or nodes WSN or MSN, and each base station BST-1 to BST-n is connected with a distributed data processing server DDS-1 to DDS-n for collecting data transmitted by each sensor node through the network NWK-2 to NWK-n incidentally, the network NWK-2 to NWK-n is designed to connect the base stations BST and the distributed data processing servers (distributed servers) DDS. The distributed data processing server DDS may vary the number of connections depending on the required scale of the system scale.

Each distributed data processing server DDS-1 to DDS-n having a disk drive DSK for storing the data received from the wireless and wired sensor nodes (simply referred to hereinafter as "sensor node"), a CPU (not shown) and a memory executes a specified program, collects measured data transmitted by the sensor nodes as described below, and makes various steps such as data storage, data processing, and transmission of notices and data to a directory server (managements server) DRS or other servers through the network NWK-1 according to the conditions previously prescribed. Incidentally, the network NWK-1 is made up of a LAN, the Internet and the like.

The data collected from the sensor nodes contains the proper ID for identifying the sensor nodes and numerical data.

The numerical data may come with a time stamp to indicate when the data is sensed. However, the collected data as it is not in a form easily understandable for the user (user of the user terminal UST and the like). Therefore, the directory server DRS converts the output data of the sensor node into a real-world model that users can understand (person, object, state and the like) based on a definition previously set and present the result to the user.

The data relating to the sensor nodes belonging to the base station BST in the network NWK-2 to NWK-n to which the distributed data processing servers DDS-1 to DDS-n is connected themselves and the data transmitted by the wireless mobile sensor nodes MSN having moved from other base stations BST is collected and converted as described above. And the wired sensor nodes FSN may be connected with the distributed data processing servers DDS-1~n.

Obviously the wired sensor nodes FSN may be connected with the base stations BST, and the base stations BST may manage the wired sensor nodes FSN in the same way as the wireless sensor nodes.

The network NWK-1 is connected with a directory server DRS for managing the real-world models related with the sensing information transmitted from the distributed data processing servers DDS, user terminals UST using the information of this directory server DRS, and an operation terminal ADT for setting and operating the directory server DRS, the distributed data processing server DDS and the base stations BST, and the sensor nodes. Incidentally, separate operation terminals may be provided respectively for the sensor managers who manage the sensor nodes and the service managers who manage the service of the sensor network.

The directory server DRS provided with a CPU (not shown), a memory and a storage system executes the specified program and manages the objects related with meaningful information as described below.

In other words, when a user requests an access to the real-world model through the user terminal UST, the directory server DRS accesses the distributed data processing servers DDS-1 to DDS-n having measured data corresponding to the real-world model, acquires the corresponding measured data, converts the sensing data if necessary into a form understandable for the users and display the result on the user terminals UST.

Figure 2:
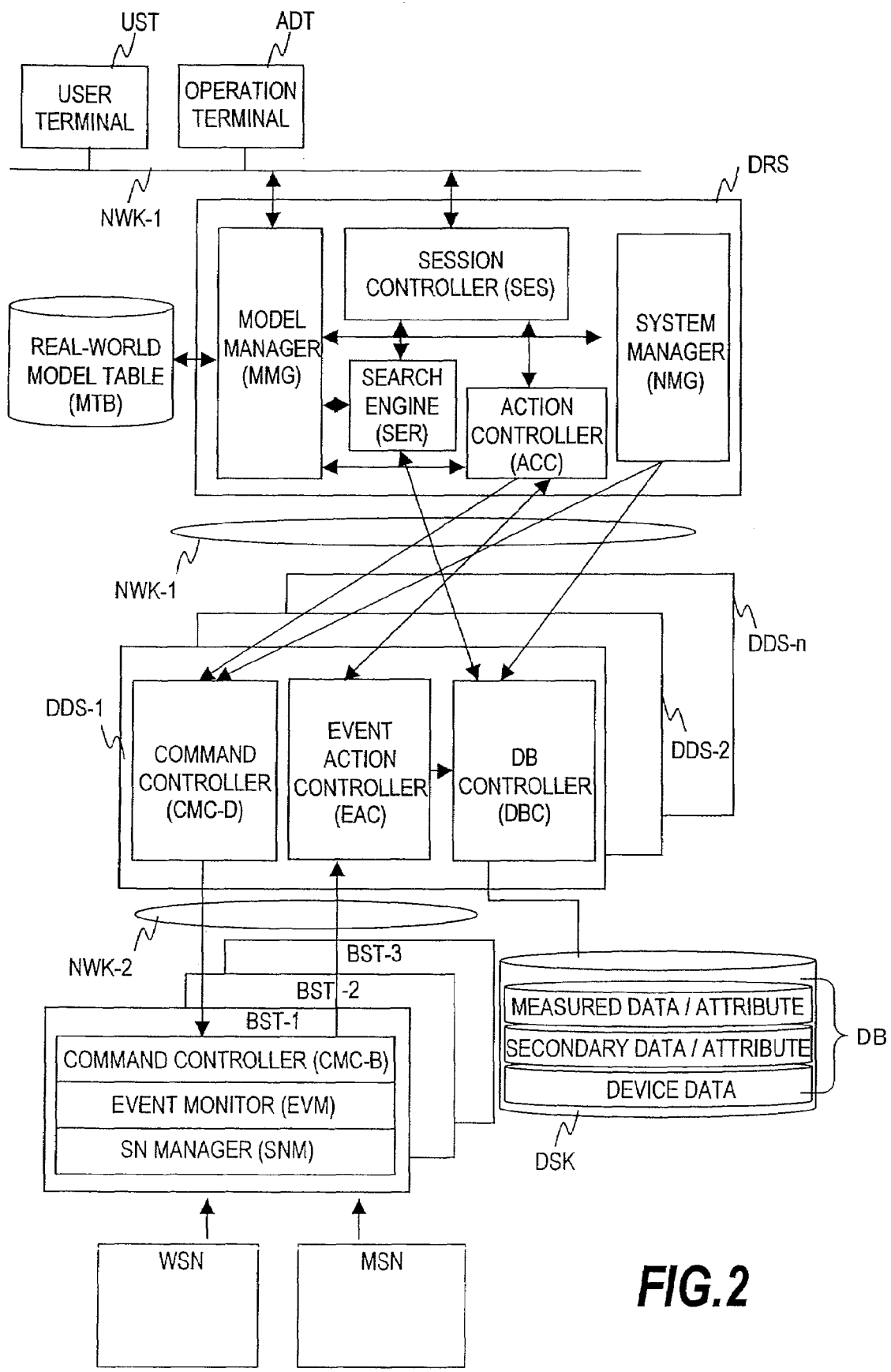
FIG. 2 is a functional block diagram of the sensor network.

FIG. 2 is a functional block diagram of the sensor network shown in FIG. 1. In order to simplify the description, we will show here the structure of the distributed data processing server DDS-1 only from among the distributed data processing servers DDS-1 to DDS-n shown in FIG. 1 and only the structure of the base station BST-1 from among the base stations BST-1 to BST-n connected with the distributed data processing servers DDS-1. Other distributed data processing servers DDS and other base stations BST are similarly structured.

We will now describe various units in details below.

<Base Station BST>

The base station BST-1 for collecting data from the wireless sensor nodes WSN, MSN and wired sensor nodes FSN (hereinafter referred to as "sensor nodes") includes a command controller CMC-B, a sensor node manager SNM, and an event monitor EVM. Incidentally, the sensor nodes transmit measured data by attaching the previously set data ID thereto.

The command controller CMC-B exchanges commands with the command controller CMC-D of the distributed data processing server DDS-1 as described below. For example, in response to a command issued by the distributed data processing server DDS-1, the command controller CMC-B sets the parameters of the base station BST-1 and transmits the state of the base station BST-1 to the distributed data processing server DDS-1. Or it sets the parameters of the sensor nodes managed by the base station BST-1 and transmits the state of the sensor nodes to the distributed data processing server DDS-1.

The sensor node manager SNM maintains the management information (operating condition, residual power and the like) of the sensor nodes under its management. And when an inquiry has been received from the distributed data processing server DDS-1 on sensor nodes, the sensor node manager SNM provides the management information instead of and for each sensor node. The sensor nodes can reduce their own processing load by assigning the processing load related to management to the base station BST and can limit any unnecessary power consumption.

When the event monitor EVM has detected any anomaly, the sensor node manager SNM updates the management information of sensor nodes and informs the distributed data processing server DDS-1 of any anomaly that occurred in any of the sensor nodes. An anomaly in sensor node includes the case of no response from the sensor nodes, the case where the power supply to the sensor nodes has fallen below the previously set value and other situations in which the sensor node function is interrupted or comes to a halt.

Upon receipt of a command (setting of output timing) from the command controller CMC-D to the sensor nodes, the sensor node manager SNM transmits this command to the sensor nodes to set the output timing, and upon receipt of a notice showing the completion of setting from the sensor nodes, the sensor node manager SNM updates the management information of sensor nodes. Incidentally, the output timing of sensor nodes indicates, for example, the interval between cyclical transmissions of data from the wireless sensor nodes WSN to the base station BST-1.

The base station BST manages the previously set wireless sensor nodes WSN, MSN and wired sensor nodes FSN under its control, and transmits the data measured by each sensor node to the distributed data processing server DDS.

<Distributed Data Processing Server DDS>

The distributed data processing server DDS-1 includes a disk drive DSK used for a database DB, a command controller CMC-D described below, an event action controller EAC, and a database controller DBC.

The command controller CMC-D communicates with the base station BST and the directory server DRS described below to transmit and receive commands and the like.

Upon receipt of measured data from the sensor nodes through the base station BST, the event action controller EAC acquires ID corresponding to the measured data or data ID, reads the rule of event corresponding to the data ID from the table described below (event table ETB in FIG. 10) and judges whether an event corresponding to the value of the measured data has occurred or not. And the event action controller EAC takes an action corresponding to the occurrence of an event corresponding to the data ID. When the sensor node has only one sensor, the sensor node ID for identifying the sensor node can be used for the data ID.

In this embodiment, an event refers to a condition set previously for measured data (or secondary data). The occurrence of an event means that measured data satisfies a predetermined condition.

And the actions taken include the transformation of measured data (raw data) into secondary data (processed data) based on the rule set in advance by the user and the like for each data ID, the storage of the measured data and secondary data into the database DB through the database controller DBC, or the notification of the same to the directory server DRS and the like.

According to the present embodiment, as FIG. 1 shows, the disposition of plural distributed data processing servers DDS concentrating regionally (or locally) some of them against plural base stations BST enables to process separately at different locations information supplied by a large number of sensor nodes. For example, in offices, a distributed data processing server DDS may be installed on each floor, and in factories a distributed data processing server DDS may be installed in each building.

The disk drive DSK of the distributed data processing server DDS-1 stores as databases DB the measured data of the sensor nodes WSN, MSN, and FSN that has been received from the base stations BST, secondary data that has been acquired by processing this measured data, and device data relating to the base stations BST.

And the database controller DBC of the data processing server DDS-1 stores the measured data outputted by the sensor nodes transmitted by the event action controller EAC in its database DB. And if necessary it stores the secondary data produced by value processing the measured data or fusing with other data in its database DB. Incidentally, it updates device data as required from time to time in response to the request of operation terminal ADT and the like.

<Directory Server DRS>

The directory server DRS for managing plural distributed data processing servers DDS includes a session controller SES for controlling communications from the user terminals UST or operation terminals ADT connected through the network NWK-1 as stated later on, a model manager MMG, a real-world model table MTB, a system manager NMG, an action controller ACC and a search engine SER.

The model manager MMG manages by using a real-world model list MDL having set the correlation between the real-world models (objects) understandable for the user and the measured data or secondary data collected by the distributed data processing servers DDS from the sensor nodes set in the real-world model table MTB. Specifically, the real-world model table MTB defines semantic information understandable to a user as an object, associates the ID and location (storage place) of measured data (or secondary data) from a sensor node with the object, and converts the measured data from the sensor node into semantic information understandable to the user from an attribute interpretation list ATL described later.

The directory server DRS also manages the position information of location (URL and other links) of measured data or secondary data corresponding to the real world model. In other words, the user can access directly the constantly changing measurement information of the sensor nodes by designating the real world model. While the measured data of the sensor nodes and secondary data increase as the time passes, the real-world model information remains unchanged in its dimension even after the passage of the time, and only its contents change. We will describe the details of this real-world model later on.

Incidentally, the real-world model table MTB is stored in the predetermined storage system (not shown in any figure) of the directory server DRS.

The action controller ACC of the directory server DRS communicates with the event action controller EAC and the command controller CMC-D of the distributed data processing servers DDS, and receives the event action setting requests outputted by the user terminals UST and the operation terminals ADT. Then it analyzes the details of the event or action it had received, and sets the distribution of functions between the directory server DRS and the distributed data processing servers DDS-1 to DDS-n corresponding to the analysis results. Incidentally, an action or an event may sometimes relate not only to a distributed data processing server DDS but also plural distributed data processing servers DDS-1 to DDS-n.

The search engine SER refers the real-world model table MTB based on the search requests for the objects received by the session controller SES, and searches the database DB of the distributed data processing servers DDS.

If the search request is a query, the search engine SER relates the database DB to the contents of the query, converts the query to the SQL (structured query language) and carries out the search. Incidentally, the database DB to be searched may sometimes cover plural distributed data processing servers DDS.

And this query relates to "the acquisition of the latest data (snapshot/stream)." Incidentally, "the acquisition of the latest data (stream)" relates to the action setting of the action controller ACC. In other words, it is enough to set an action in the event action controller EAC of the pertinent distributed data processing server DDS in such a way that the pertinent data may always be transferred to the user terminal.

Now, the system manager NMG globally manages the distributed data processing servers DDS connected with the network NWK-1 and constituting the sensor network, the base stations BST connected with the distributed data processing servers DDS and the sensor nodes connected with the base stations BST.

The system manager NMG provides an interface related with the registration and retrieval of the distributed data processing servers DDS, the base stations BST and the sensor nodes to the operation terminals ADT and the like, and manages the condition of each device and the condition of the sensor nodes.

The system manger NMG may issue commands to the distributed data processing servers DDS, the base stations BST and the sensor nodes and manages the resources of the sensor network by these commands. By the way, the sensor nodes receive commands from the system manager NMG through the command controller CMC-B of the base station BST and the base stations BST receive commands from the system manager NMG through the command controller CMC-D of the distributed data processing server DDS.

Incidentally, the commands issued by the system manager NMG through the command controller CMC-D include reset, set parameters, delete data, transmit data, set standard-type event-action, and the like.

<An Example of Sensor Node>

Figure 3:
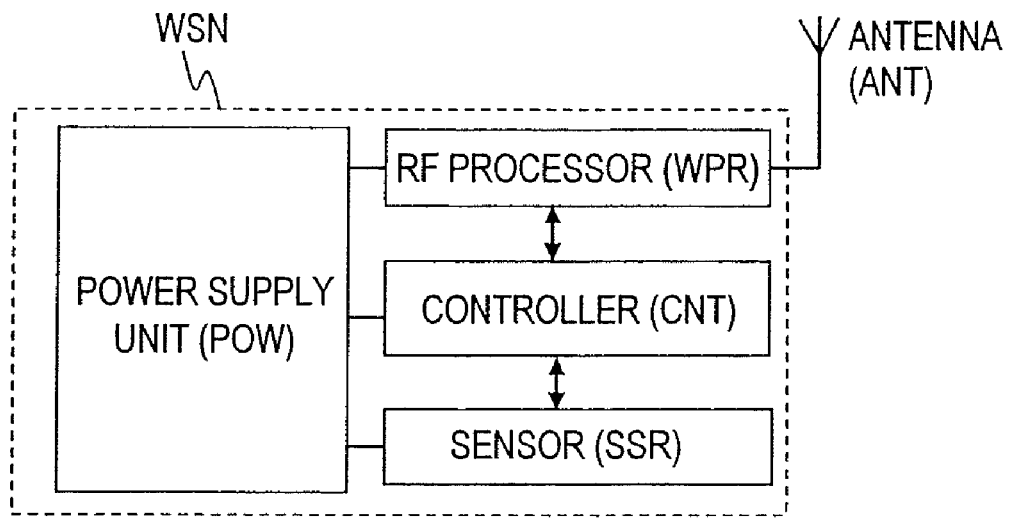
FIG. 3 is a block diagram showing an example of wireless sensor node WSN.
Figure 4:
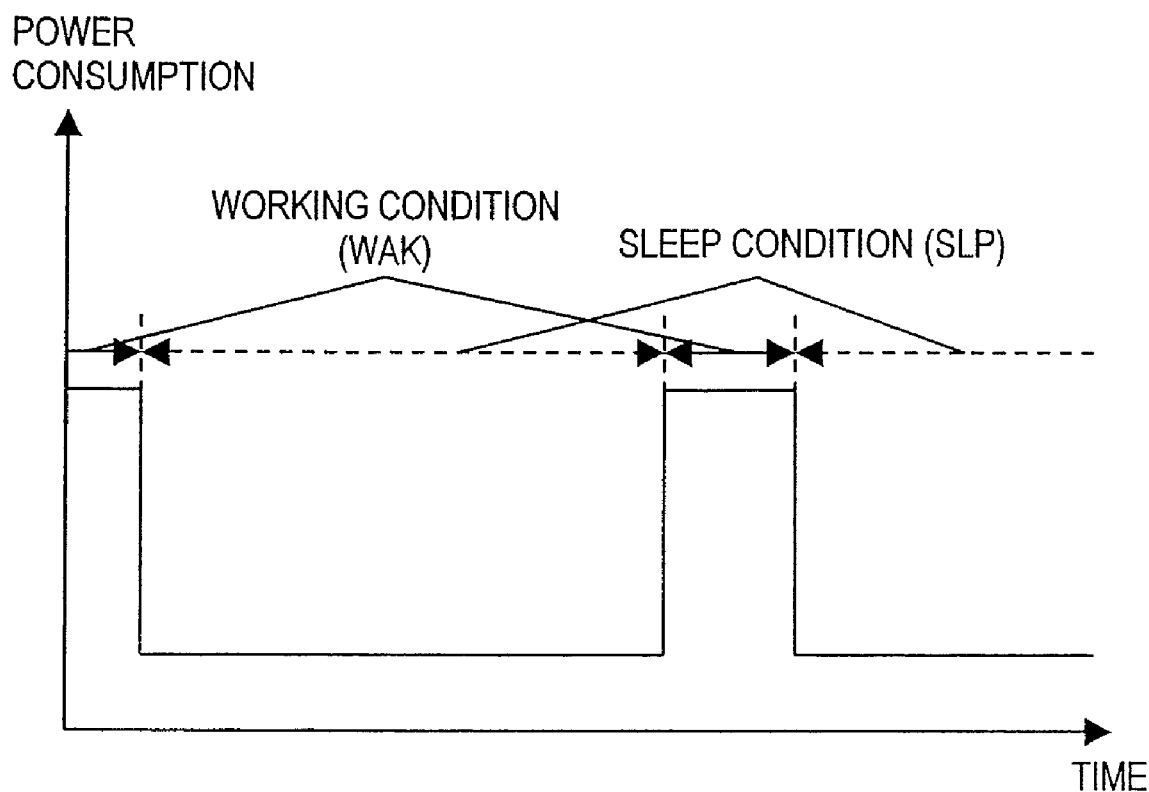
FIG. 4 is a graph showing the operating condition of the wireless sensor node and shows the relationship between time and power consumption.
Figure 5:
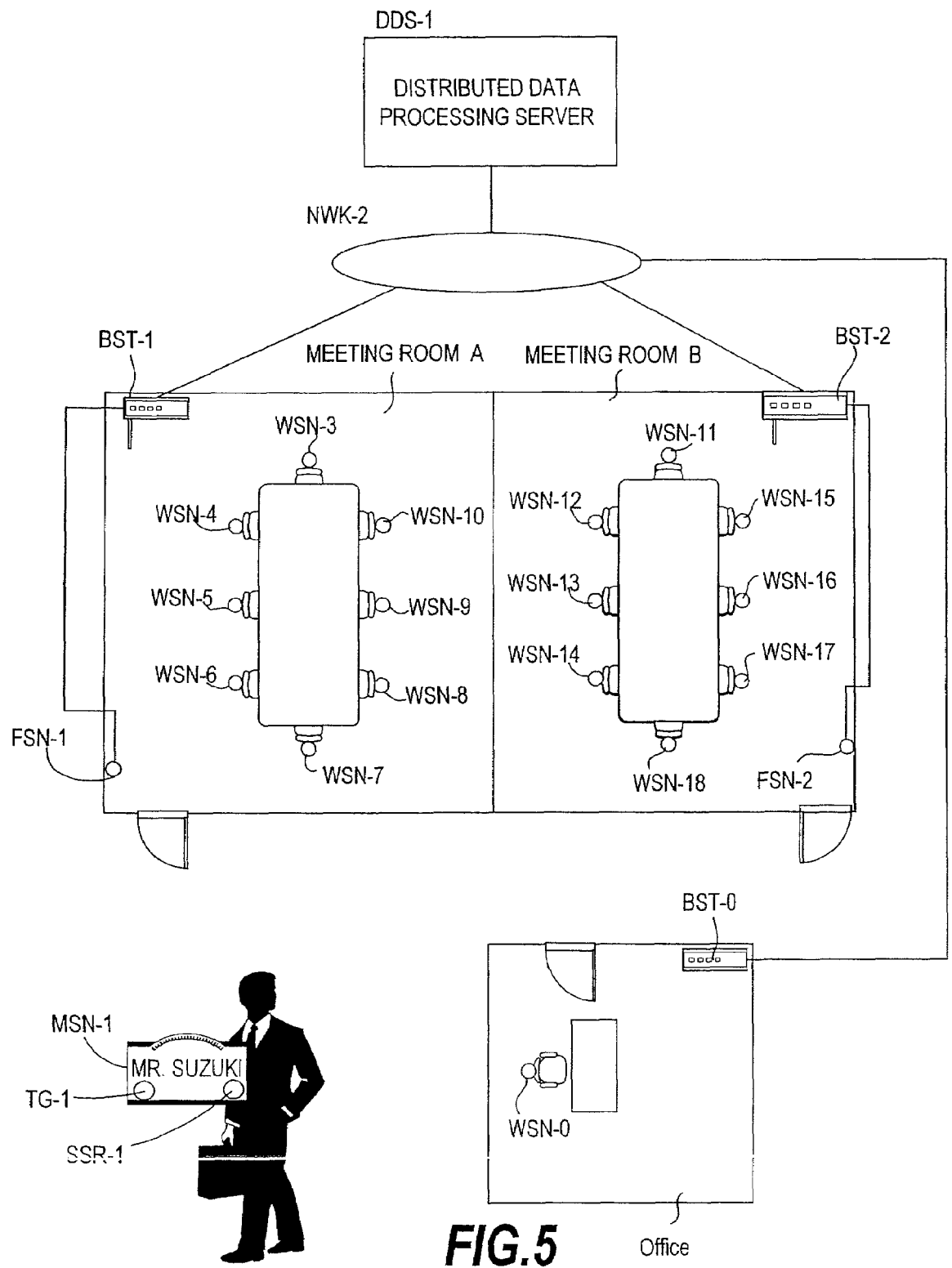
FIG. 5 is an illustration showing an example of the disposition of wireless sensor nodes.

An example of sensor node will be shown in FIGS. 3 to 5.

FIG. 3 is a block diagram showing an example of wireless sensor node WSN. A wireless sensor node WSN includes a sensor SSR for measuring quantity of state (temperature, pressure, position and the like) and changes in the quantity of state (low temperature/high temperature, low pressure/high pressure, and the like) of the object of measurement, a controller CNT for controlling the sensors SSR, an RF processor WPR for communicating with the base stations BST, a power supply unit POW for supplying power to each block SSR, CNT and WPR, and an antenna ANT for transmitting and receiving RF signals.

The controller CNT reads the measured data of the sensors SSR at a previously set cycle, adds a previously set data ID to this measured data and transmits the same to the RF processor WPR. The measured data may sometimes include time information on the sensing as a time stamp. The RF processor WPR transmits the data received from the controller CNT to the base stations BST.

The RF processor WPR transmits the commands and the like received from the base stations BST to the controller CNT, and the controller CNT analyzes the commands received and proceeds to the predetermined processing (e.g., change of setting and the like). The controller CNT transmits the information on the remaining power (or amount of electric charges made) of the power supply unit POW to the base stations BST through the RF processor WPR. In addition, the controller CNT itself monitors the remaining power (or the amount of electric charges) of the power supply unit POW, and when the remaining power has fallen below the previously set value, the controller CNT may warn the base stations BST that power supply is about to run out.

In order to conduct extended-time measurements with a limited supply of power, as shown in FIG. 4, the RF processor WPR is operated intermittently to reduce power consumption. During its sleep state SLP as shown in the figure, the controller CNT stops driving the sensors SSR and switches from a sleep state to an operating state at a predetermined timing to drive the sensors SSR and transmits the measured data.

FIG. 3 shows the case wherein a wireless sensor node WSN has only one sensor SSR. However, plural sensors SSR may be disposed thereon. Alternatively, a memory having a proper identifier ID may be used in the place of sensors SSR for a wireless sensor node WSN to be used as a RFID tag.

In FIGS. 3 and 4, a battery may be used for the power supply unit POW, or solar cell, vibrational energy generation or other similar energy generation units may be used. The wireless mobile sensor node MSN may be designed in the same way as shown in FIGS. 3 and 4.

FIG. 5 is a detailed illustration showing an example of sensor nodes connected with the distributed data processing server DDS-1 shown in FIGS. 1 and 2 above.

In the present embodiment, an example of installing sensor nodes in the office, the meeting room A and the meeting room B is shown.

In the office, a base station BST-0 is installed, and a wireless sensor node WSN-0 having a pressure switch as a sensor SSR is installed on the chair in the office. The wireless sensor node WSN-0 is set to communicate with the base station BST-0.

A base station BST-1 is installed in the meeting room A, and the wireless sensor nodes WSN-3 to WSN-10 respectively having a pressure switch as a sensor SSR are installed on the chairs of the meeting room A. Furthermore, the meeting room A is provided with a wired sensor node FSN-1 having a temperature sensor, and the wired sensor node FSN-1 is connected with the base station BST-1. Each of the wireless sensor nodes WSN-3 to WSN-10 and the wired sensor node FSN-1 are set in such a way that they can communicate with the base station BST-1.

Similarly a base station BST-2 is installed in the meeting room B, and the wireless sensor nodes WSN-11 to WSN-18 respectively having a pressure switch as a sensor SSR and the wired sensor node FSN-2 having a temperature sensor are installed on the chairs of the meeting room B. These sensor nodes are connected with the base station BST-2.

The employees using the meeting rooms A and B are required to wear a wireless mobile sensor node MSN-1 serving as their identification card. The wireless mobile sensor node MSN-1 is constituted as an identification card with a temperature sensor SSR-1 for measuring the temperature of the employee (or the ambient temperature) and a tag TG-1 storing the proper identifier of the employee (employee ID). The wireless mobile sensor node MSN-1 can transmit the employee ID and the measured temperature data to the base stations BST-0, 1 or 2.

<Outline of the Operation of the Sensor Network>

Figure 6:
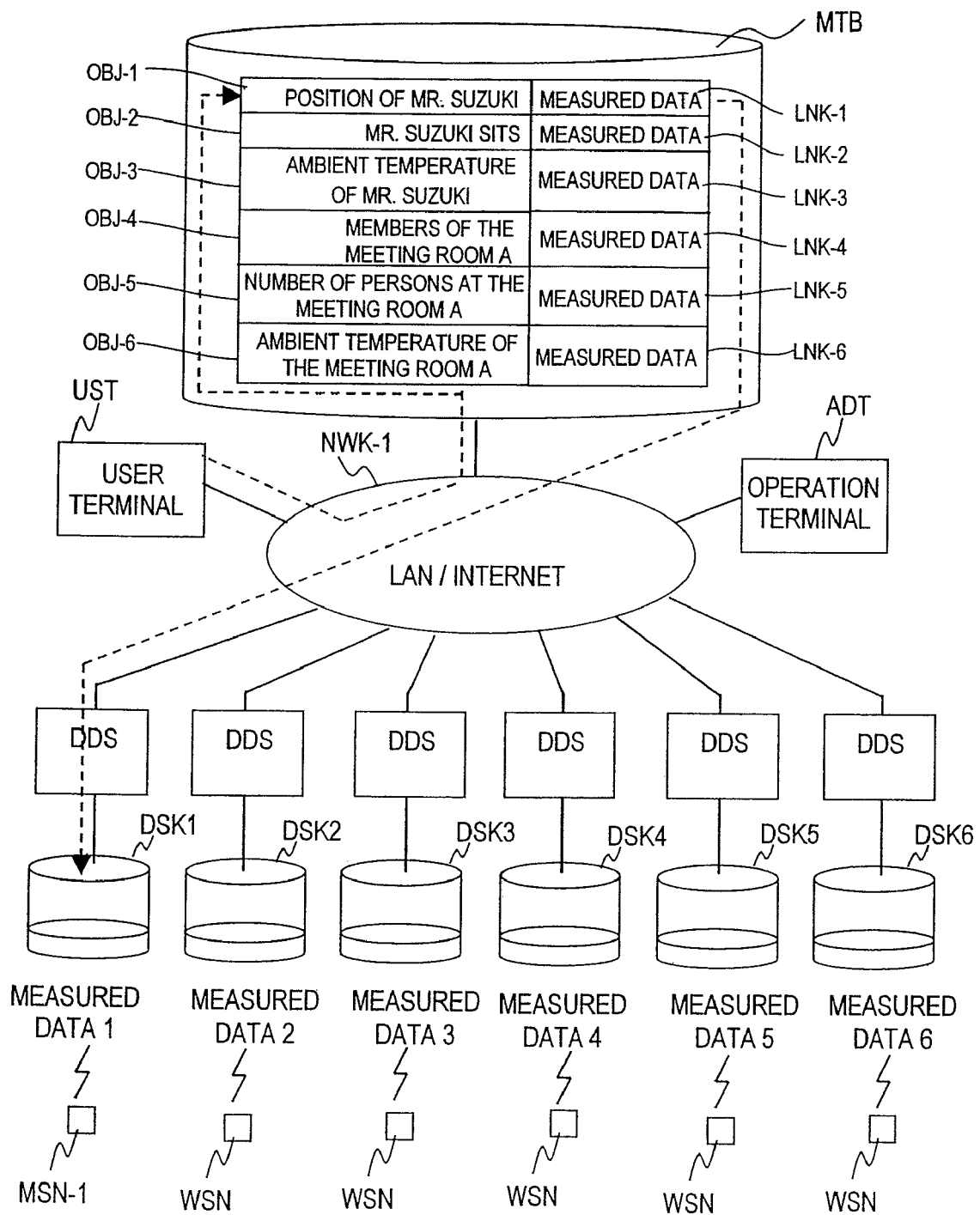
FIG. 6 is a block diagram showing the relationship between the objects and the measured data of sensor nodes, and shows the starting time of measurement.
Figure 7:
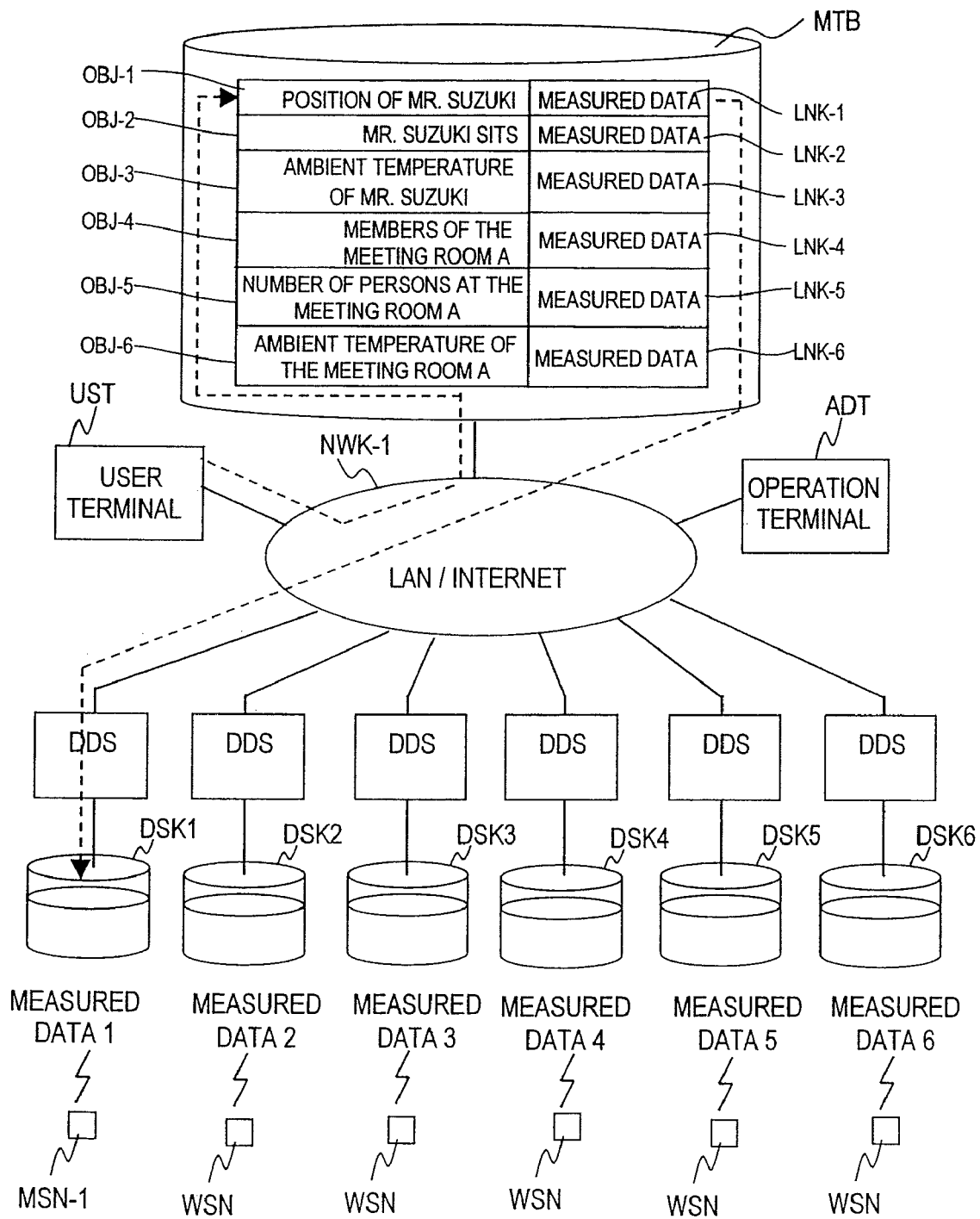
FIG. 7 is a block diagram showing the relationship between the objects and the measured data of sensor nodes, and shows the state when a predetermined time has passed from the start of the measurement.
Figure 8:
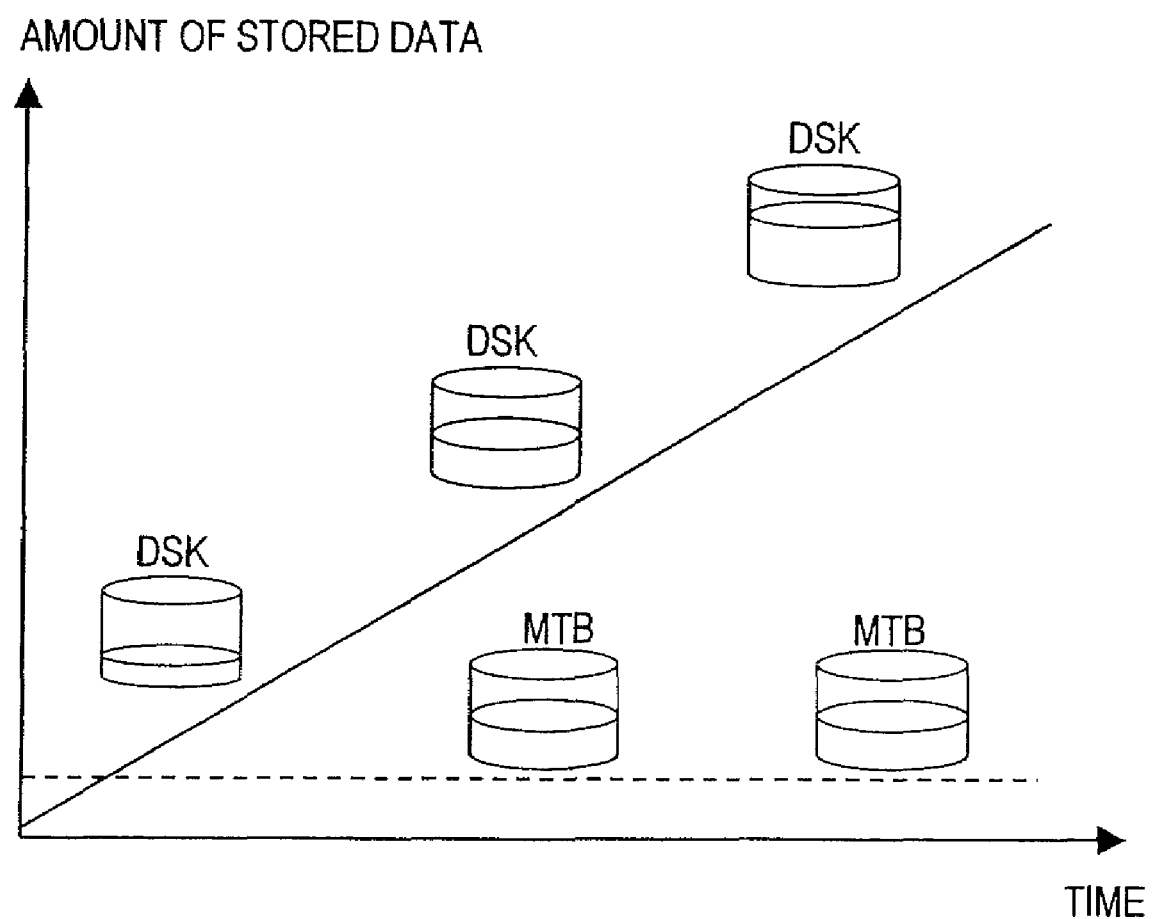
FIG. 8 is a graph showing the relationship between the data amount of the objects, the amount of measured data of the sensor nodes and time.

We will then describe the outline of the operation of the sensor network shown in FIGS. 1 to 5 with reference to FIGS. 6 to 8.

FIG. 6 is a block diagram showing the relationship between the objects representing the specific forms of the real-world model and the measured data of the sensor nodes and shows the beginning of measurement, and FIG. 7 shows the situation prevailing after the passage of a predetermined period of time from the situation shown in FIG. 6.

In FIG. 6, the directory server DRS has formed in advance the following objects as the real-world model, and defines the same in the real-world model list MDL of the real-world model table MTB. Here, we assume that Mr. Suzuki is an employee using the office or the meeting rooms A and B shown in FIG. 5, and that he is wearing a wireless mobile sensor node MSN-1 shown in FIG. 5 and FIG. 6.

As the sensor information table STB of FIG. 12 shows, the sensor information table is defined in such a way that the measured data (e.g. temperature) and position information of each sensor node MSN may be stored in the distributed data processing server DDS designated as the data link pointer. Here, the position information of the sensor node MSN may be acquired as the ID information of the base station BST that detects the sensor node MSN.

And the real-world model list MDL of the real-world model table MTB contains a definition that the object representing the position of Mr. Suzuki (OBJ-1) is an object actually located in the link pointer named measured data 1 (LINK-1), and thus manages the relationship of correspondence between the real-world model and the actual data position.

In other words, the object representing the position of Mr. Suzuki (OBJ-1) in the real-world model list MDL is related with the storage position of the distributed data processing server DDS corresponding to the measured data 1 (LINK-1). In FIGS. 6 and 7, the position information given by the wired mobile sensor node MSN-1 indicating the position of Mr. Suzuki (defined, e.g., as "connected with which base station BST") is stored in the disk drive DSK 1 of the distributed data processing server DDS.

When viewed from the user terminal UST, the value of Mr. Suzuki's position (OBJ-1) seems to be stored in the real-world model table MTB of the directory server DRS. However, the actual data is stored not in the directory server DRS, but in the disk drive DSK 1 previously set of the distributed data processing server DDS.

The object representing the taking seat of Mr. Suzuki (OBJ-2) will be defined in the real-world model table MTB in such a way that the seating information acquired by the pressure switch (WSN-0) installed on the chair in the office may be stored in the measured data 2 (LINK-2). In addition, the distributed data processing server DDS corresponding to the measured data 2 and the storage position will be defined. In FIGS. 6 and 7, the seating information acquired from the MSN-1 and the wireless sensor node WSN will be stored in the disk drive DSK 2 of the distributed data processing server DDS-1.

The object representing Mr. Suzuki's temperature (OBJ-3) will be defined in the real-world model table MTB in such a way that the temperature measured by the temperature sensor SSR-1 of the wireless mobile sensor node MSN-1 will be stored in the measured data 3 (LINK-3). In addition, the distributed data processing server DDS corresponding to the measured data 3 and the storage position will be defined. In FIGS. 6 and 7, the temperature data acquired from the MSN-1 will be stored in the disk drive DSK 3 of the distributed data processing server DDS.

The object representing the members of the meeting room A (OBJ-4) will be defined in the real-world model table MTB in such a way that the name of employee acquired from the information of the wireless mobile sensor node MSN connected with the base station BST-1 of the meeting room A may be stored in the measured data 4 (LINK-4). If no pressure switch (WSN-3 to WSN-10) is used, the number of persons in the meeting room A may be calculated from the number of the wireless mobile sensor nodes MSN detected by the base station BST-1 in the meeting room. Further, the distributed data processing servers DDS corresponding to the measured data 4 and the storage position will be defined. In FIGS. 6 and 7, the individual information acquired from the wired mobile sensor node MSN of each employee will be stored in the disk drive DSK 4 of the distributed data processing server DDS.

The object representing the members of the meeting room A (OBJ-5) will be defined in the real-world model table MTB in such a way that the number of persons acquired from the pressure switches (WSN-3 to WSN-10) in the meeting room A may be stored in the measured data 5 (LINK-5). And the distributed data processing server DDS corresponding to the measured data 5 and the storage position will be defined. In FIGS. 6 and 7, the seating information from the wired sensor nodes WSN-3 to WSN-10 will be stored in the disk drive DSK 5 of the distributed data processing server DDS.

The object representing the temperature of the meeting room A (OBJ-6) will be defined in the real-world model table MTB in such a way that the temperature measured by the wired sensor node FSN-1 in the meeting room A may be stored in the measured data 6 (LINK-6). And the distributed data processing server DDS corresponding to the measured data 6 and the storage position will be defined. In FIGS. 6 and 7, the temperature data from the FSN-1 will be stored in the disk drive DSK 6 of the distributed data processing server DDS-1.

In other words, each object OBJ defined in the real-world model table MTB stores the link pointer (LINK) corresponding to the measured data, and although the object data as seen from the user terminal UST may seem to exist in the directory server DRS, the actual data is stored in the distributed data processing server DDS.

In the link pointer of the information LINK, the storage position of the measured data measured by the sensor nodes, the secondary data obtained by converting the measured data into an understandable form for the user and the other data usable for the user are set. The measured data from the sensor nodes is collected by each distributed data processing server DDS, and if an event/action is set as described later on, the measured data will be processed and will be stored in the predetermined distributed data processing server DDS as secondary data.

The data from the sensor nodes will be actually collected and processed by the distributed data processing servers DDS, and the directory server DRS will manage the real-world model, the link pointer of information and the definition of the sensor nodes.

In this way, the users of the user terminals UST will not be required to learn the location of the sensor nodes, they will be able to obtain the desired data corresponding the measurement (or the secondary data) of the sensor node by retrieving the objects OBJ.

And as the directory server DRS will manage the link pointer of each object OBJ, and the actual data will be stored and processed in the distributed data processing servers DDS, even if the number of sensor nodes turns out to be huge, it will be possible to prevent the distributed data processing servers DDS from being overloaded. In other words, even when a large number of sensor nodes are employed, it will be possible to suppress the traffic load on the network NWK-1 connecting the directory server DRS, distributed data processing servers DDS and the user terminals UST.

In FIG. 7 showing the state after the lapse of a predetermined period of time after the state of FIG. 6, the actual measured data transmitted from the sensor nodes will be written into the disk drives DSK-1 to DSK-6 of the distributed data processing servers DDS-1, and the amount of data will increase as the time passes.

On the other hands, the amount of information stored in the link pointers LINK-1 to LINK-6 corresponding to the objects OBJ-1 to OBJ-6 set in the model list MDL of the real-world model table MTB of the directory server DRS remains unchanged even with the passage of time, and the contents of information indicated by the link pointers LINK-1 to LINK-6 change.

In short, the relationship between the amount of information of the objects OBJ-1 to OBJ-6 managed by the directory server DRS, the amount of data of the measured data 1 to 6 managed by the distributed data processing servers DDS-1 and time is that, while the amount of data of the objects is constant as shown in FIG. 8, the amount of measured data increases as the time passes.

For example, when a base station BST is connected with hundreds of sensor nodes, a distributed data processing server DDS is connected with several base stations BST, and a directory server DRS is connected with tens of distributed data processing servers DDS, the total number of sensor nodes will be several thousands or several tens of thousands. Supposing that each sensor node transmits data every minute, hundreds or thousands of measured data pieces will be sent every second to the distributed data processing server DDS, the presence of an event will be judged, and if an event has occurred, a predetermined action, such as a notice, data processing or other action, will be taken. If these actions are to be carried out by a centralized server, the load of the server itself or that of the network for connecting with the server will be very large. In addition, the collected data or the secondary data must be provided to the user terminals in response to users. Therefore, the load of the server or that of the network will further increase.

To avoid the load increase, the server function is divided on DRS and DDS. The directory server DRS receives access from the user terminals UST and manages the information link pointers of the sensor nodes. The distributed data processing servers DDS manage plural base stations BST, collect and process the data from the sensor nodes.

The information from the sensor nodes is distributed among and collected by plural distributed data processing servers DDS, and each distributed data processing server DDS respectively stores or processes the data. In this way, the collection and processing of data from a large number of sensor nodes is distributed and thus the concentration of load into specific servers can be avoided.

On the other hand, the directory server DRS manages collectively (in a centralized way) the link pointers LINK of information acquired from the measured data of the sensor nodes and provides the user terminals UST with the correspondence relationship between the objects and the link pointers LINK. Users acquire useful information from the data link pointers by inquiring the directory server DRS on the target objects even if they have no information regarding the physical position of sensor nodes. In other words, the centralized management of information link pointers by the directory server DRS enables the user terminals UST to acquire the measured data or secondary data concerning the target sensor node by accessing the directory server DRS without sensor node information.

The directory server DRS converts the data acquired from the distributed data processing servers DDS into information (semantic information) understandable for the users based on the attribute interpretation list ATL and provides the result to the user terminals UST.

The objects stored in the directory server DRS are set and modified depending on the system structure, and do not change chronologically as the measured data retrieved by the sensor nodes does. Therefore, the part that controls collectively the objects is not affected by chronological changes in the load of the measured data. As a result, the direct exchange of the sensor node data with the distributed data processing servers DDS is restricted, and thus the possibility that the overload of the network NWK-1 connected with the directory server DRS is suppressed.

FIGS. 6 and 7 show the case where separate distributed data processing servers DDS are respectively connected with a disk drive DSK. However, as shown in FIG. 5, a distributed data processing server DDS may be provided and plural disk drives DSK may be connected therewith. It is also possible to connect the disk drives with grouped plural distributed data processing servers DDS.

<Relationship Between the Measured Data and the Event>

Figures 9, 10:
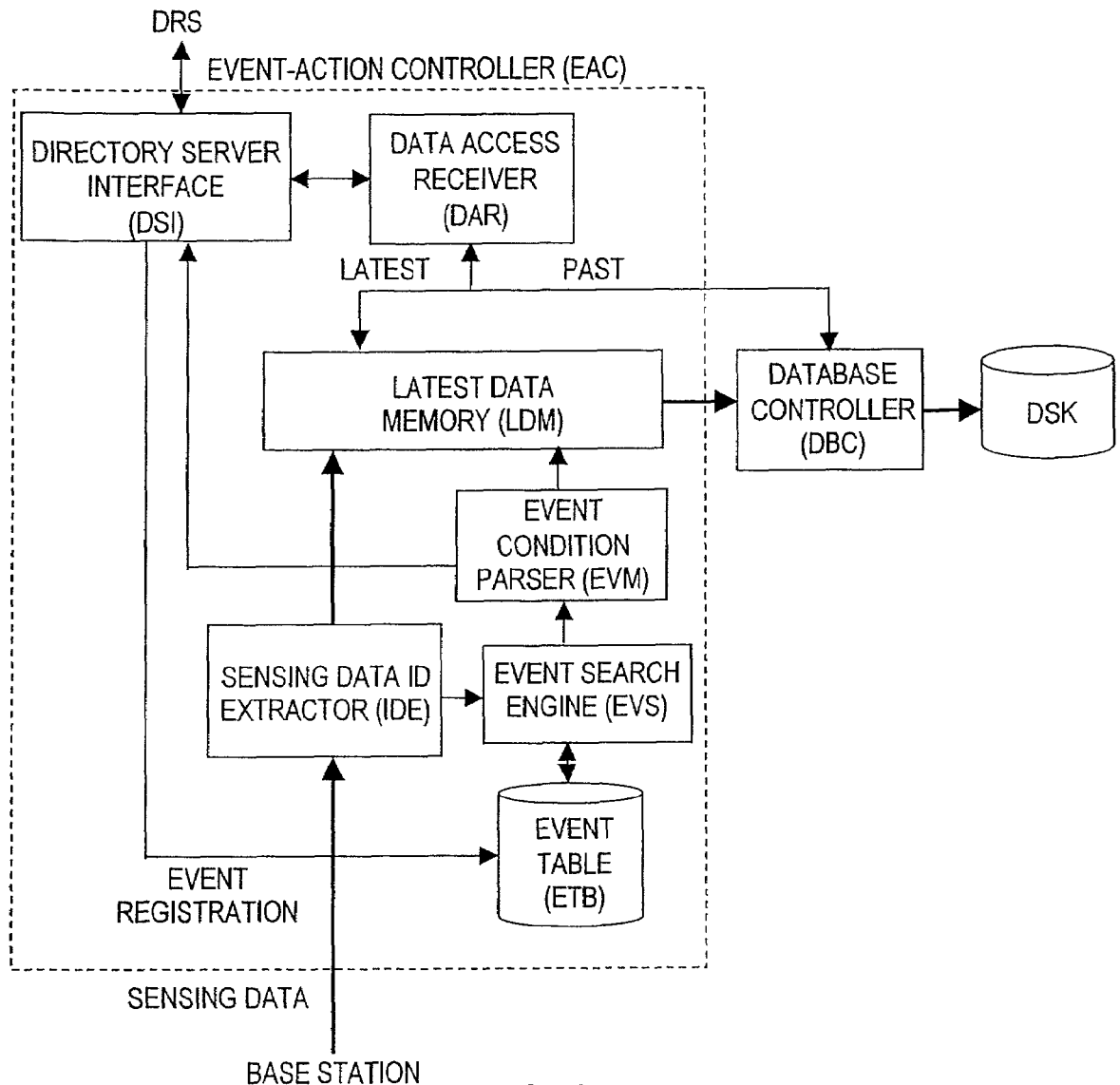
FIG. 9 is a block diagram showing the event-action controller of the distributed data processing server DDS.
FIG. 10 is a detailed description of the event table.

And now the relationship between measured data to be collected by the distributed data processing server DDS and the event/action based on the measured data will be shown in FIGS. 9 and 10.

In FIG. 9, the event-action controller EAC of the distributed data processing server DDS has an event table ETB for correlating the measured data collected by the base stations BST with events.

As FIG. 10 shows, a record of the event table ETB is made up of a data ID allocated to each sensor node and given to the measured data (corresponding to the data ID shown in FIGS. 12 and 14), EVT constituting the criteria of judging the occurrence of an event relating to the measured data, and a data holder DHL for determining whether the measured data should be stored in the database DB or not.

For example, in the figure, the measured data whose data ID is "XXX" notifies the directory server DRS on the occurrence of an event when its value is greater than A1. Incidentally, the measured data whose data ID is "XXX" are set in such a way that they will be written on the disk drive DSK whenever the data arrives. Storage to the disk DSK is based on setting information set in an action field of an event table end ETB.

The distributed data processing server DDS receives the measured data acquired from the base station BST at first by the sensing data ID extractor IDE and extracts the data ID or ID given to the measured data. And the sensing data ID extractor IDE sends the measured data to the latest data memory LDM.

The extracted data ID will be sent to the event search engine EVS to search the event table ETB, and when a record whose data ID matches is found, the event contents EVT of the record and the measured data will be sent to the event condition parser EVM.

The event condition parser EVM compares the value of the measured data and the event contents EVT, and when the conditions are satisfied, the event condition parser EVM notifies the directory server DRS that an event has occurred from a network processor NWP through the network NWK-1. And the event condition parser EVM transmits the request of the data holder DHL to the latest data memory.

Regarding the data which the data holder DHL of the event table ETB is ready to accept, the database controller DBC will receive the data from the latest data memory LDM and write the data on the disk drive DSK.

When the network processor NWP has received a reference request for the measured data from the directory server DRS, the distributed data processing server DDS will transmit the access request to the data access receiver DAR.

If the request for data access is for the latest data, the data access receiver DAR reads the measured data corresponding to the data ID contained in the access request from the latest data memory LDM, and returns the same to the network processor NWP. Or, if the access request is for the past data, the data access receiver DAR reads the measured data corresponding to the data ID contained in the access request from the disk drive DSK, and returns the same to the network processor NWP.

Thus, the distributed data processing server DDS retains the latest data in the latest data memory LDM from among the sensor node data collected from the base stations BST, and records other data in the disk drive DSK for reference in the future. And it is also possible to hold the data in the disk drive DSK only when an event has occurred to save the disc capacity. By this method, it will be possible to manage plural base stations BST (in other words a large number of sensor nodes) with a single distributed data processing server DDS.

<Details of the System Manager NMG and the Model Manager MMG>

<System Manager NMG>

Figure 11:
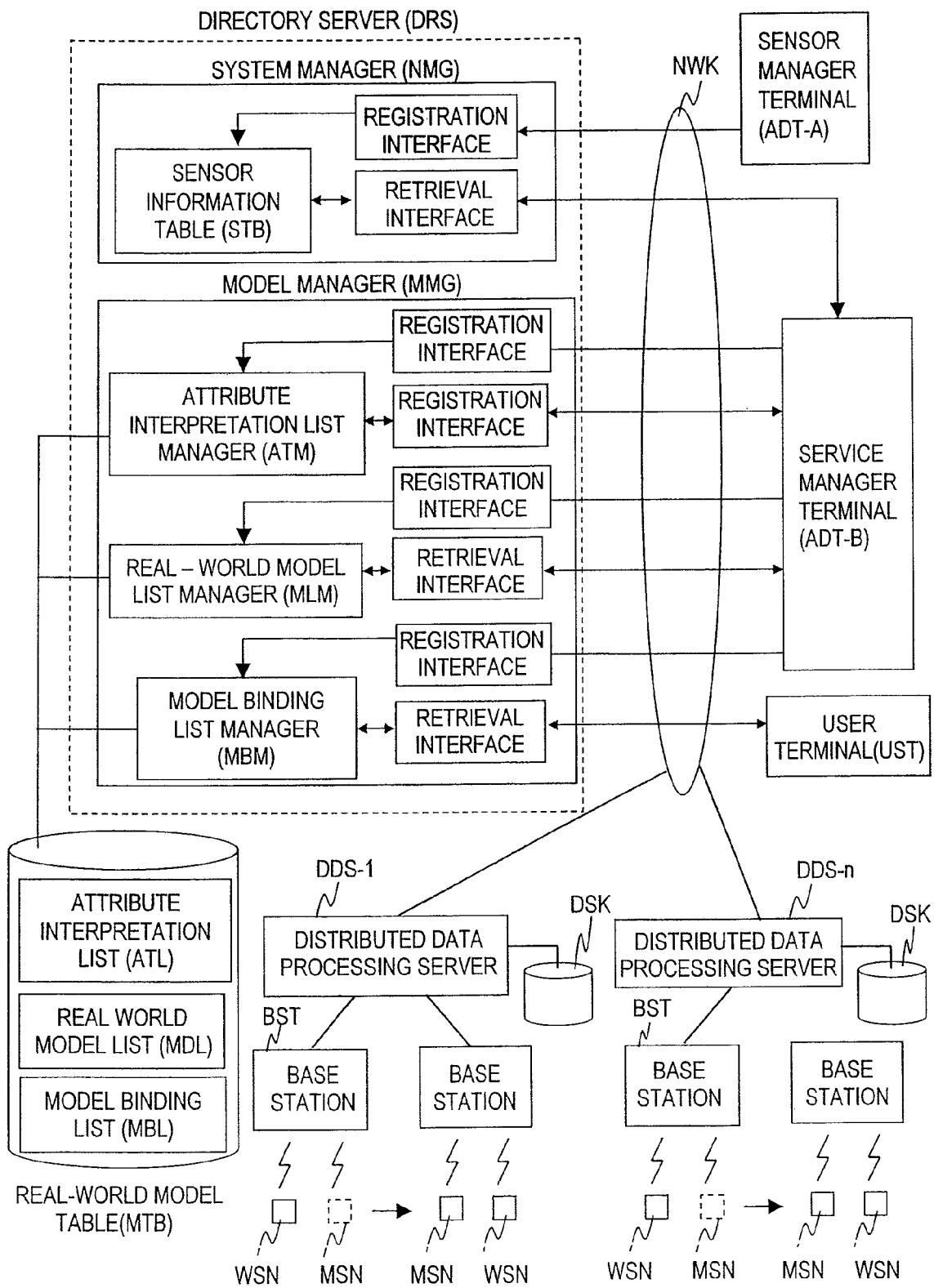
FIG. 11 is a block diagram showing the essential parts of the directory server DRS.

FIG. 11 shows the details of the system manager NMG and the model manager MMG of the directory server DRS and the real-world model table MTB shown in FIG. 2.

The system manager NMG of the directory server DRS includes a sensor information table STB for managing the sensor nodes, a registration interface for registering sensor nodes in the sensor information table STB, and a retrieval interface for retrieving the contents of the sensor information table STB. Incidentally, here the sensor information table STB will be managed by the sensor operation terminal ADT-A.

As FIG. 12 shows, the sensor information table STB is made up of a record of the data ID allocated in advance for each sensor node, the sensor type indicating the type of sensor node, the meaning indicating the object of measurement by the sensor node, the contents of measurement measured by the sensor node, the location indicating the position (or object) of the sensor node, the observation interval indicating the frequency by which the sensor node detects the measurement from the object of measurement, and the data link pointer showing the link pointer of the data measured (the position of storage in the distributed data processing server DDS-1 to DDS-n) which are managed by a data ID for identifying the sensor node as an index.

For example, the table shows that the tag TG-1 of the wireless mobile sensor node MSN-1 constituted as an identification card shown in FIG. 5 is allocated 01 as a data ID of a sensor node, and the object of measurement is the location (position) of the wireless mobile sensor node MSN-1, the frequency of measurement is every 30 seconds, and the measurement data is stored in the distributed data processing server DDS-1.

Similarly, the table shows that the sensor SSR-1 disposed in the wireless mobile sensor node MSN-1 constituted as an identification card is allocated a data ID of 02, that the object of measurement is the ambient temperature, that the frequency of measurement is every 60 seconds, and that the measured data is stored in the distributed data processing server DDS-2.

This sensor information table STB contains data set by the sensor operation terminal ADT-A, and the sensor manager and the service manager can learn the functions and position of the sensor nodes and the link pointers of the measured data by referring the sensor information table STB.

When the frequency of measurement of data by the sensor node is not constant, like the seating sensor of the node ID=03 shown in FIG. 12, only when the sensor has detected a specific state, this state will be notified to the distributed data processing server DDS irrespective of the frequency when the observation interval is set as "event."

<Model Manager MMG>

We will now describe the model manager MMG and the real-world model table MTB shown in FIG. 11.

The real-world model table MTB managed by the model manager MMG includes an attribute interpretation list ATL for interpreting what the measured data means, a real-world model list MDL showing the relationship of correspondence between the model name of the object OBJ-1 to OBJ-n shown in FIG. 6 and the actual information storage position and a model binding list MBL showing the relationship of correlation among the objects OBJ-1 to OBJ-n.

And the model manager MMG includes an attribute interpretation list manager ATM for managing the attribute interpretation list ATL, a real-world model list manager MDM for managing the real-world model list MDL, and a model binding list manager MBM for managing the model binding list MBL in order to manage each list of this real-world model table MTB, and each manager includes respectively a registration interface for registering/changing the list and a retrieval interface for retrieving each list.

It should be noted here that the real-world model table MTB should be managed by the service manager who uses the service operation terminal ADT-B. Furthermore, the sensor operation terminal and the service operation terminal shown in FIG. 11 may be integrated into a single operation terminal as shown in FIG. 1.

And the user terminal UST for using the sensor network will be used to retrieve objects OBJ from the desired list through the retrieval interface of each list.

In the first place, the attribute interpretation list ATL managed by the attribute interpretation list manager ATM includes a table for converting the output value of sensor nodes into meaningful information as shown in FIG. 13 because the return values (measurements) of the sensor nodes WSN, MSN and FSN and the secondary data converted by the distributed data processing servers DDS cannot be understood easily as they are by the users of the user terminals UST (hereinafter referred to simply as "user"). FIG. 13 is previously set according to the objects OBJ-1 to OBJ-n.

In FIG. 13, the name table ATL-m is related with the position of Mr. Suzuki OBJ-1 shown in FIG. 6, and as shown in FIG. 12, the personal name corresponding to the return value (measurement) from the identifier set in the tag TG set in the sensor node MSN-1 whose sensor type is identification card is indicated in the meaning column.

In FIG. 13, the place table ATL-p is a table showing the position of an employee wearing an identification card, and the name of place corresponding to the return value (e.g. the ID of the base station connected with the sensor node) is indicated in the meaning column. For example, a return value of 01 means that the place is an office.

The seat table ATL-s of FIG. 13 shows the state of persons sitting on the chairs in the office or in the meeting room A shown in FIG. 5, and stores the state of persons sitting (present or absent) corresponding to the return value (measurement) of wireless sensor nodes WSN-3 to WSN-10 installed on each chair (each wireless sensor node WSN-3 to WSN-10). For example, a return value of 00 shows that the person is present (seated), and a return value of 01 shows that the person is absent.

In the same way, the temperature table ATL-t of FIG. 13 is a table of values given by the temperature sensors (SSR-1, FSN-1 and 2 of MSN-1) shown in FIG. 5, and the function $f(x)$ for converting the return value (the measured data of the temperature sensors) into temperature y will be stored in the meaning column.

In FIG. 13, the number of persons table ATL-n is a table showing the number of persons in the meeting room A, and the number of persons corresponding to the return value (the number of persons seated shown by the chair sensors in the meeting room A, or the number of mobile sensor nodes MSN in the meeting room A) will be indicated in the meaning column.

Thus, the attribute interpretation list ATL is a list defining the meaning corresponding to the measured data, and respective table will be created corresponding to the objects formed.

Figure 14:
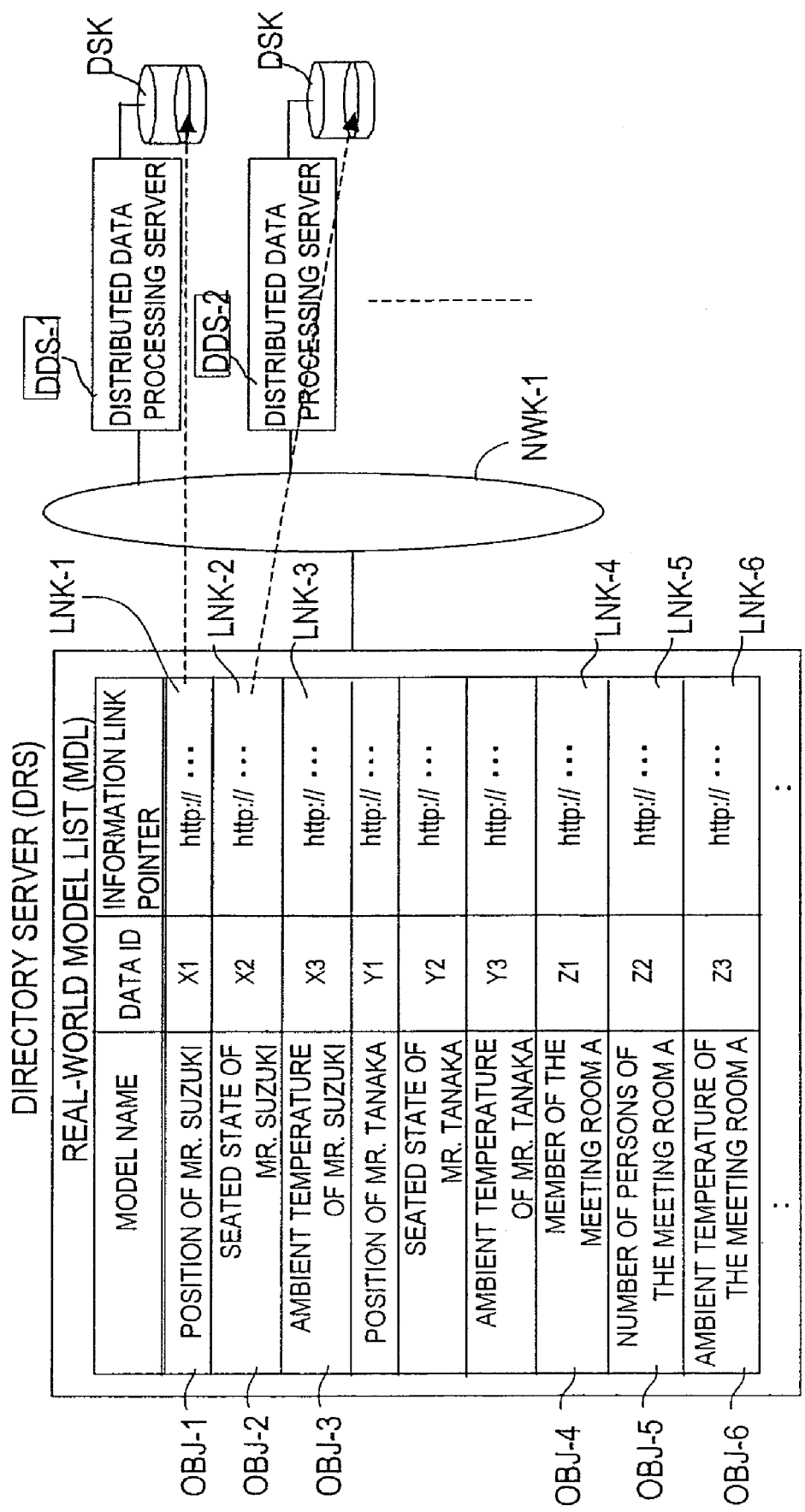
FIG. 14 is a block diagram showing the relationship between the real-world model list and the distributed data processing server DDS.

Then, the real-world model list MDL is a list created in advance by the service managers and the like, and as shown in FIG. 14 the position of information corresponding to the model name set for each object will be stored in the information link pointer. In other words, the combination of model name, information link pointer and data ID constitutes a real-world model list MDL.

The directory server DRS manages only meaningful information that the users can understand from the model list MDL, and this meaningful information will be located in any of the distributed data processing servers DDS-1 to DDS-n. As a result, the objects OBJ defined in the model list MDL indicate where the substance of the meaningful information is located in the information link pointer. Incidentally, this information link pointer is created in advance by the service manager and the like. In the same way, the data ID is a value corresponding to the sensor data (data acquired directly from the sensor node or secondary data acquired by processing) serving as the basis of the object value.

In FIG. 14, for example an information link pointer named LINK-1 for Mr. Suzuki's position OBJ-1 is stored, and this information link pointer stores URL, path and the like. When this object is retrieved from the user terminals UST, meaningful information (substance of the object) can be obtained from the information link pointers.

For example, when key word and the like are transmitted from the user terminals UST to the search engine SER of the directory server DRS, the list of model names including the key words from among the model names of the model list MDL will be returned from the search engine SER. When the user operating the user terminal UST has selected the desired model name, at first the directory server DRS acquires the data corresponding to the information link pointer from the distributed data processing server DDS created in the information link pointer LINK.

The directory server DRS converts the acquired data into information that the user can understand based on the attribute interpretation list ATL and transmits the same to the user terminals UST.

Therefore, users can acquire necessary information in the form of understandable information even if they have no knowledge on the individual sensor nodes nor of their location.

Since it is no longer necessary to convert the data collected from the sensor nodes into a form understandable for the users every time they are collected, in the distributed data processing server DDS, it is possible to drastically reduce the load of the distributed data processing servers DDS that collect and/or manage the data of a large number of sensor nodes. This conversion processing of data conducted by the directory server DRS if necessary at the request of users can eliminate any unnecessary conversion operation, and thus it will be possible to make the sensor network resources to function efficiently.

The model binding list MBL showing the relationship of correlation among the objects OBJ-1 to OBJ-n summarizes the related information on the elements common with the objects OBJ of the real-world model list MDL.

Figure 15:
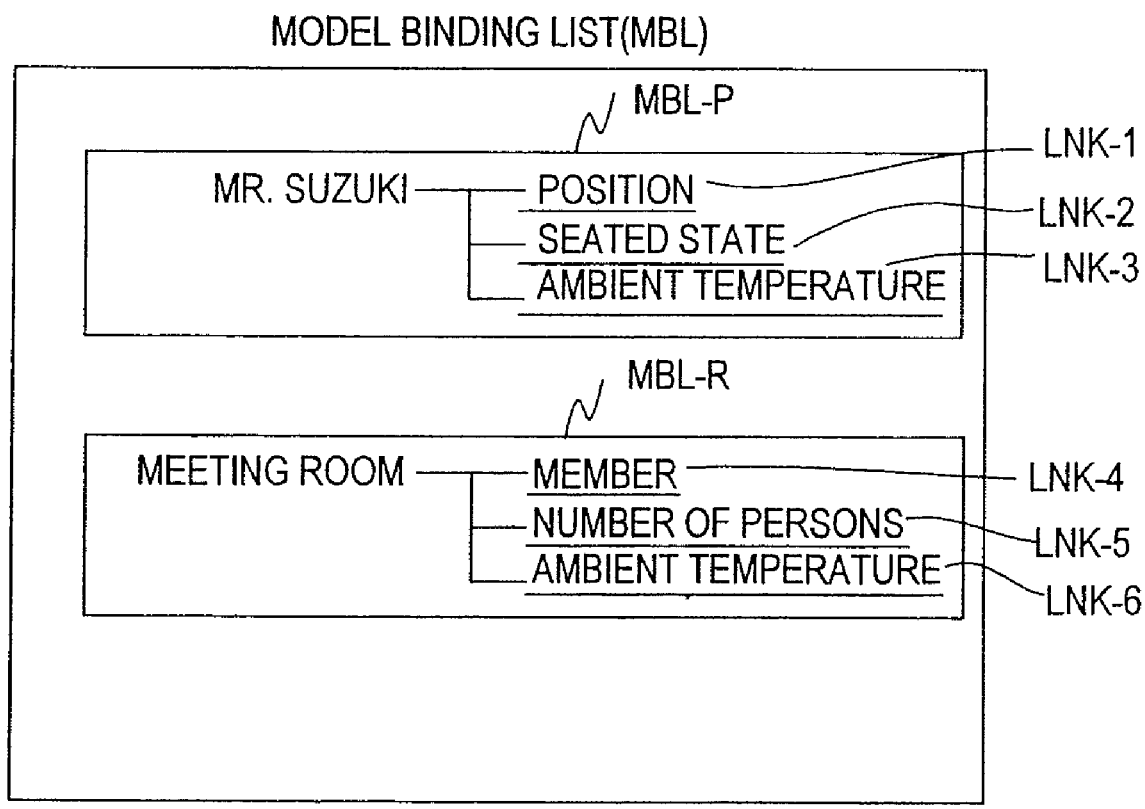
FIG. 15 is a detailed description of the model binding list.

As an example of the model binding list MBL, as FIG. 15 shows, "personal name" ("Mr. Suzuki" in the figure) and elements related with "the meeting room A" are extracted as common elements among the objects OBJ of the real-world model list MDL. For example, as objects OBJ related with the personal name of "Mr. Suzuki" registered in the meaning column of the name table ATL-m of the attribute interpretation list ATL shown in FIG. 13, there are position OBJ-1, seated state at the employee's own seat in the office OBJ-2, and temperature OBJ-3, and the link pointers of the objects related with the personal name of Mr. Suzuki are set in a tree structure as "position" LINK-1, "seated state" LINK-2, and "temperature" LINK-3 as shown in the figure, and this will constitute a model binding list MBL-P related to personal name.

In the same way, when the real-world model list MDL is viewed from the element of the meeting room A, there are objects OBJ-4 to OBJ-6 of "members," "number of employees" and "temperature." The information link pointers LINK-4 to LINK-6 of the objects related with the place of the meeting room A are set in a tree structure as "members," "number of employees" and "temperature." Thus, the model binding list MBL-R related with the meeting room A will be constituted.

Thus, the model binding list MBL will constitute a source of information relating different pieces of information having common elements out of the elements of the objects of the real-world model list MDL. It should be noted that different elements of this model binding list MBL were related in advance by the service manager and the like.

<Operation of the Model Manager MMG>

We will describe the operation of the sensor network system as follows.

<Registration of the Sensor Nodes>

Figure 16:
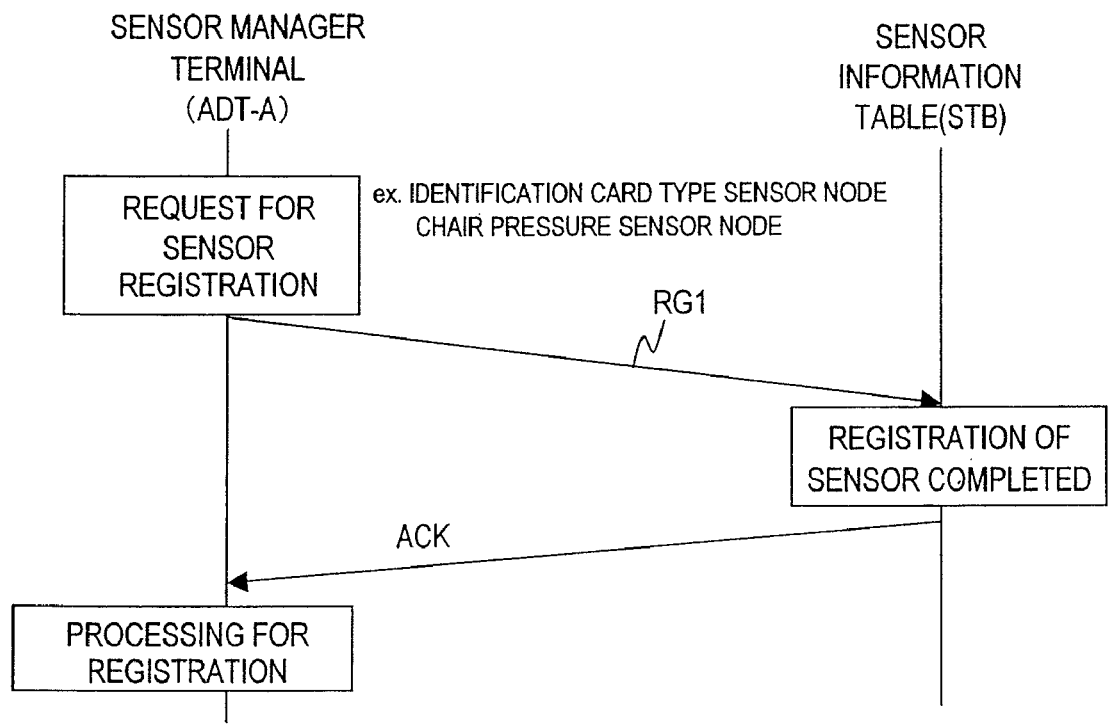
FIG. 16 is a time chart showing the steps of registering the sensor information.
Figure 17:
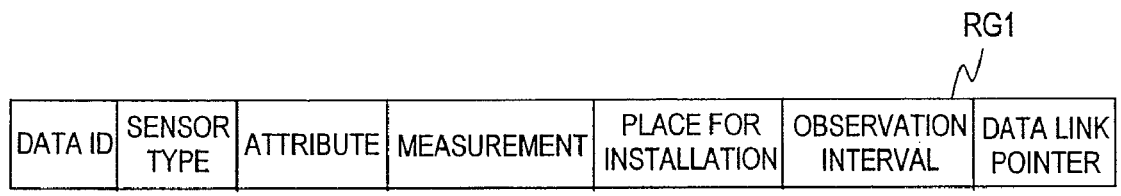
FIG. 17 is a data format for registering sensor nodes.

To begin with, we will describe the procedure of registering sensor nodes with reference to FIGS. 16 and 17. The sensor manager installs a sensor node at a predetermined place or on an employee and then registers the sensor node on the directory server DRS according to the time chart shown in FIG. 16.

In FIG. 16, the sensor manager accesses the directory server DRS through the sensor operation terminal ADT-A, and accesses the registration interface of the system manager NMG. Then, the sensor manager sets the data ID, the sensor type, attribute, measurement values, place of installation, interval of observation, and the data link pointer from the sensor operation terminal ADT-A using the data format shown in FIG. 17, and transmits the same to the system manager NMG of the directory server DRS as a request for registration (RG-1). Here, before proceeding to registration, the data link pointers should be secured and the attribute should be designated to the distributed data processing server DDS that is supposed to receive the sensor node data.

Upon receipt of this request for registration, the system manager NMG of the directory server DRS adds the sensor node information for which the request for registration was presented to the sensor information table STB shown in FIG. 12. And the system manager NMG allocates a data ID to the newly added sensor node. This data ID may be allocated from the sensor operation terminal ADT-A.

The system manager NMG allocates the link pointer of the measured data of the sensor node for which a request for registration was presented to the distributed data processing server DDS designated as a data link pointer and then completes a record of the sensor information table STB.

Finally, the system manager NMG returns a notice of completion (ACK) to the sensor operation terminal ADT-A, indicating that a new record was successfully added.

Incidentally, although not shown in any figure, upon receipt of a notice of registration of a sensor node from the directory server DRS, the distributed data processing server DDS issues a command to enable the sensor node to send sensing data with a predetermined observation frequency. The sensor manager SNM of the base station BST will receive the registration of the data ID and the observation interval.

In this way, the new sensor node will be able to transmit the measured data to the distributed data processing server DDS to which this sensor node belongs through the base station BST.

<Definition of Objects>

Figure 18:
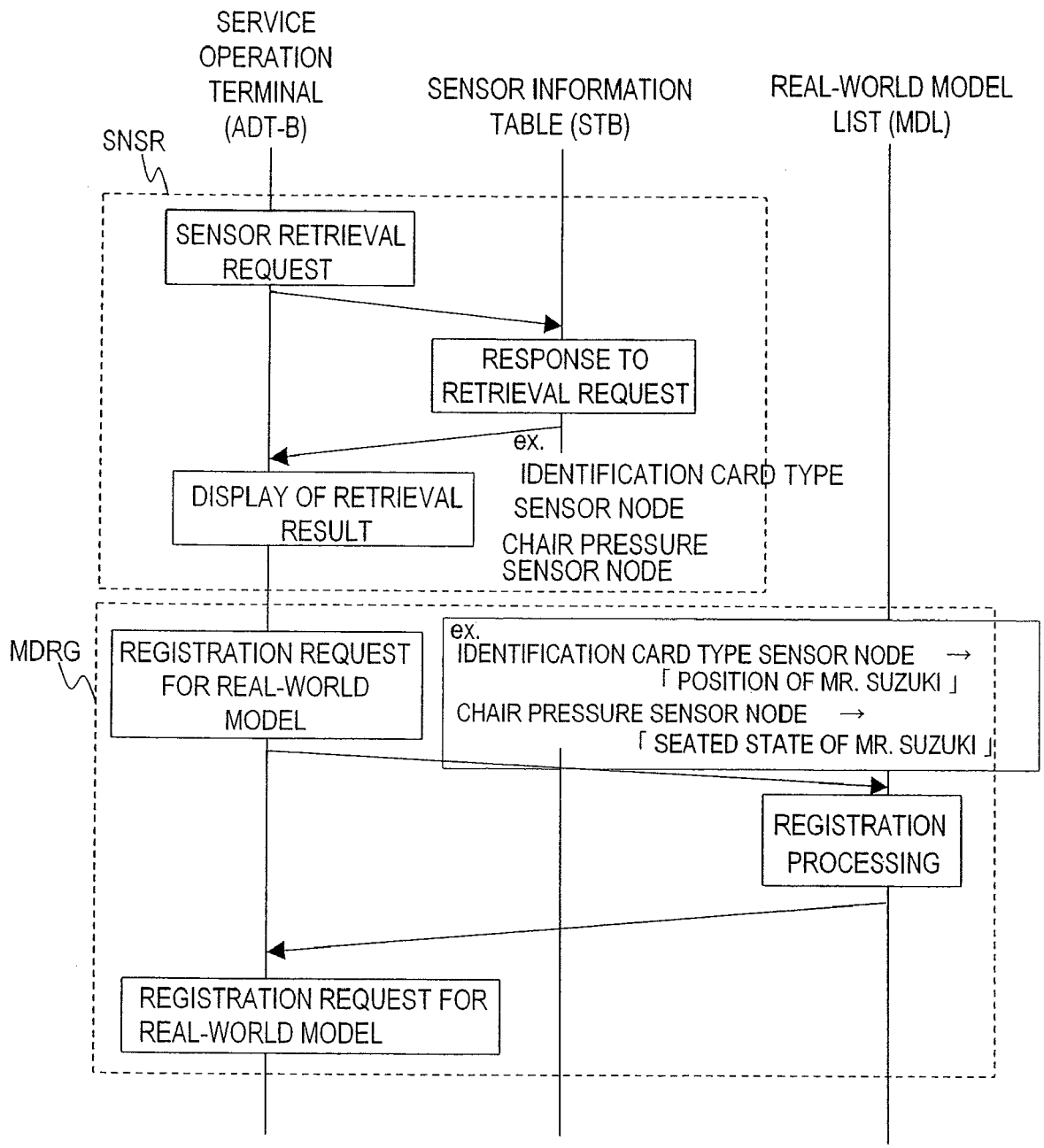
FIG. 18 is a time chart showing the steps of registering the real-world model list.

Then, we will describe the operation of creating the relationship between the measured data of the sensor node and the objects concerning the sensor node registered on the directory server DRS in FIGS. 16 and 17 above with reference to FIG. 18. It should also be noted that this operation is to be carried out by the service manager of the sensor network.

In FIG. 18, the service manager accesses the directory server DRS from the service operation terminal ADT-B to access the retrieval interface of the system manager NMG. Then, the service manager retrieves the desired sensor nodes based on the data ID and the like and returns the sensor nodes meeting the retrieval conditions to the service operation terminal ADT-B.

The service operation terminal ADT-B shows the retrieval result of the sensor nodes that have been received from the system manager NMG on the display devices and the like.

The service manager selects a desired sensor node from the sensor nodes displayed on the service operation terminal ADT-B, designates the objects to be correlated with the measured data of this sensor node, and registers the same on the model manager MMG of the directory server DRS.

For example, the service manager registers the object OBJ-1 of "Mr. Suzuki's position" as the object of the identification card-type sensor node (MSN-1 of FIG. 5) of data ID=01 of the sensor information table STB shown in FIG. 12. This registration results in the creation of a real-world model list (MDL) showing the relations between the object and its information link (FIG. 14).

The model manager MMG issues a predetermined command to the distributed data processing server DDS-1 to, for example, store the position of the base station BST having received the mobile sensor node MSN with a tag ID TG-1 (Mr. Suzuki's identifier) with regards to the object OBJ-1 of "Mr. Suzuki's position" in the distributed data processing server DDS-1.

The distributed data processing server DDS-1 is set to register an action in the event-action controller EAC. The content of the action is set to store the position of the base station BST in the database DB on receipt of TG-1 data whose tag ID indicates Mr. Suzuki, An information link pointer corresponding to the object OBJ-1 of the real-world model list MDL will be set regarding the substance of the data "Mr. Suzuki's position" stored in the database DB of the distributed data processing server DDS-1.

Or, with regards to the object OBJ-2 of "Mr. Suzuki's seating," the model manager MMG issues a command to the distributed data processing server DDS-1 to write a value of "00" in the database DB of the distributed data processing server DDS-1 if the measurement of the wireless sensor node WSN-0 with a pressure switch as a sensor SSR is ON, and to write a value of "01" in the database DB of the distributed data processing server DDS-1 if the measurement of the wireless sensor node WSN-0 is OFF.

Upon receipt of this command, the event action controller EAC of the distributed data processing server DDS-1 proceeds to an operation of writing "00" or "01" for the measured data of the sensor node WSN-0 (corresponding respectively ON or OFF) in the database DB of the distributed data processing server DDS-1.

In the same way as described above, an information link pointer corresponding to the object OBJ-2 of the real-world model list MDL will be set regarding the substance of the data "Mr. Suzuki's seating" stored in the database DB of the distributed data processing server DDS-1.

In this way, the object (information link pointer) set by the model manager MMG and the position of the distributed data processing server DDS for actually storing the information are set.

As FIG. 14 shows, the model manager MMG creates the object OBJ-1 of "Mr. Suzuki's position" and stores the model name, the data ID and the information link pointer attached to the measured data of the sensor node in the real-world model list MDL. When the registration of the object is completed, the model manager MMG sends a notice of completion to the service operation terminal ADT-B.

For displaying the notice of completing the creation of the objects received and for creating the object, the service operation terminal ADT-B repeats the operation described above to create the desired objects.

<Definition of the Model Binding List>

Figure 19:
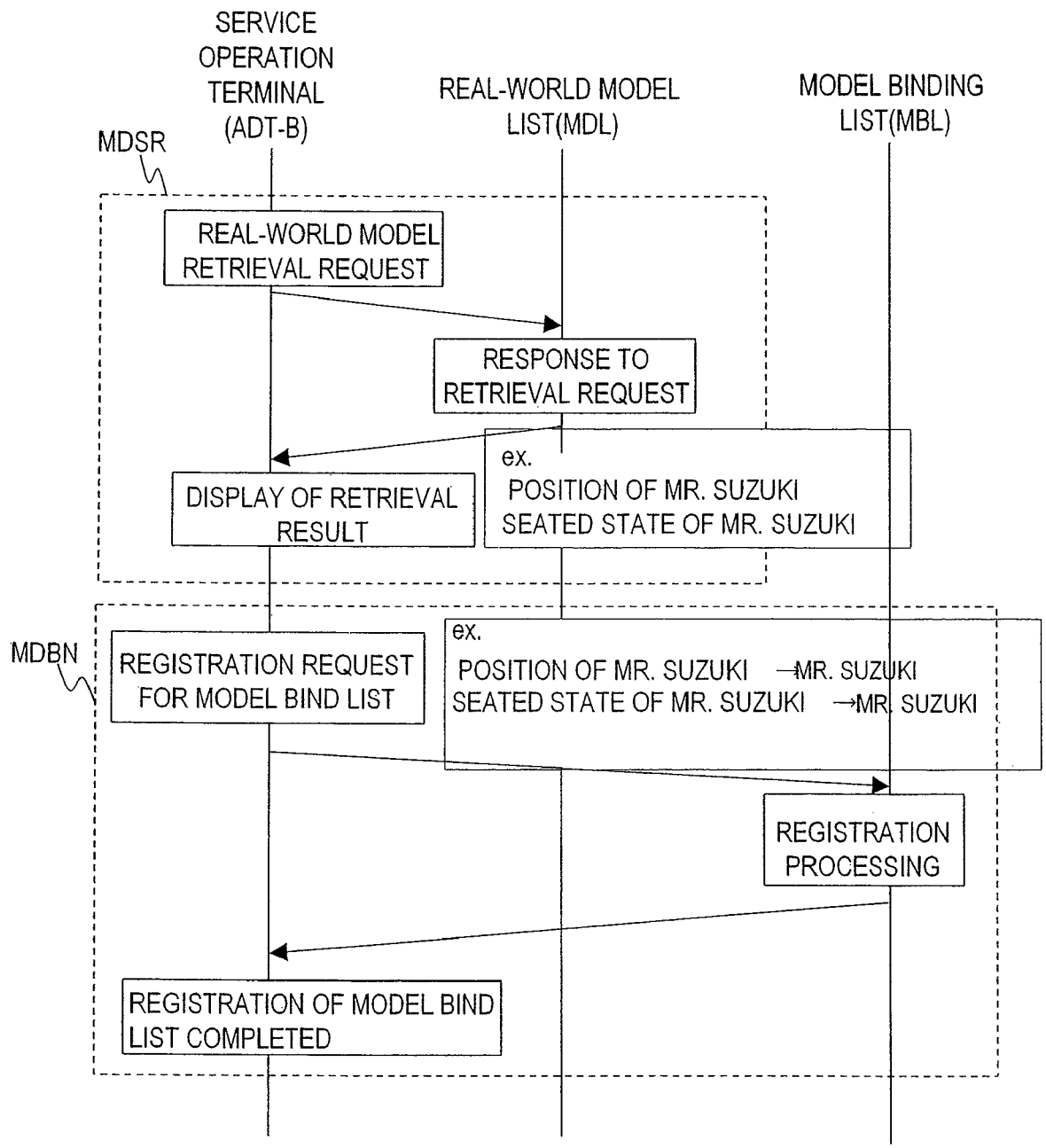
FIG. 19 is a time chart showing the steps of registering the model binding list.

Then, after the creation of plural objects by the definition of the model list MDL described above, we will describe the process of setting the model binding list MBL showing the relationship of correspondence among plural objects OBJ-1 to OBJ-n with reference to FIG. 19.

In FIG. 19, the service manager accesses the model manager MMG of the directory server DRS from the service operation terminal ADT-B to access the retrieval interface of the model manager MMG. Then, the service manager retrieves the desired objects and returns the object matching the retrieval conditions to the service operation terminal ADT-B.

The service operation terminal ADT-B outputs the retrieval result of the objects received from the model manager MMG on a display device not shown and the like.

The service manager selects a desired object from among the objects displayed in the service operation terminal ADT-B and requests the model manager MMG of the directory server DRS to indicate the elements common to all the objects in a model binding list.

For example, as FIG. 15 shows, the personal name "Mr. Suzuki" will be created in the model binding list MBL-P, and this model binding list MBL-P will be related with the position of Mr. Suzuki OBJ-1, the seating state of Mr. Suzuki OBJ-2, and the temperature of Mr. Suzuki OBJ-3.

The model manager MMG relates the model binding list MBL-P with the information link pointer of all the objects OBJ-1 to OBJ-3 and stores the same in the model binding list MBL.

When the registration of the model binding list MBL is completed, the model manager MMG sends a notice of completion to the service operation terminal ADT-B.

For displaying the notice of completing the creation of the model binding list received and for creating the model binding list, the service operation terminal ADT-B repeats the operation described above to create the desired model binding list.

<Retrieval of the Model Binding List>

Figure 20:
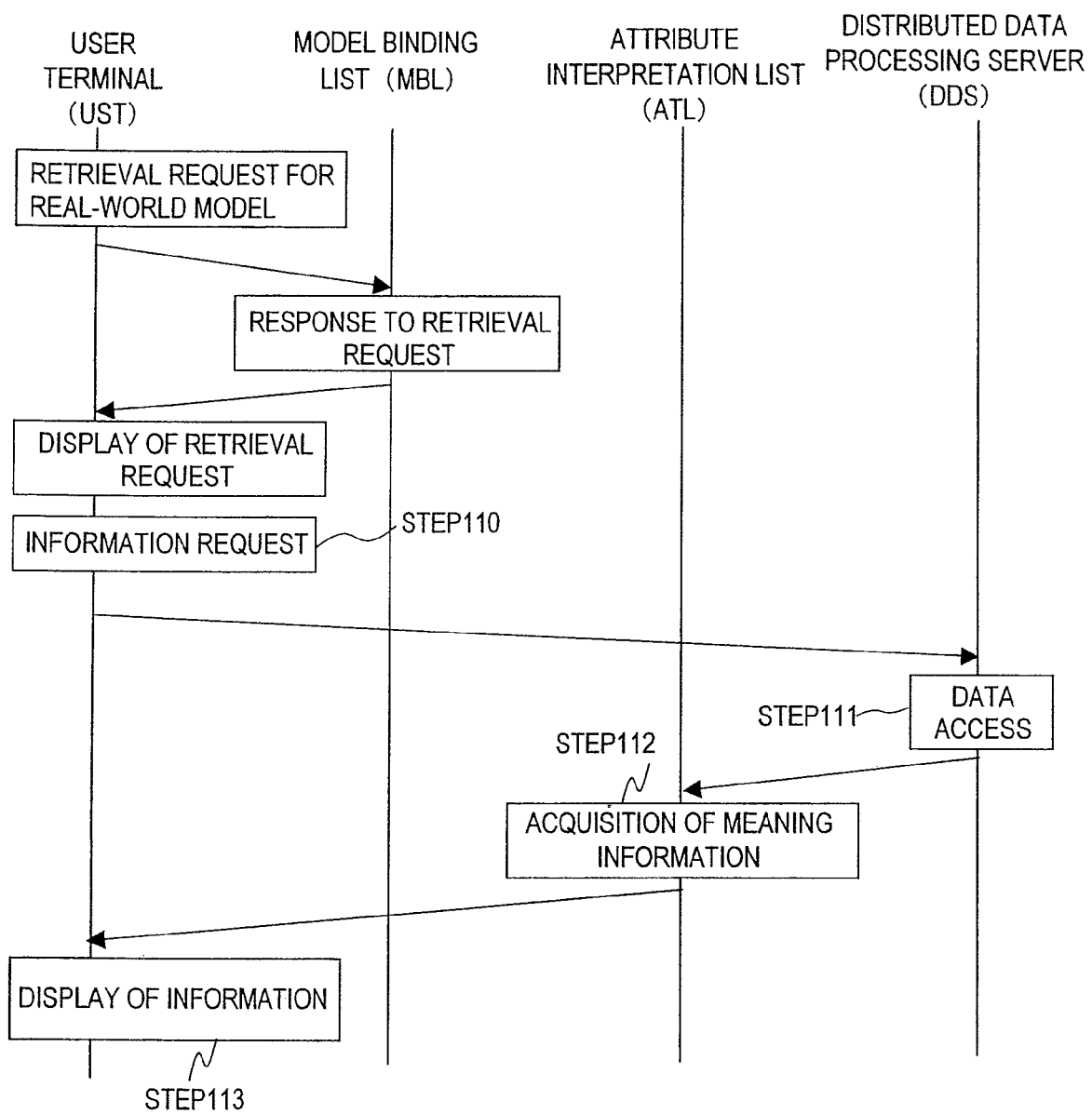
FIG. 20 is a time chart showing an example of responses to the access to the model binding list.
Figure 21:
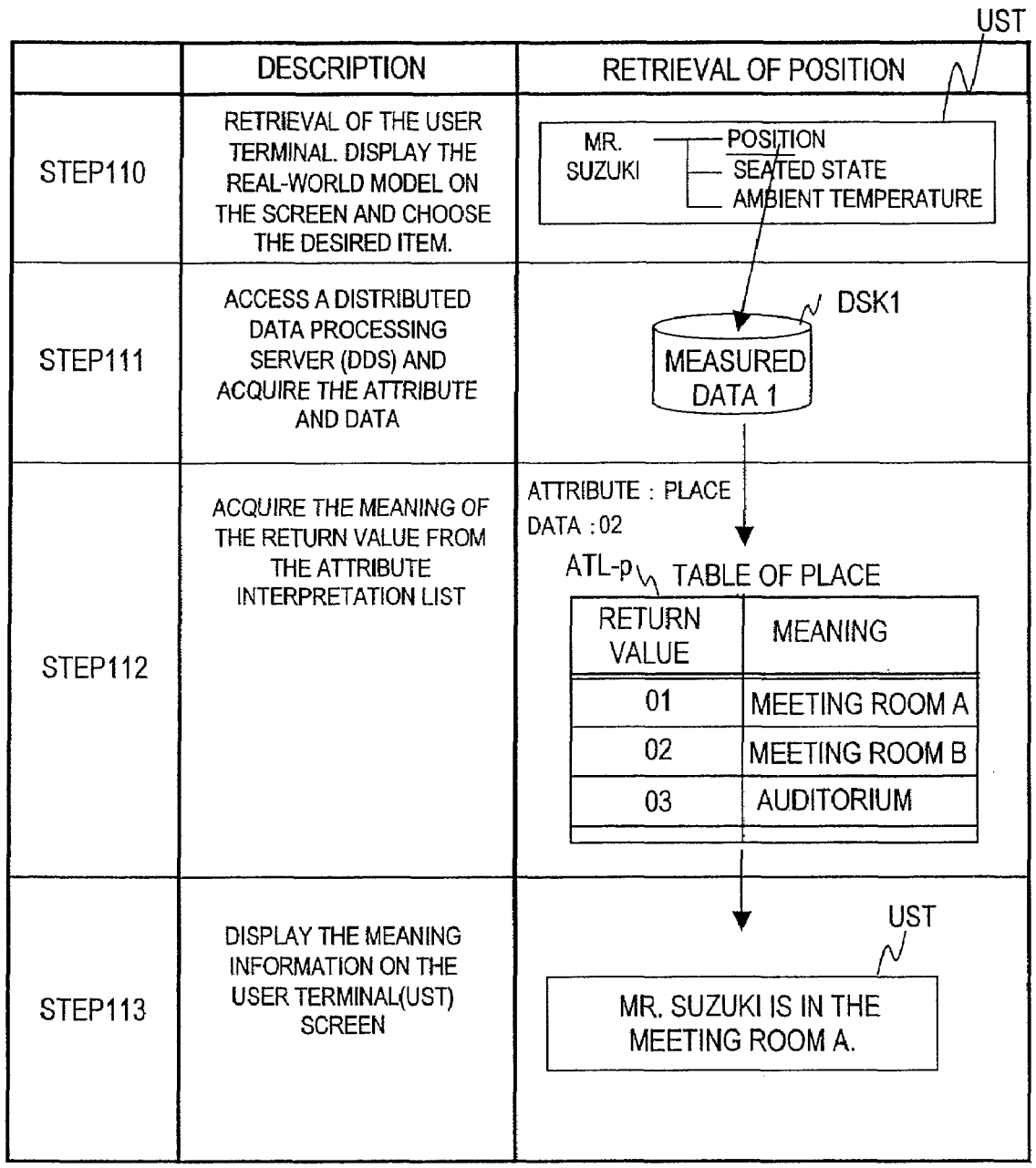
FIG. 21 is a detailed description of the steps required when the position of Mr. Suzuki is designated from the model binding list.

We will then describe an example of the process of a user of the sensor network referring the data of the sensor node using the model binding list MBL with reference to FIGS. 20 and 21.

In FIG. 20, the user terminal UST accesses the search engine SER of the directory server DRS, and requests the model binding manager MBM to retrieve the model binding list MBL. This request for retrieval is made, for example, by the retrieval of key words and GUI as shown in FIG. 15.

The model binding list manager MBM returns the result of retrieval requested to the user terminal UST and displays the result of the model binding list matching with the retrieval request on a display device of the user terminal UST.

The user selects any model binding list from among the retrieval result on the user terminal UST and requests information (Step 110).

Here, as FIG. 15 shows, the model binding list is constituted by link points in a tree structure grouped together by common elements among the objects OBJ, and the users present their request for information to the distributed data processing server DDS constituting the link pointer by choosing any link pointer displayed in the model binding list of the user terminal UST.

In the distributed data processing server DDS, the user accesses the measured data or secondary data requested from the user terminals UST and returns the access result to the attribute interpretation list manager ATM of the directory server DRS.

In the directory server DRS, the attribute interpretation list manager ATM obtains the meaning for the return value of the attribute interpretation list ATL shown in FIG. 13 from the data ID of the measured data sent from the distributed data processing server DDS (Step 112).

Then, the search engine SER of the directory server DRS returns the meaning corresponding to the measured data analyzed by the attribute interpretation list manager ATM to the user terminal UST, and the user terminal UST displays the response of the directory server DRS in the place of the response from the distributed data processing server DDS.

For example, when the link pointer LINK-1 of the model binding list MBL-P shown in FIG. 15 is chosen, the measured data of the distributed data processing server DDS-1 set previously for the position of Mr. Suzuki OBJ-1 from the user terminal UST is accessed. If the link pointer LINK-1 is related for example with the data link pointer of the sensor information table STB shown in FIG. 12, the distributed data processing server DDS reads the measured data of the mobile sensor node MSN-1 being the measured data from the database DB corresponding to this data link pointer, and returns to the directory server DRS.

In the directory server DRS, the place table ATL-p of the attribute interpretation list ATL is chosen from data attribute stored together with data, and the meaning corresponding to the return value (measurement) is acquired. In this case, as shown in FIG. 21, if the return value is 02 for example, the information of the link pointer LINK-1 of the model binding list MBL-P will be "meeting room A." Therefore, the response for the object OBJ-1 of "Mr. Suzuki's position" of the model binding list MBL-P is converted from a measurement value of the sensor node MSN-1 "02" into the meaningful information "meeting room A" and will be displayed (or notified) on the user terminal UST. Incidentally, the present embodiment shows the method wherein the data attribute will be acquired together with the data. In this case, the data link pointer and their attribute of sensor node are set, at the time of registration, to the distributed data processing server DDS that is to receive data from the sensor node. As another method of acquiring data attribute, attributes may be designated to models at the time of registering the real-world model list MDL.

Figure 22:
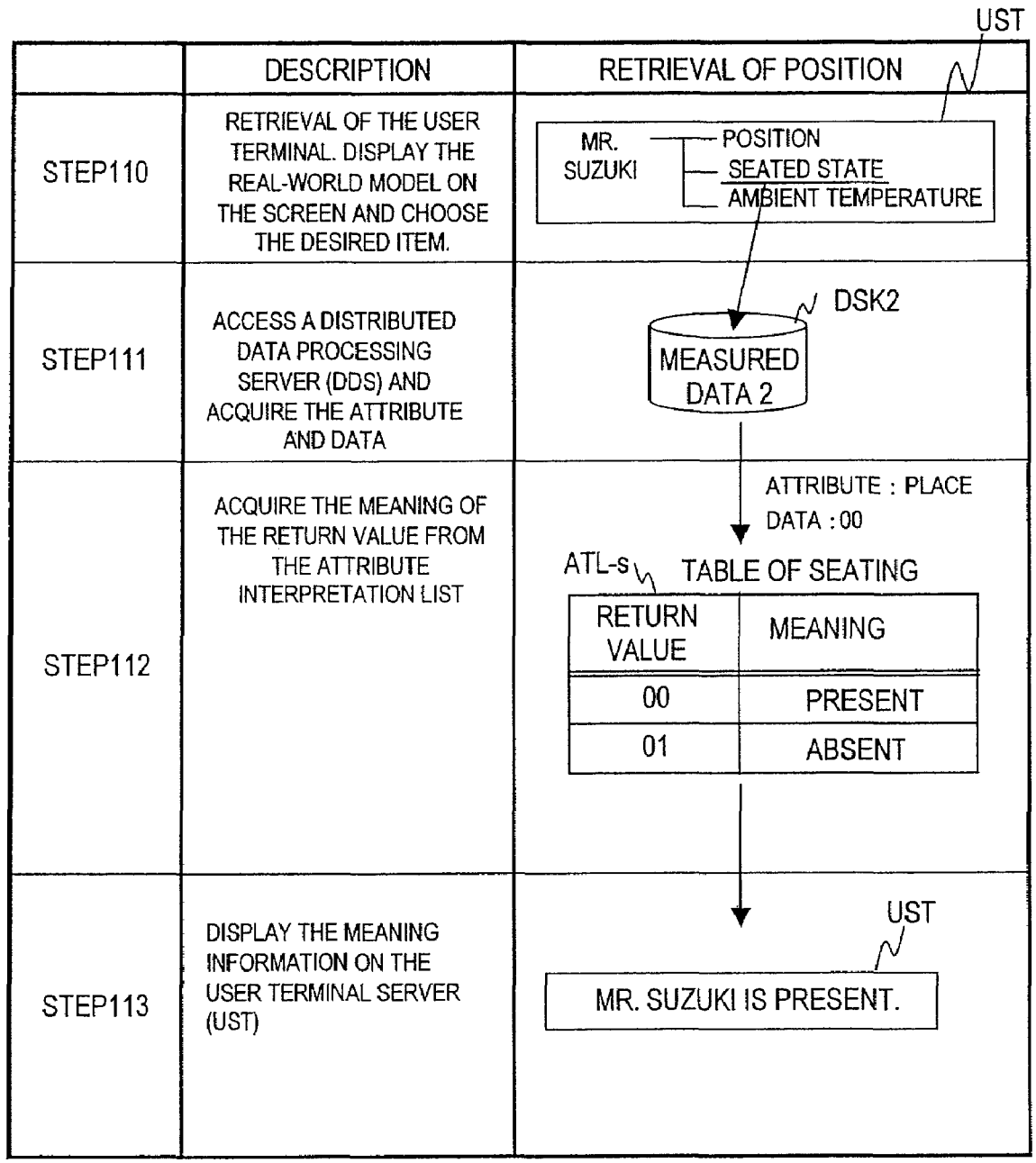
FIG. 22 is a detailed description of the steps required when the seating state of Mr. Suzuki is designated from the model binding list.

FIG. 22 shows the case of carrying out the operation of FIG. 20 above for "the seated state of Mr. Suzuki" LINK-2 of the model binding list MBL-P shown in FIG. 15. In this case also, the return value "00" from each wireless sensor node WSN-3 to WSN-10 is read from the distributed data processing server DDS, and in the attribute interpretation list manager ATM of the directory server DRS, the return value="00" will be "present" and a meaningful information that "Mr. Suzuki is present" can be returned from the search engine SER to the user terminal UST.

Figure 23:
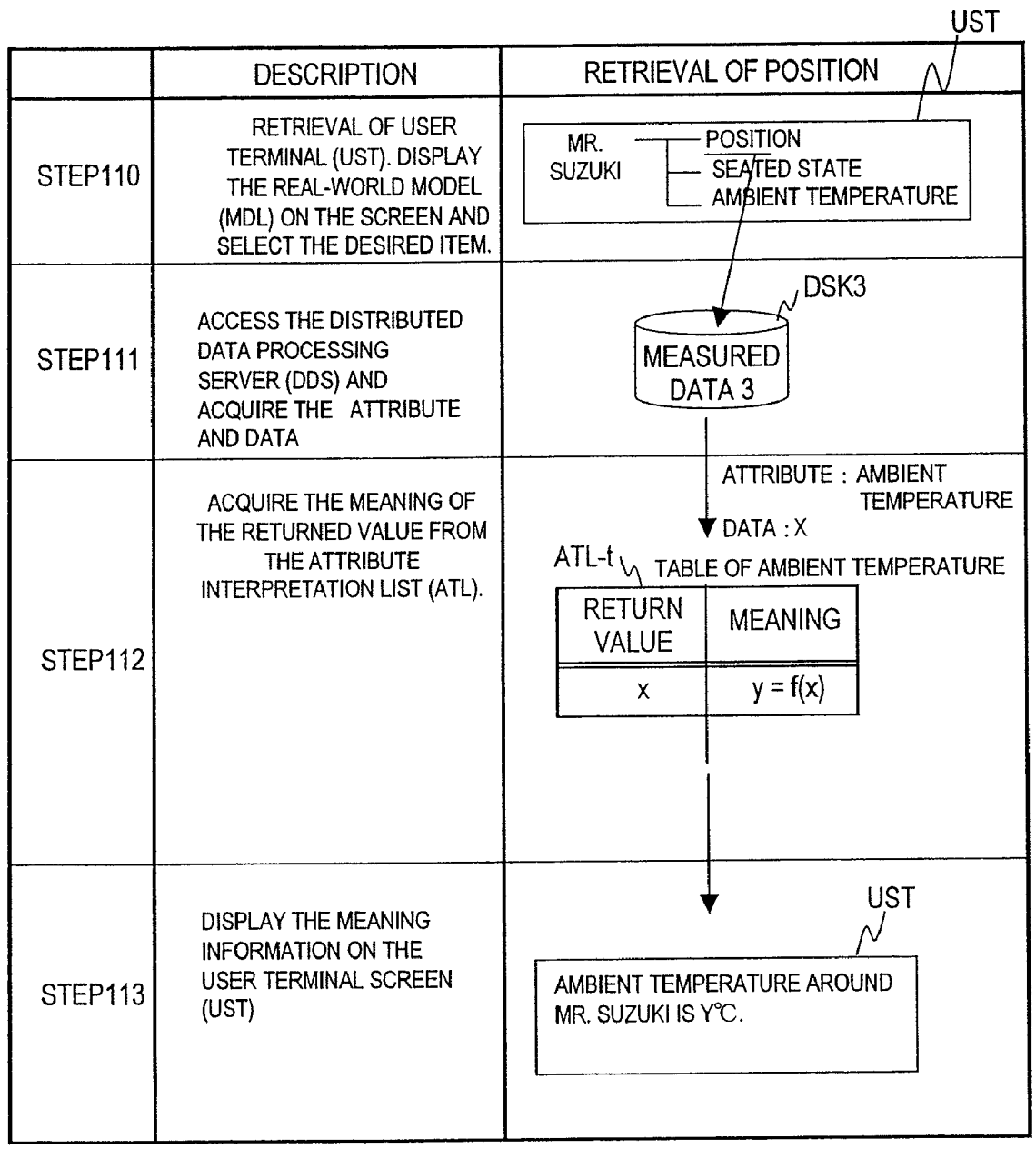
FIG. 23 is a detailed description of the steps required when the temperature of Mr. Suzuki is designated from model binding list.

FIG. 23 shows the case of carrying out the operation of FIG. 20 above for "the temperature of Mr. Suzuki" LINK-3 of the model binding list MBL-P shown in FIG. 15. In this case also, a return value "x" from the sensor SSR-1 of each wireless sensor node MSN-1 is read from the distributed data processing server DDS, and a return value=x is calculated as temperature $y=f(x)$ in the attribute interpretation list manager ATM of the directory server DRS, and a meaningful piece of information that "the ambient temperature around Mr. Suzuki is y °C." can be returned from the search engine SER to the user terminal UST.

FIG. 24 shows the case of carrying out the operation of FIG. 20 above for "the members in the meeting room A" of the model binding list MBL-R shown in FIG. 15. In this case, when an object formed of the members of the meeting room A OBJ-4 is created in the model manager MMG, in the predetermined distributed data processing server DDS-1, the tag ID of the identification card node detected by the base station BST-1 corresponding to the meeting room A is read in the base station BST-1 as measured data. And this value will be stored in the information link pointer shown in FIG. 14 (here, the distributed data processing server DDS-1) set in advance as a data link pointer.

The distributed data processing server DDS-1 collects at a prescribed frequency the tag ID of the wireless sensor nodes MSN-1 to MSN-n from the base station BST-1 and updates the value showing the members of the meeting room A (set of tag ID of the identification card nodes). FIG. 24 shows that the employees whose tag ID are "01" and "02" have been detected in the meeting room A from the wireless mobile sensor nodes MSN-1 to MSN-n collected by the distributed data processing server DDS-1.

The distributed data processing server DDS-1 transmits this secondary data "01. 02" to the attribute interpretation list manager ATM of the directory server DRS.

The attribute interpretation list manager ATM of the directory server DRS converts the secondary data received into meaningful information of 01=Suzuki and 02=Tanaka with reference to the personal name table ATL-m defined in advance and send the same to the user terminal UST.

As a result, on the user terminal UST, meaningful information that "Mr. Suzuki and Mr. Tanaka are in the meeting room A" can be obtained in response to the request for information on the members in the meeting room A of the model binding list MBL-P.

Figure 25:
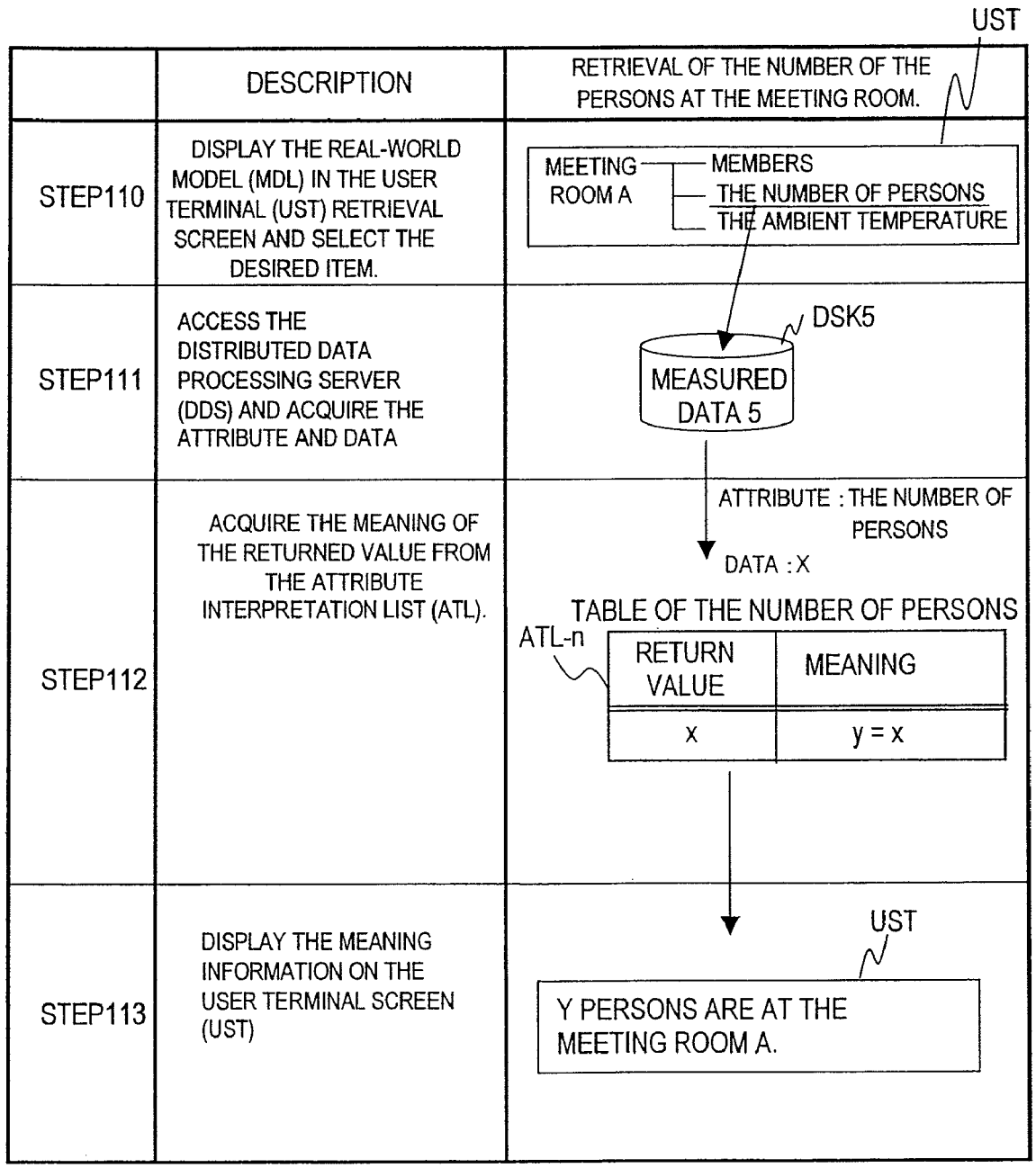
FIG. 25 is a detailed description of the steps required when the number of persons in the meeting room A is designated from the model binding list.

FIG. 25 shows the case of carrying out the operation shown in FIG. 20 above for "the number of persons in the meeting room A" of the model binding list MBL-R shown in FIG. 15. In this case, when an object formed of the number of persons in the meeting room A OBJ-5 is created in the model manager MMG, in the predetermined distributed data processing server DDS-1, the number of persons in the meeting room A, specifically the number of IDs of the identification card detected by the base station BST-1 corresponding to the meeting room A or the number of the seating detection nodes which is ON is calculated. And this value will be stored in the information link pointer shown in FIG. 14 set in advance as a data link pointer of the object OBJ-5.

The distributed data processing server DDS-1 collects the number x of the data IDs of the wireless mobile sensor nodes MSN-1 to MSN-n from the base station BST-1 at a prescribed frequency, and calculates and updates the value showing the number of persons at the meeting room A (secondary data).

The distributed data processing server DDS-1 sends this secondary data x to the attribute interpretation list manager ATM of the directory server DRS.

The attribute interpretation list manager ATM of the directory server DRS converts the received secondary data into meaningful information of a number of person y=x from the number of person table ATL-n defined in advance and send the same to the user terminal UST from the search engine SER.

As a result, it is possible to acquire a meaningful piece of information that "there are y persons in the meeting room A" in response to a request for information for the number of persons in the meeting room A of the model binding list MBL-P at the user terminal UST.

<Action Controller>

Figure 26:
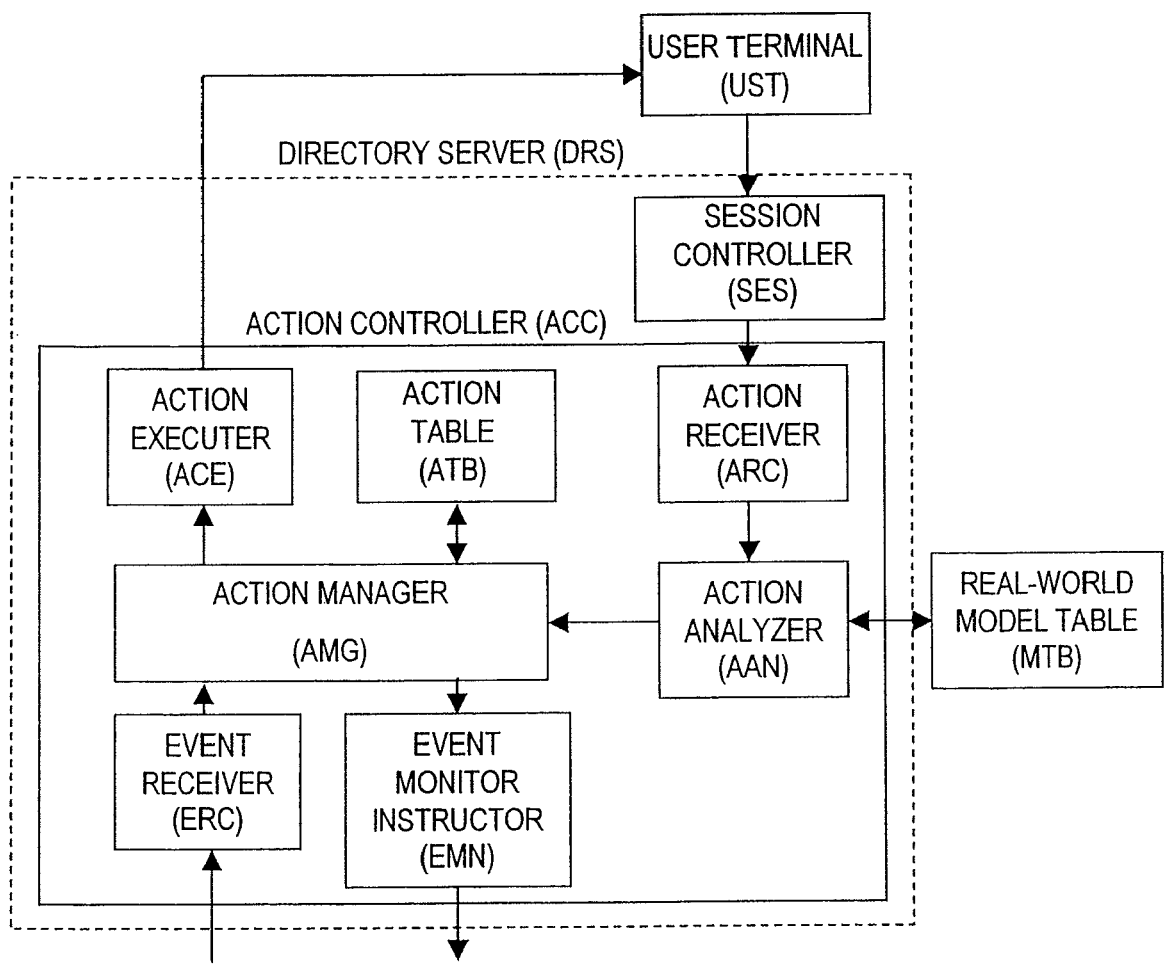
FIG. 26 is a block diagram of the action controller ACC of the directory server DRS.

FIG. 26 is a block diagram showing the details of the action controller ACC of the directory server DRS.

Based on a notice on the occurrence of an event received from the event action controller EAC of plural distributed data processing servers DDS, the action controller ACC automatically performs an "action" previously set.

Accordingly, the action controller ACC includes an action receiver ARC for receiving the setting of action from the user terminal UST through the session controller SES, an action analyzer AAN for analyzing the action received and for setting the distribution of functions (or loads) between the directory server DRS and the distributed data processing server DDS according to the analysis result, an action manager AMG for managing the definition and execution of actions, an action table ATB for storing the relationship between the events and actions according to the request for setting from the user terminal UST, an event monitor instructor EMN for issuing instructions to the distributed data processing server DDS-1 to DDS-n to monitor the events defined in the action table ATB, an event receiver ERC for receiving the notice of events that occurred at each distributed data processing server DDS-1 to DDS-n, and an action executer (executing unit) ACEC for executing the preset actions based on the definition of the event-action table ATB received.

Figure 27:
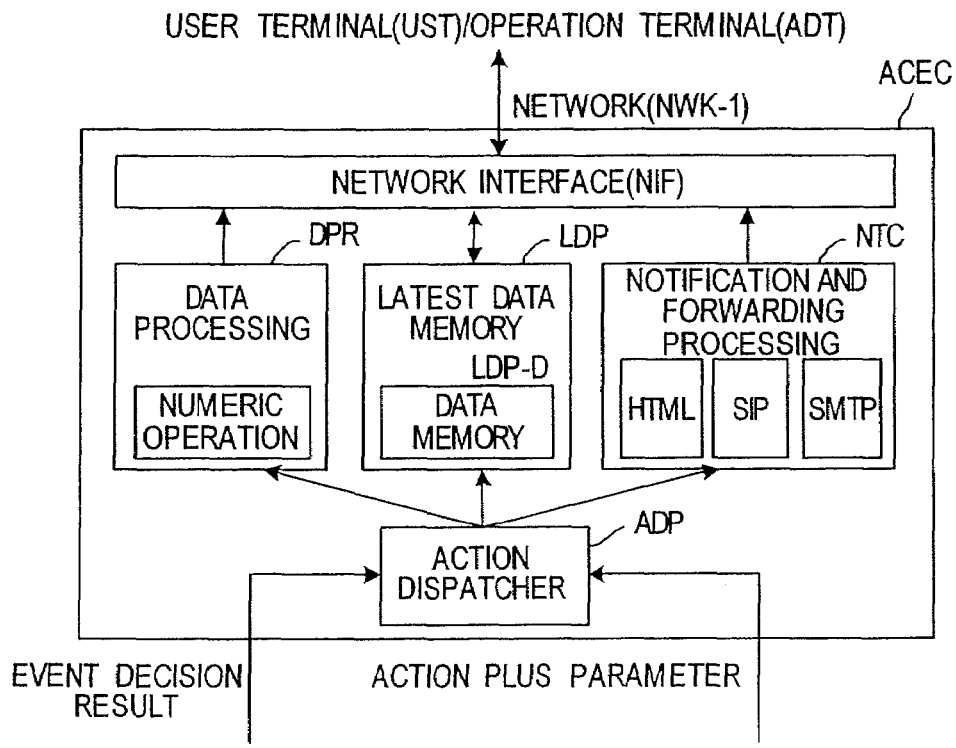
FIG. 27 is a block diagram showing an action executer ACEC constituting an action controller ACC.

The action executer ACEC constituting the action controller ACC is constructed as shown in FIG. 27. In FIG. 27, the action executer ACEC includes an action dispatcher ADP that receives event occurrence notification from the action manager AMG of FIG. 26, reads the content of action corresponding to the data ID in which the event occurrence notification originates, and action execution parameters from the action table ATB, and issues commands to processors described later.

The above-mentioned processors that execute specified action upon receipt of a command from the action dispatcher ADP include a notification and forwarding processor NTC that performs communication with a user terminal and the like, a storing processor LDP that stores data in a latest data memory LDP-D as action, and a secondary data processor DPR that processes data as action.

The notification and forwarding processor NTC includes protocol controllers corresponding to the content of action, to perform pop-up notification and Email transmission to the user terminal UST and the like. For example, it performs pop-up notification and data forwarding by SIP (Session Initiation Protocol), transmits Email by SMTP (Simple Mail Transfer Protocol), and transmits data described by HTML (Hyper Text Markup Language) and the like.

The storing processor LDP stores data specified in action in a data memory LDP-D included in the directory server DRS. The data memory LDP-D included in the directory server DRS allows the latest data to be provided according to access from the user terminal UST, and correspondence relations between the data memories LDP-D and objects are set in advance in the real-world model table MTB.

The secondary data processor DPR performs a specified operation on data from the distributed data processing server DDS and the like to generate secondary data. It adds a data ID to the secondary data. The secondary data can be transmitted to the latest data memory LDP-D and other distributed data processing servers DDS.

The notification and forwarding processor NTC, the storing processor LDP, and the secondary data processor DPR can communicate with the first network NWK-1 through the network interface NIF to transmit and receive data and transmit messages.

On receiving the event occurrence notification from the action manager AMG, the action dispatcher ADP reads action and parameters that correspond to the data ID in which the event originates, from the action table ATB.

The action dispatcher ADP decides to which processor a command is to be issued, from the content of the action, and issues commands (including parameters if necessary) to the secondary data processor DPR, the notification and forwarding processor NTC, and the storing processor LDP.

Figure 28:
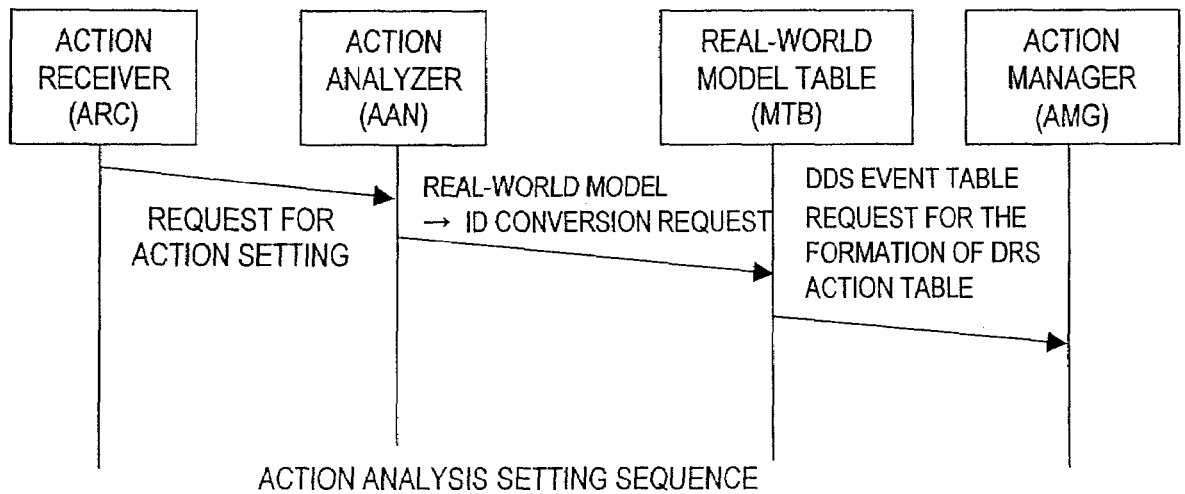
FIG. 28 is an illustration of setting the action table.

The registration of actions is explained with reference to the timing chart in FIG. 28. In FIG. 28, in the beginning, the user (or the service manager) accesses the action controller ACC of the directory server DRS through the user terminal UST or the like to request the setting of action. For example, as an example of action shown in FIG. 29, we will examine the case where Mr. X taking his seat triggers sending a pop-up notice to the IP address of the user terminal UST of A.

Upon receipt of this request for action setting, the action receiver ARC of the action controller ACC requests to the action analyzer AAN to set the action. For instance, when there is a request for Mr. X taking his seat from the user terminal UST, the action analyzer AAN selects, from the real-world model list MDL, the data ID of the sensor node to be monitored through the model name of Mr. X taking his seat, and determine the event condition of the measured data of the sensor node. Here, in order to convert the real-world event of "Mr. X taking his seat" into a data ID, the return value that means the model of "Mr. X taking his seat" and the person's presence (being seated) will be retrieved by referring the real-world model list MDL of the real-world model table MTB and the attribute interpretation list ATL. That is, the meaning of the model name which the user can understand is converted to the ID and location of the sensor node and the return value.

Here, if Mr. X=Mr. Suzuki as shown in FIG. 30, the model is already defined in the real-world model table MTB, the data ID=X2 and the information link pointer (the distributed data processing server DDS1) for storing the data will be acquired from the lists MDL and ATL mentioned above.

Figure 31:
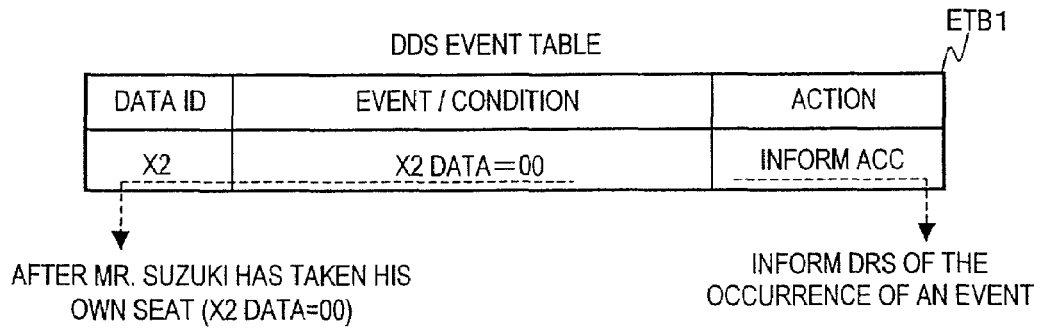
FIG. 31 is a detailed description showing entries in the action table ETB of the distributed data processing server DDS.

Then, the action manager AMG sends an instruction to the distributed data processing server DDS to be the data link pointer corresponding to the model name chosen as described above to monitor the occurrence of an event of "Mr. X taking seat" in order to monitor the occurrence of an event "Mr. X taking his seat" by the distributed data processing server DDS. Upon receipt of the instruction of the action manager AMG of the directory server DRS, as shown in FIG. 31, with regards to the data ID=X2 acquired from the real-world model list MDL, the distributed data processing server DDS registers the condition "00" for taking seat acquired from the attribute interpretation list ATL and the action controller ACC of the directory server DRS registers as the recipient of the notice of an event to be undertaken for an action. Incidentally, the notice to be given to the directory server DRS is an action executed in the distributed data processing server DDS-1. And the action manager AMG sets an action of "IP address: send a pop-up notice to the user terminal UST of A" in the action table ATB shown in FIG. 32, and sets the sensor node ID mentioned above as an ID of the event of executing the action.

In other words, in the event table ETB of the distributed data processing server DDS shown in FIG. 31 the data ID=X2 with a pressure sensor showing "Mr. Suzuki seated" will be set in the data ID column showing the ID of the measured data, the value of X2 data "00" indicating the seating state will be set in the event condition column, and the action of notifying to the action controller ACC of the directory server DRS will be set in the action column of the distributed data processing server DDS-1.

Figure 32:
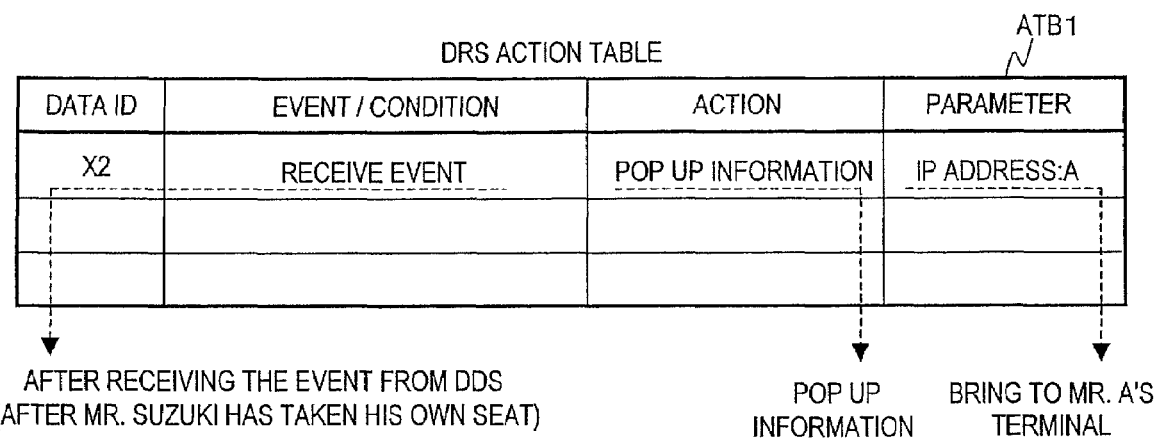
FIG. 32 is a detailed description showing entries in the action table ATB of the directory server DRS.

As is shown in the action table ATB of the directory server DRS shown in FIG. 32, the data ID=X2 indicating that "Mr. Suzuki is seated" will be set in the data ID column showing the event ID of the object of monitoring, the reception of the occurrence of an event from the distributed data processing server DDS-1 will be set in the event condition column, a pop-up notice to the user terminal UST will be set in the action column to be executed by the directory server DRS, and the IP address indicating Mr. A from among the user terminal UST will be set in the action parameters column.

The action to be registered by the action manager AMG in the action table ATB will be, as shown in FIG. 32, conditioned by the reception of the event occurrence of data ID=X2, and the action of a pop-up notice will be set to be sent to the address (here the terminal of the IP address) entered in the parameter column.

On the other hand, the screen for requesting the action setting in FIGS. 28 and 29 is provided by the action receiver ARC of the directory server DRS to the user terminal UST, and the real-world model list MDL is related to the "personal name" pull-down menu, the pull-down menu "seated," "in conference" and "at home" is related with the attribute interpretation list ATL, and the pull-down menu of "pop-up" and "mail" shows the action to be executed by the directory server DRS.

Figure 33:
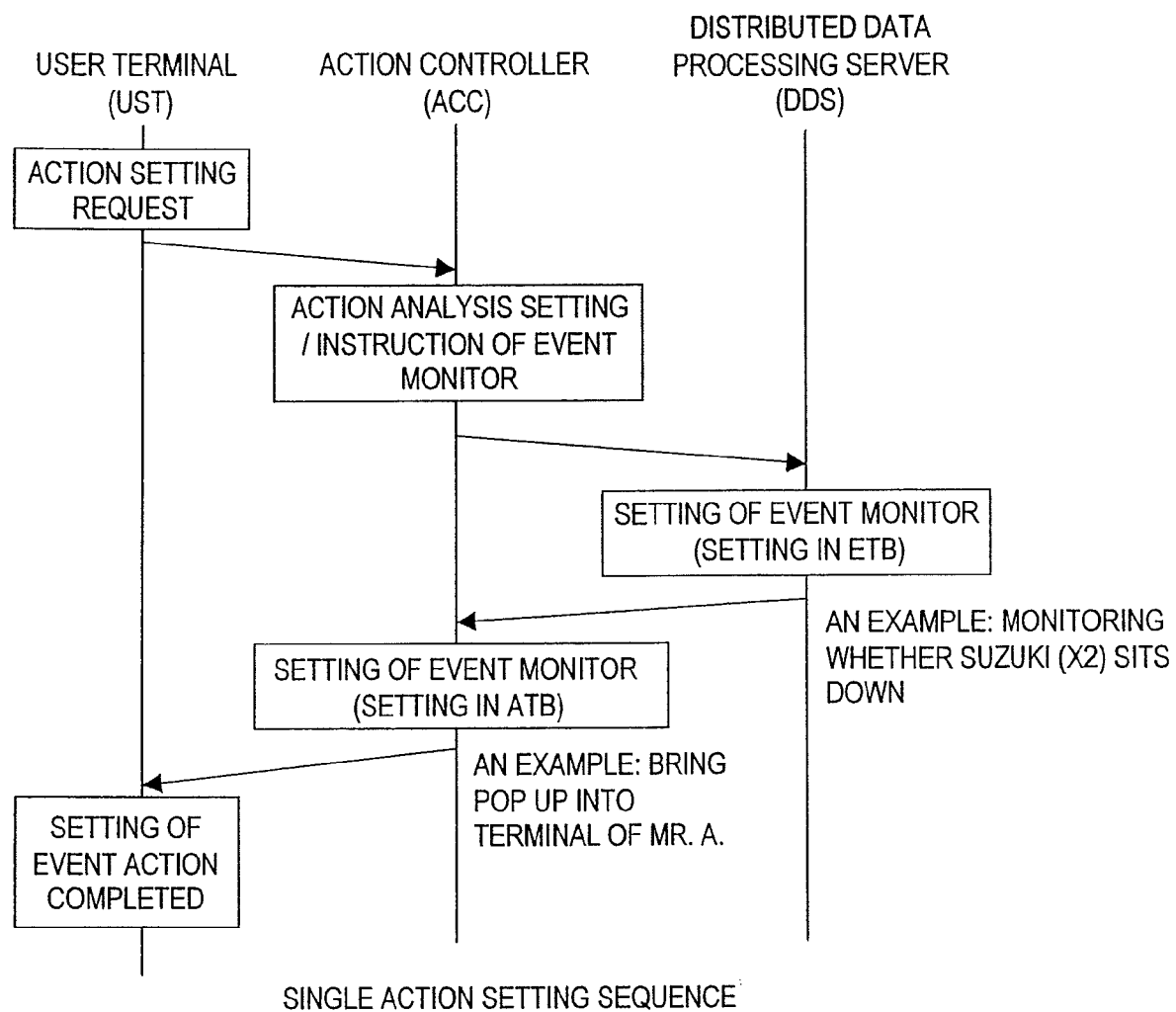
FIG. 33 is a time chart showing the sequence of setting a single action.

A single action to be executed following a single event as described above will be called "a single action," as is shown in FIG. 33. In other words, when a request for an event and action setting with the semantic information that the user can understand is presented by the user terminal UST to the action controller ACC of the directory server DRS, an action analysis and an instruction for monitoring an event, corresponding to the semantic information, are created in the action controller ACC, and an event table ETB will be defined in the event-action controller EAC of the distributed data processing server DDS. Then, the action manager AMG of the action controller ACC instructs the event receiver ERC to monitor the event set above (data ID=X2), and sets the action (pop-up notice) requested by the user to the action table ATB. By this action, the action controller ACC informs the user terminals UST that a series of action settings have been completed.

<Execution of Actions>

Figure 34:
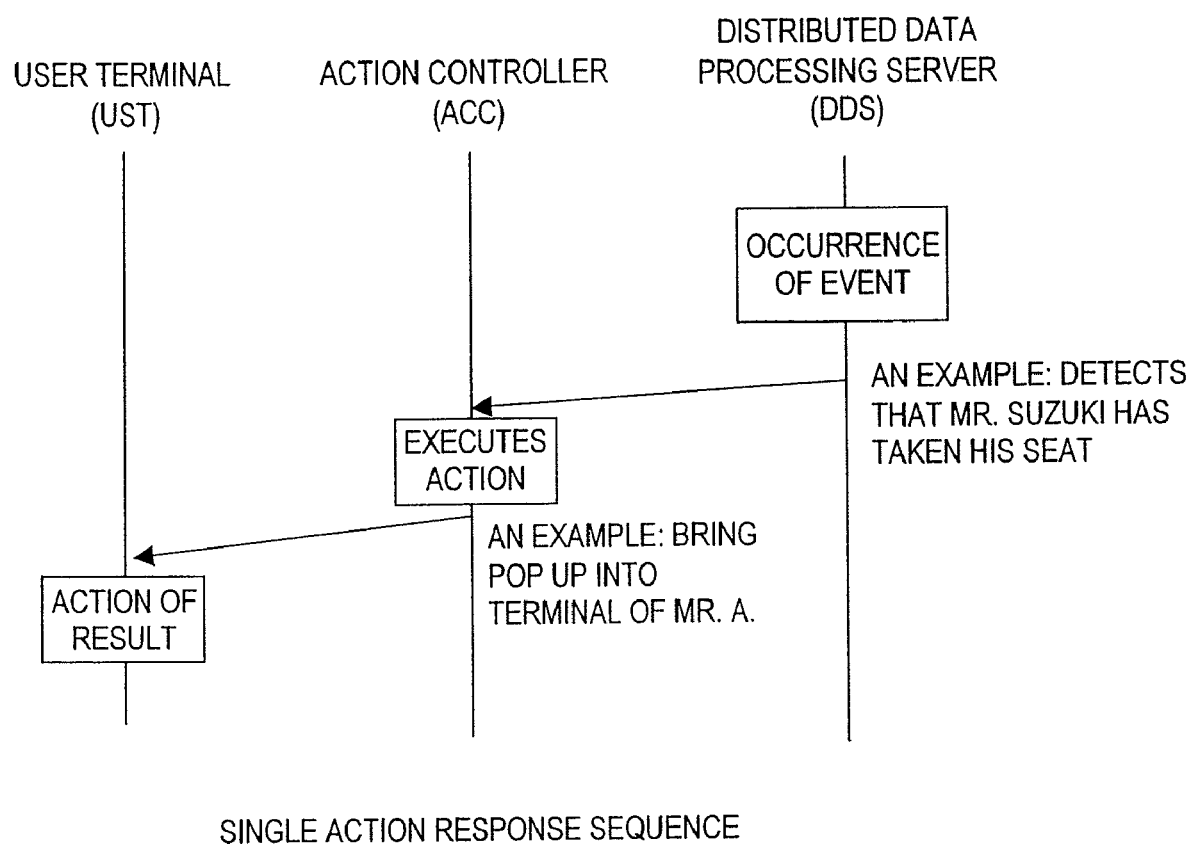
FIG. 34 is a time chart showing the sequence of responding a single action.
Figure 37:
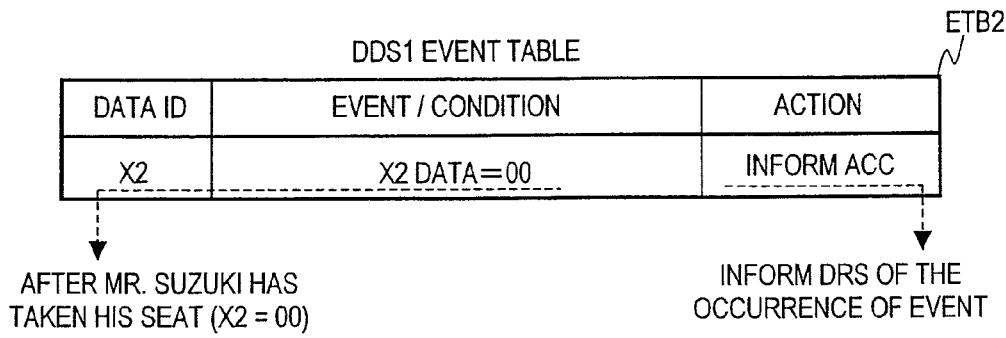
FIG. 37 is a detailed description showing entries in the event table of the distributed data processing server DDS-1.

FIG. 34 is a time chart showing the execution of single actions set in FIGS. 28 and 29 above.

When the measured data value of the sensor nodes monitored changes to "00", which is the conditions of event occurrence meaning that Mr. X has taken seat has been determined, the distributed data processing server DDS-1 generates an event notice relating to the data ID=X2.

This event occurrence will be notified by the distributed data processing server DDS to the directory server DRS and will be received by the even receiver ERC shown in FIG. 26.

The action manager AMG of the directory server DRS retrieves the action table ATB shown in FIG. 32 from the event ID received and judges whether there is any pertinent action or not. As the ID=X2 event received is defined in the action table ATB, the action manager AMG informs the action executer ACEC on the action and parameters of the action table ATB.

The action executer ACEC executes processing corresponding to a definition based on the notice instructed by the action manager AMG. In this case, the action executer ACEC sends a pop-up notice to the user terminal UST having an IP address A that is designated by the action manager AMG. The pop-up notice is sent to the user UST with IP address A enabling to confirm that Mr. X has taken his seat.

<Setting and Execution of Action From Plural Events>

FIGS. 29, 30 and 34 describe the case of taking an action for an event that has occurred. However, as shown in FIGS. 35 to 41, it is possible to set the case of taking an action when two events have occurred.

FIGS. 35 and 36 are screens for requesting the setting for an action triggered by plural events occurrence. In this screen for requesting setting, a pull-down menu wherein the state of "being seated" and the like for two personal name columns can be chosen is defined. The conditions for the event corresponding these two personal names are, like FIGS. 28 and 29 above, related with the real-world model list MDL and the attribute interpretation list ATL of the real-world model table MTB.

Moreover, a pull-down menu for setting the Boolean expression (AND, OR) of the event conditions of these two persons will be added.

Just like the single action mentioned above, the action to be executed by the directory server DRS (pop-up notice, mail transmission) and the parameters column (address and the like) required for the execution of the actions will be set.

Here, we will describe the case of action of sending Email when the event of the distributed data processing server DDS-1 of "Mr. Suzuki taking seat" has occurred and the event of the distributed data processing server DDS-2 of "Mr. Tanaka taking seat" has also occurred.

To begin with, the event of "Mr. Suzuki taking seat" will be set in the same way as FIGS. 29 and 30 above, and the event shown in FIG. 37 will be set in the event table ETB of the distributed data processing server DDS-1 which monitors the taking seat of Mr. Suzuki. The time chart of setting the action table at this time will be shown in FIG. 40.

Figure 38:
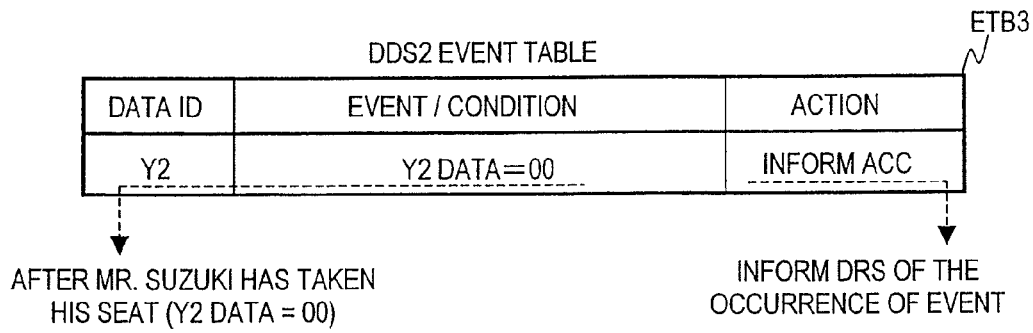
FIG. 38 is a detailed description showing entries in the event table of the distributed data processing server DDS-2.

Then, with regard to the event of "Mr. Tanaka taking seat," like FIGS. 29 and 30 shown above, the data ID=Y2 for detecting Mr. Tanaka's taking seat will be set in the data ID column, and "00" showing the taking seat from the attribute interpretation list ATL will be the condition of the event, and the action of informing the action controller ACC of the directory server DRS when this event condition has been met will be set in the event table ETB of the distributed data processing server DDS-2 as shown in FIG. 38.

Figure 39:
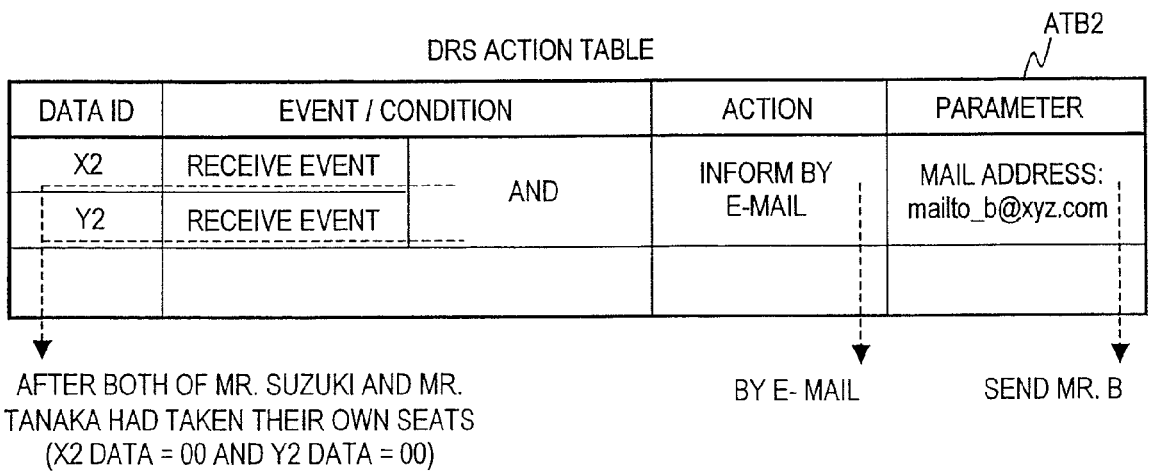
FIG. 39 is a detailed description showing entries in the action table of the directory server DRS.

In the action controller ACC of the directory server DRS, as shown in FIG. 39, two conditions will be combined by the Boolean expression of "AND" in the action table ATB and will be set.

Regarding the two conditions of the action table ATB combined by "AND," "Email transmission" will be set in the action column and the address of the addressee (Mr. B's Email address) will be set in the parameter column.

Figure 40:
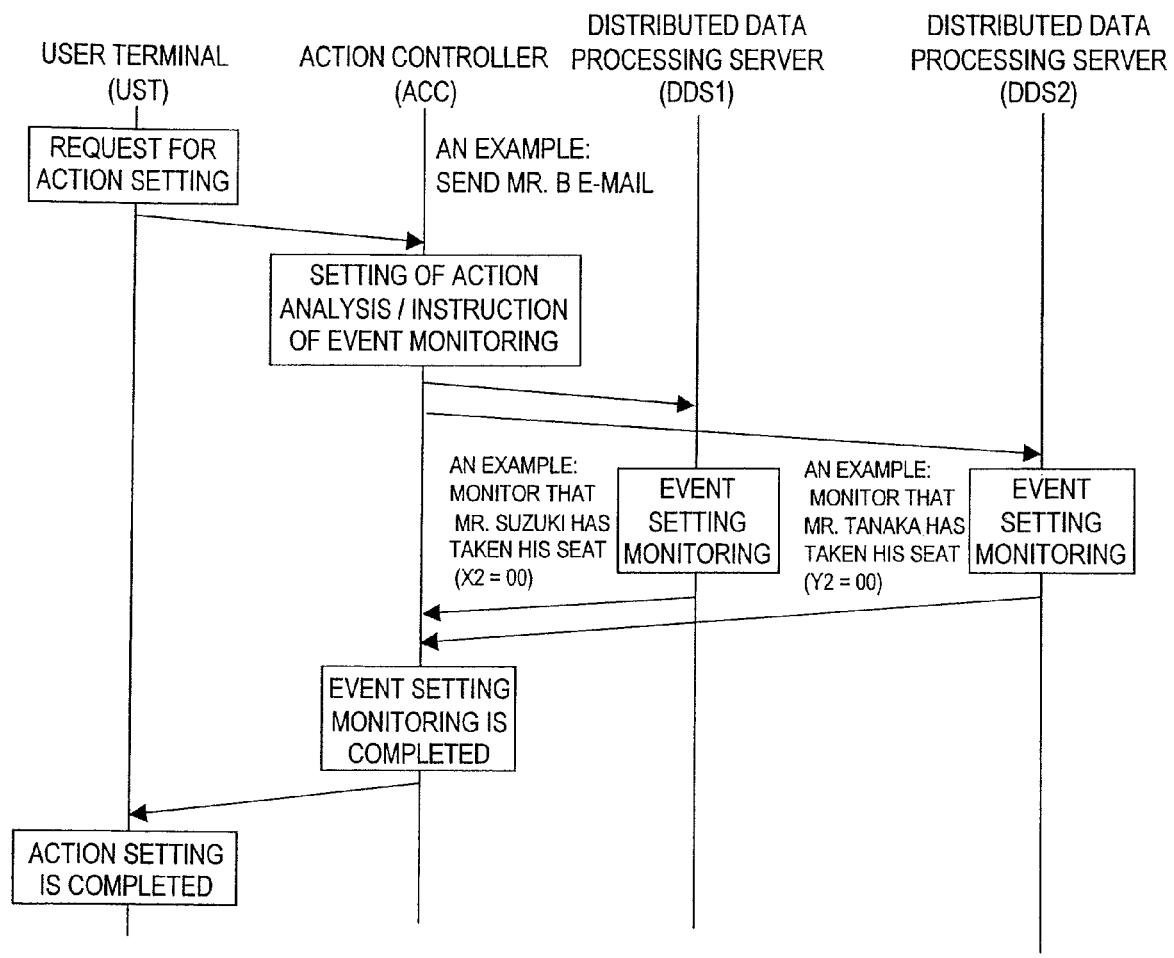
FIG. 40 is a time chart showing the sequence of setting a single action with plural events.

In the time chart in FIG. 40, like FIG. 33 above, requests for setting the action related with Mr. Suzuki's seating and Mr. Tanaka's seating are presented from the user terminal UST to the action controller ACC, and a request for setting is presented from the event monitor instructor EMN to the distributed data processing server DDS-1 to inform the event when the measured data of the sensor node with a data ID=X2 has satisfied the prescribed condition (Mr. Suzuki taking place), and a request for setting is presented from the event monitor instructor EMN to the distributed data processing server DDS-2 to inform the event when the measured data of the sensor node with a data ID=Y2 has met the prescribed condition (Mr. Tanaka taking place).

In the distributed data processing servers DDS-1 and 2, new events are added to the respective event table ETB, and the event condition parser EVM of each distributed data processing server DDS-1 and 2 start monitoring events for the measured data.

In the action manager AMG of the action controller ACC, the event receiver ERC is instructed to monitor the events with data ID=X2 and Y2 and the setting action is completed.

Figure 41:
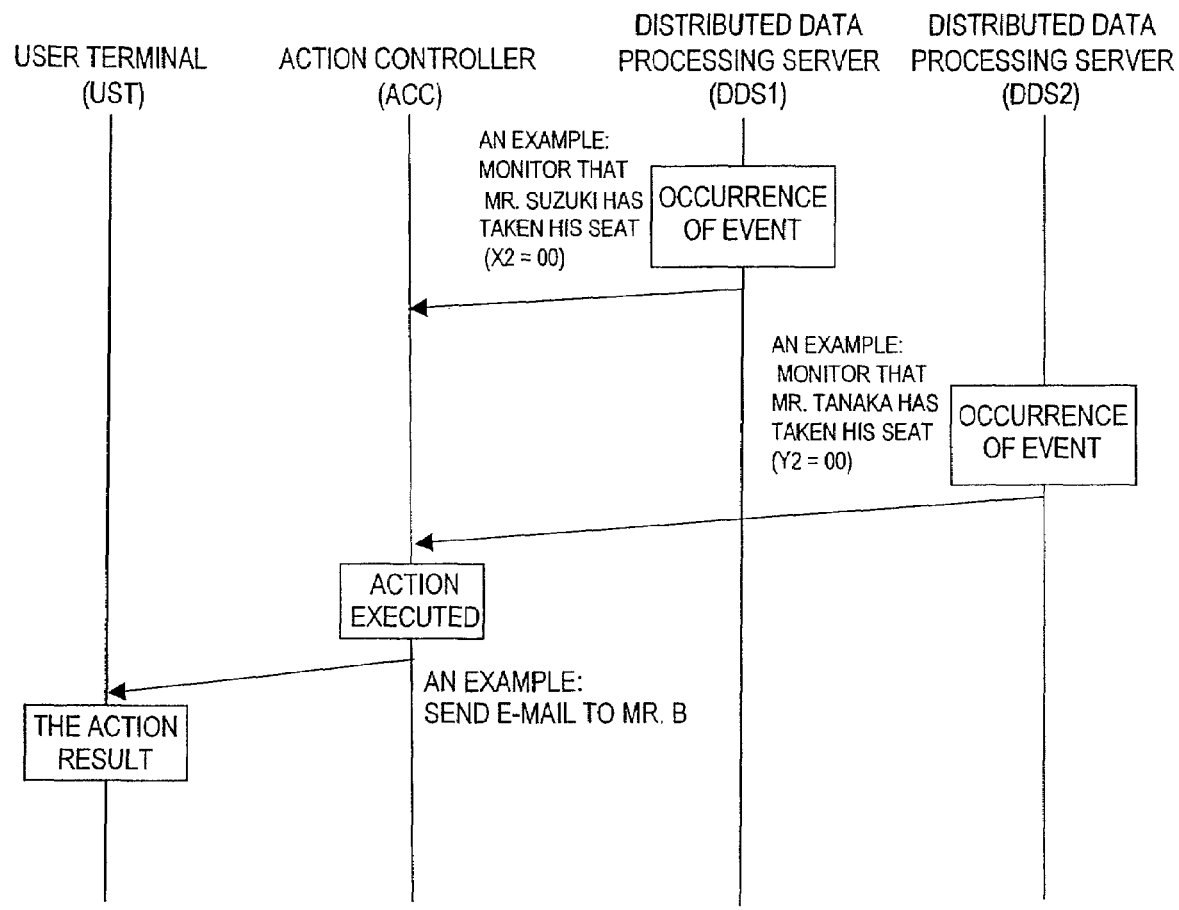
FIG. 41 is a time chart showing the sequence of responding a single action with plural events.

Then, FIG. 41 is a time chart showing how the actions are executed.

At the beginning, the distributed data processing server DDS-1 generates the events of data ID=X2 as Mr. Suzuki takes his seat. While the action controller ACC receives the event with data ID=X2, the action table ATB, being unable to execute any action until Mr. Tanaka takes his seat, withholds any relevant action.

Then, the distributed data processing server DDS-2 generates the events of data ID=Y2 as Mr. Y takes his seat. The action controller ACC receives the event of the data ID=Y2, and as the AND condition of the data ID=X2 and Y2 is satisfied in the action table ATB, the action is executed and the Email is transmitted to the predetermined mail address.

In this way, actions can be executed on the condition that plural events occur, and responses necessary for the user can be obtained from a large number of sensors. Accordingly, even if there are a huge number of sensor nodes, the users can detect almost in real time the desired information (or changes in information) and the information of the sensor nodes can be used effectively.

Second Embodiment

FIGS. 42 to 46 show a second embodiment, indicating how single actions are executed in the distributed data processing servers DDS. An action executer ACE is added to the event action controller EAC of the distributed data processing server DDS in FIG. 9, the event table ETB shown in FIG. 9 is replaced by the event action table EATB. The rest of the structure is the same as the first embodiment. The event-action table EATB is a combination of the event table ETB of the first embodiment and the action table ATB.

Figure 42:
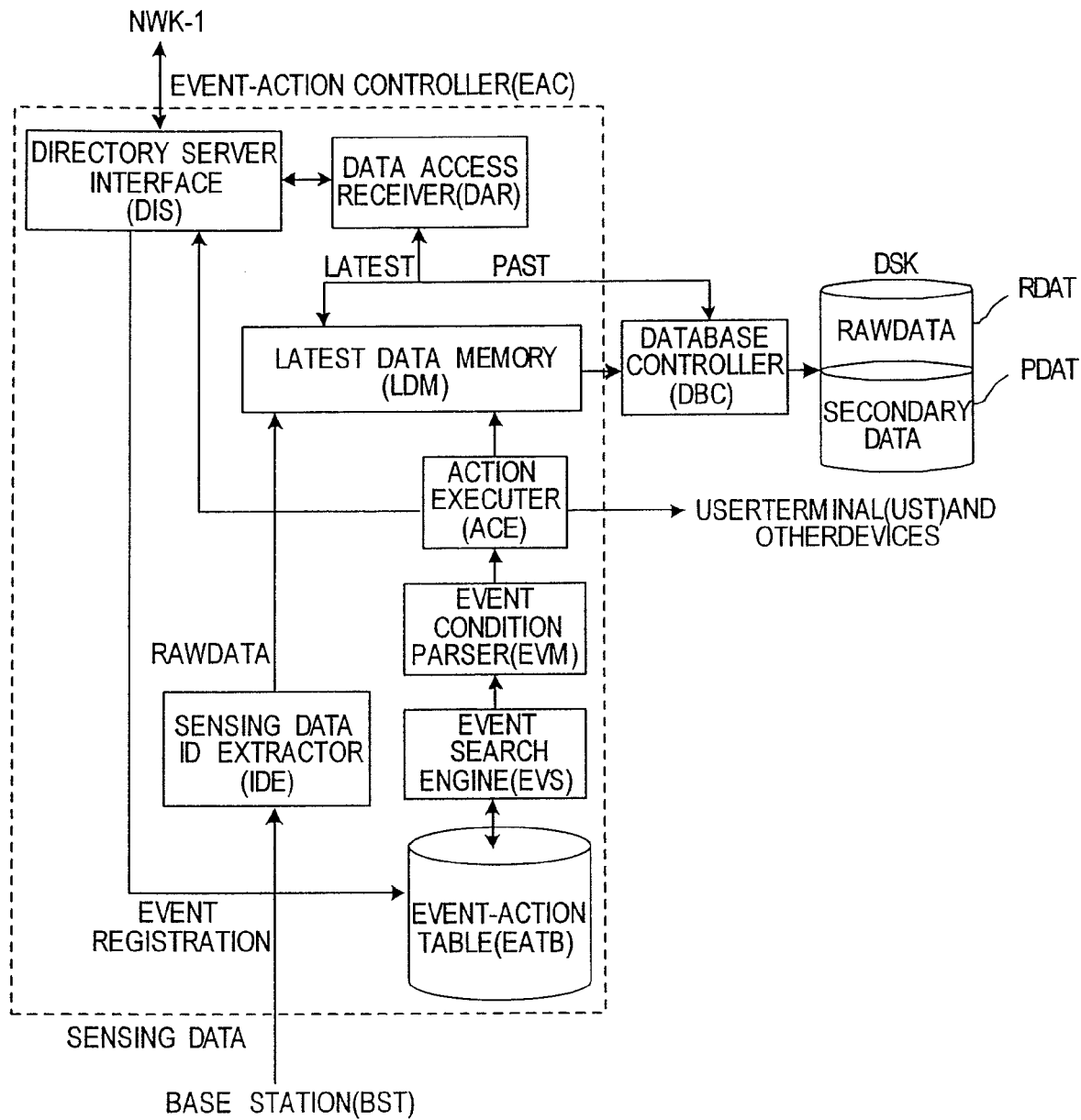
FIG. 42 is a block diagram showing the event-action controller EAC of the distributed data processing server DDS representing the second embodiment.

In FIG. 42, the event action controller EAC of the distributed data processing server DDS includes an event action table EATB for relating the measured data collected from the base stations BST with the events and actions through the directory server interface DSI.

As FIG. 44 shows, each record of the event-action table EATB includes data ID given to the measured data allocated to each sensor node, an event contents column indicating the conditions on the measured data for generating events, an action column indicating the details of the action executed by the distributed data processing server DDS when an event occurs, a parameter column for storing the values necessary for executing an action, a data holder DHL for determining whether the measured data will be stored in the database DB or not when an event occurs.

For example, in the figure, the measured data having data ID=X1 are set in such a way that when their value is "02", Email will be transmitted to the address specified in the parameter column. The measured data will not be written in the disk drive DSK even if the condition is met when an event occurs.

The following describes the function of the event-action controller EAC shown in FIG. 42. Measured data received from the base station BST gets the data ID extracted in the sensing data ID extractor IDE. At the same time, the sensing data ID extractor IDE sends the measured data to the latest data memory LDM.

The extracted data ID will be sent to the event search engine EVS. The event search engine EVS searches the event action table EATB. If a record whose data ID matches is found, the EATB sends the event entry of the record and the parameter to the event condition parser EVM.

The event condition parser EVM compares the value of measured data and the event entry EVT, and if they meet the conditions they will be sent to the action executer ACE.

The action executer ACE reads the content of the action set in the event-action table EATB to execute predetermined processing such as writing data into the DB controller DBC (or disk DSK), notifying the user terminal UST, and performing operations on measured data.

The database controller DBC will write, of the measured data of which events occurred, the data whose data holder DHL is YES in the event action table EATB in the disk drive DSK.

The data access receiver DAR is similar to the embodiment 1 described above, and if the access request is for the latest data, it will read the measured data matching the data ID contained in the access request from the latest data memory LDM and return the same to the network processor NWP.

Figure 45:
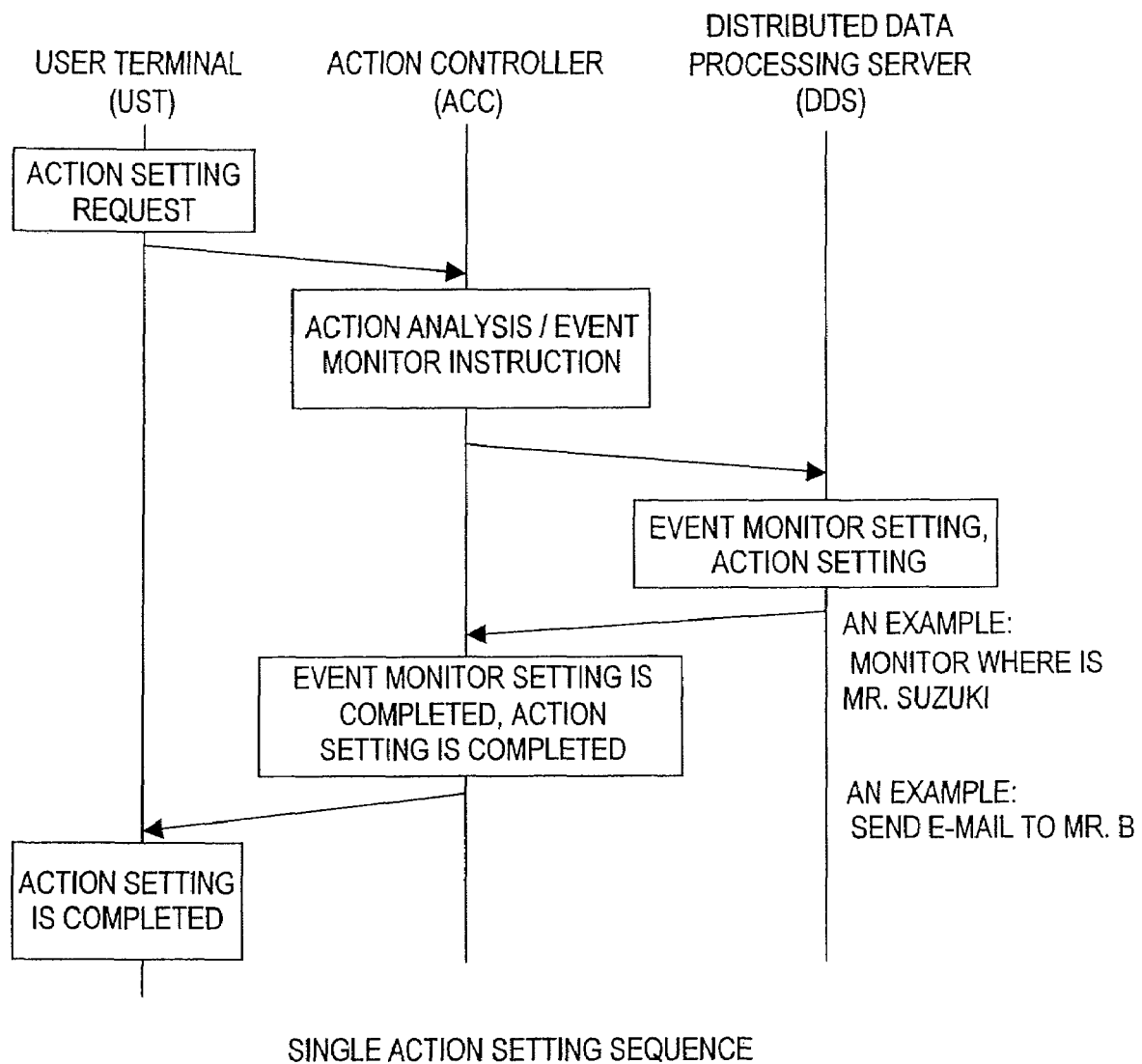
FIG. 45 is a time chart showing the sequence of setting event actions.

FIG. 45 shows a time chart for setting actions in the distributed data processing server DDS and FIG. 43 shows an example of interface sent by the action controller ACC of the directory server DRS to the user terminal UST for setting actions. Incidentally, at the time of setting a single action, the directory server DRS communicates with the distributed data processing servers DDS and sets the request for setting actions received from the user terminals UST to the distributed data processing server DDS corresponding to the data ID designated.

To begin with, the user (or the service manager) accesses the action controller ACC of the directory server DRS from the user terminal UST and the like and requests to set actions. As an example of actions, we will examine the case of, as FIG. 29 shows, setting actions of monitoring the position of Mr. X and upon his entry into the meeting room A, sending a pop-up notice to the user terminal UST with an IP address: A.

Upon receipt of this request for setting action, the action receiver ARC of the action controller ACC requests the action analyzer AAN to set the action. The action analyzer AAN chooses the data ID of the sensor node of the object of monitoring from, for example, Mr. X's position, and decides in which condition of the measured data of the sensor node the event will occur. Here, in order to convert the real-world event of "Mr. X taking his seat" into a data ID of a sensor node, it will search the model of "Mr. X taking his seat" by referring to the real-world model list MDL and the attribute interpretation list ATL (semantic information management table) of the real-world model table MTB.

Here, as shown in FIG. 31, if Mr. X=Mr. Suzuki, the model has already been defined in the real-world model table MTB, the information link pointer for storing the data ID=X2 and the data (distributed data processing server DDS1) will be acquired from the lists mentioned above MDL and ATL.

Then, the action manager AMG judges whether the request presented by the user terminal UST is for a single action or not, and if it is for a single action, it will set in such a way that the requested action requested may be executed in the distributed data processing server DDS which holds the information mentioned above.

To generate the event of the "location of X" and action in the distributed data processing server DDS, a command to generate the event that the "location of X" is a "meeting room A" is issued to the distributed data processing server DDS that manages the above-mentioned selected sensor node. And the action controller ACC of the directory server DRS sets the action of "sending Email to the user with a mail address: mailto_b@xyz.com" in the event-action table EATB in the distributed data processing server DDS, and sets the data ID of the sensor node mentioned above as the event ID for executing the action.

The distributed data processing server DDS having received the instruction from the action manager AMG of the directory server DRS registers, as shown in FIG. 44, the condition "02" for the meeting room A acquired from the attribute interpretation list ATL relating to the data ID=X1 acquired from the real-world model list MDL and the Email address mentioned above for the recipient of the action.

The action of registering by the action manager AMG in the distributed data processing server DDS will be set, as shown in FIG. 43, in such a way that the action of sending Email may be executed to the address entered in the parameter column when the event whose data ID=X1 occurs.

Thus, when the user terminal UST presents a request for setting a single action, the action controller ACC of the directory server DRS sets values on the corresponding distributed data processing server DDS instead of setting values in its own action table ATB so that both events and actions may be set in the event-action table EATB of the distributed data processing server DDS.

Figure 46:
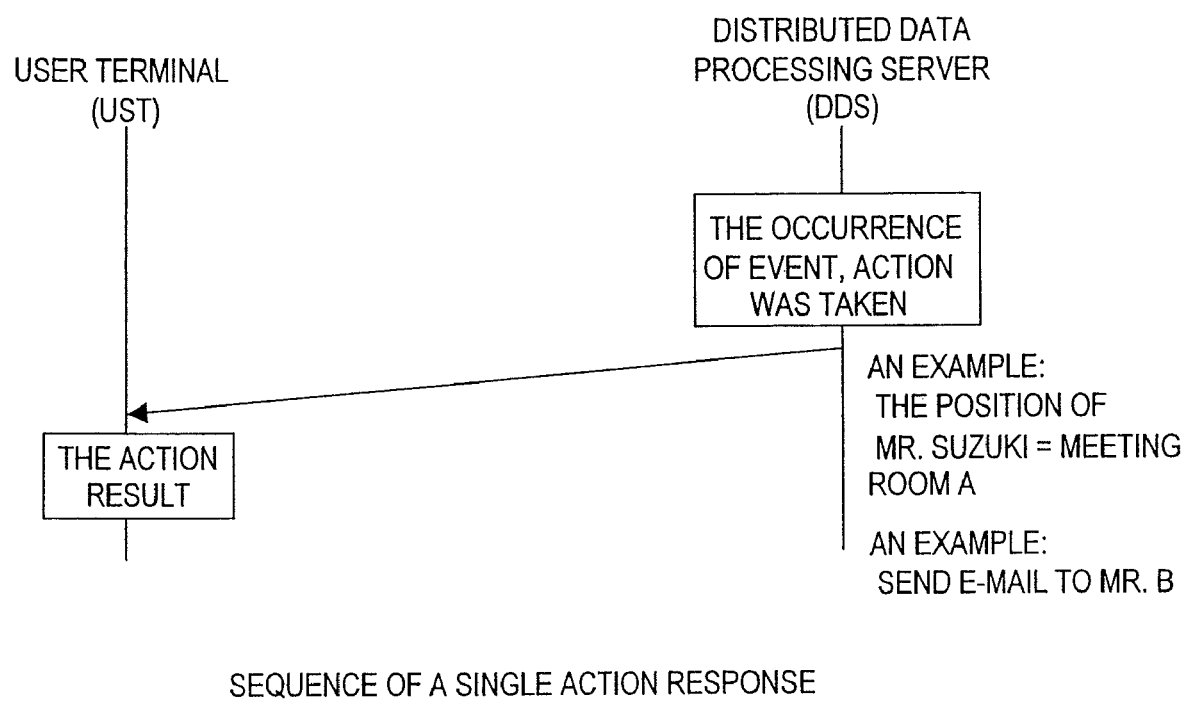
FIG. 46 shows a second embodiment and is a timing chart showing the flow of action execution in a distributed data processing server DDS.

The events and actions will be executed in the distributed data processing server DDS as shown in FIG. 46. When Mr. X enters the meeting room, the value whose data ID=X1 will be "02" and the event occurrence defined in the event-action table EATB shown in FIG. 44 will be monitored and the resulting actions will be taken. As a result of the execution of the action, the entry of Mr. X into the meeting room A will be notified to the prescribed Email address.

In this case, the directory server DRS only sets actions to the distributed data processing server DDS, and it is not necessary to monitor the actual occurrence of events. Accordingly, the collection of data and the execution of single action may be entrusted to the distributed data processing servers DDS, and the directory server DRS only does tasks such as monitoring the request for retrieval and plural actions with plural events from the user terminals UST. Therefore, when the number of sensor nodes is very large, it is possible to prevent the overloads of the directory server DRS and to operate the sensor network smoothly.

In the above-mentioned second embodiment, an example of setting events and actions in the event-action table EATB of the distributed data processing server DDS is shown. However, an event table that stores events, and an action table that stores actions may be made independent of each other.

Third Embodiment

FIGS. 47 to 53 show a third embodiment. In this embodiment, secondary data outputted from the action executer ACE of the distributed data processing server DDS of the second embodiment is inputted to the sensing data ID extractor IDE, and a next event and action are continuously executed in one distributed data processing server DDS, based on the secondary data. The third embodiment is the same as the second embodiment in other constructions.

Figure 47:
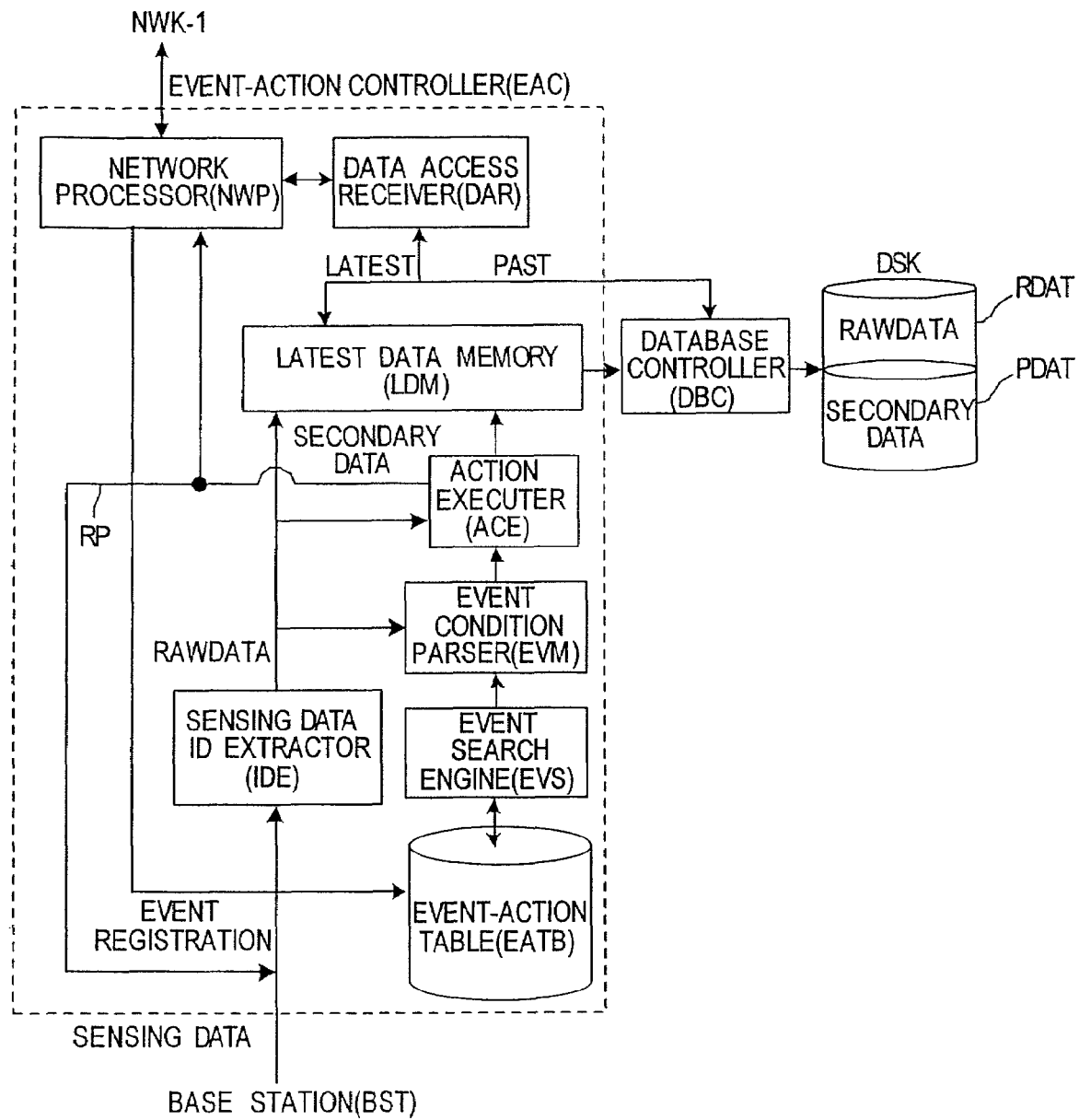
FIG. 47 shows a third embodiment and is a block diagram showing an event-action controller of a distributed data processing server DDS.
Figure 48:
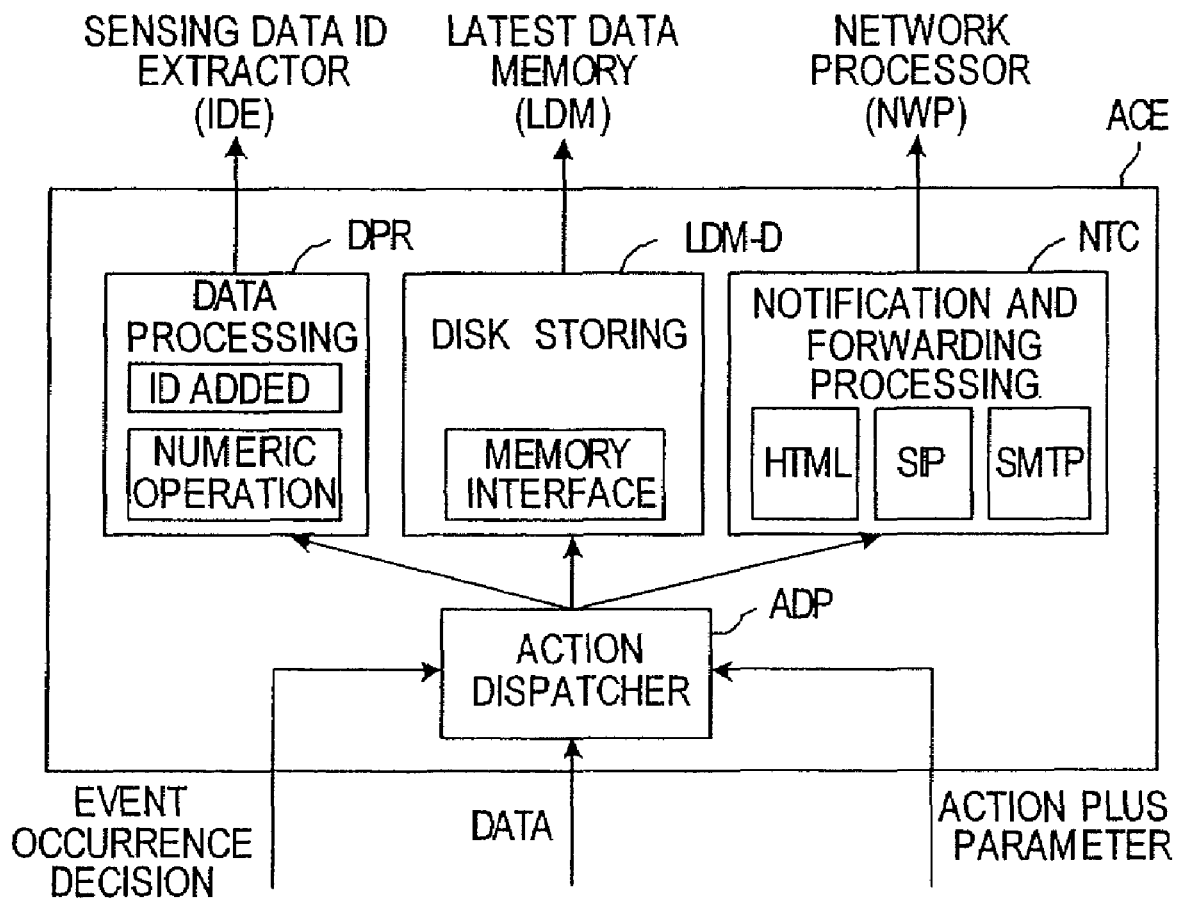
FIG. 48 shows the third embodiment and is a block diagram of an action executer ACE of an event-action controller.

The action executer ACE constituting the event-action controller EAC is constructed as shown in FIG. 48. In FIG. 48, the action executer ACE includes: an action dispatcher ADP that receives event occurrence notification from the event condition parser EVM of FIG. 47, measured data (raw data, secondary data) from the sensing data ID extractor IDE, and action and parameter from the event-action table EATB, and issues commands to other processors described later; a notification and forwarding processor NTC that performs communication with a user terminal and the like as action; a disk storing processor LDM-D that stores data in a latest data memory LDM and disk DSK as action; and a secondary data processor DPR that processes data as action.

The notification and forwarding processor NTC includes protocol controllers corresponding to the content of action, to perform pop-up notification and Email transmission to the user terminal UST and the like. For example, it performs pop-up notification and data forwarding by SIP, transmits Email by SMTP, and transmits HTML data by HTTP.

The disk storing processor LDM-D includes a memory interface for accessing the latest data memory LDM, and writes data to the latest data memory LDM. Moreover, based on the setting of the event-action table EATB, it stores data written to the latest data memory LDM in a disk DSK through the DB controller DBC.

The secondary data processor DPR performs an operation specified in parameters and the like on data from the sensing data ID extractor IDE and generates secondary data. It adds a data ID to the secondary data.

Output of the secondary data processor DPR is connected to the sensing data ID extractor IDE by the loop-back path RP shown in FIG. 47. Secondary data processed in the secondary data processor DPR is subjected to event-action processing just like measured data (raw data) from a sensor node.

On receiving event occurrence notification from the event condition parser EVM, the action dispatcher ADP receives the data in which the event occurs from the sensing data ID extractor IDE, and reads action and parameter corresponding to the data ID, and information indicating whether to store the data in a disk.

The command and data of the action dispatcher ADP are inputted to the secondary data processor DPR, forwarding processor NTC, and disk storing processor LDM-D. Data or a parameter is transmitted to these processors in accordance with the content of action set in the event-action table EATB.

As shown in FIG. 47, the action executer ACE of the distributed data processing server DDS, when a new action is data processing, performs specified data processing in the above-mentioned secondary data processor DPR, and adds a data ID to the processing result before input to the sensing data ID extractor IDE. Since different processors of the action executer ACE are independent of one another, it can perform plural actions at the same time.

Figures 49, 50:
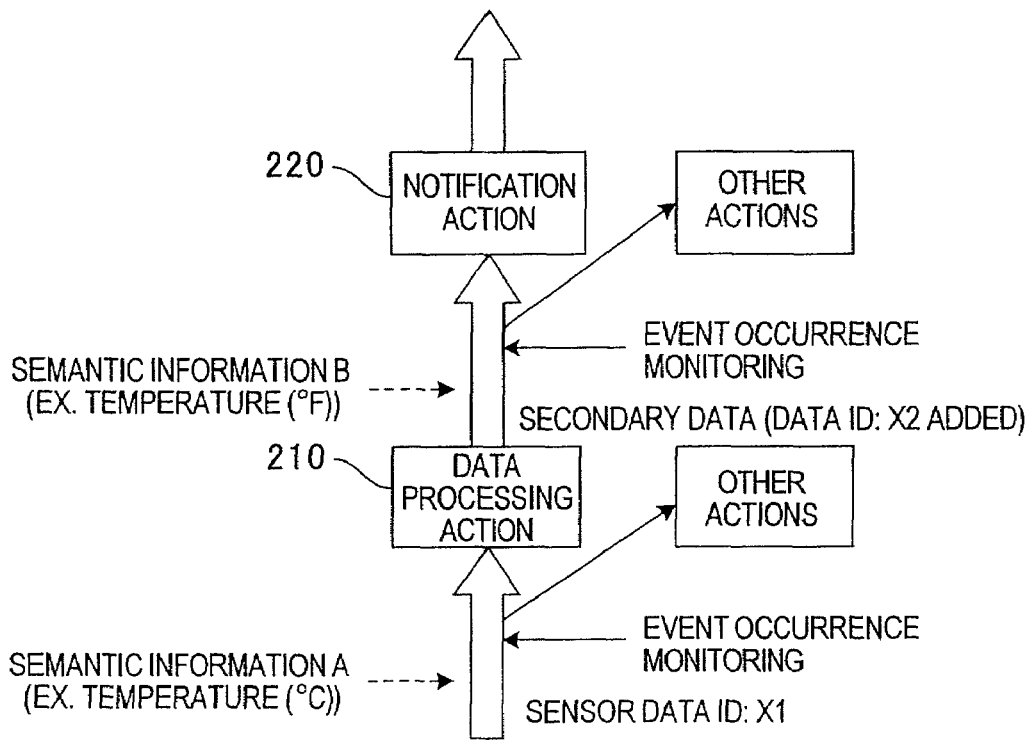
FIG. 49 shows a third embodiment and is an explanatory diagram illustrating the flow of executing events and actions in a chain from the occurrence of one event.
FIG. 50 shows a third embodiment and is an explanatory diagram illustrating an example of an event-action table.

By this construction, as shown in FIG. 49, plural actions can be executed in a chain beginning with one action (event occurrence) to process measured data or further process secondary data.

In FIG. 49, for example, with a sensor node as a temperature sensor, a secondary data action 210 that converts measured data of data ID=X1 from Centigrade scale into Fahrenheit scale and adds a new data ID=X2, and a notification action 220 that performs notification processing based on secondary data converted into Fahrenheit scale can be continuously performed in one distributed data processing server DDS.

When the processing shown in FIG. 49 is performed, an event-action table EATB is set, for example, as shown in FIG. 50.

The event-action table EATB of the third embodiment is provided with plural action fields corresponding to the number of processors (secondary data processor DPR, notification and forwarding processor NTC, and disk storing processor LDM-D) of the action executer ACE, and plural actions can be defined for one data ID. In FIG. 50, three action fields—secondary data processing, data forwarding processing, and notification processing—are provided. Each action field is provided with an optional parameter field to store a parameter required for action execution.

As an example of processing of FIG. 49, in an entry of data ID=X1 of FIG. 50, data arrival (receive) is set as event condition, and the action field of data processing is specified so that when measured data is received from a sensor node, the unit of the measured data is converted from Centigrade temperatures into Fahrenheit temperatures. As an option of data processing of the unit conversion, the parameter field is set so as to specify the data ID of secondary data newly generated as "X2."

As action performed after the data processing, "loop-back" is set in the forwarding field so that produced secondary data is inputted to the data ID extractor IDE. In the case of loop-back, since a forwarding destination is the distributed data processing server DDS, the parameter field in the forwarding field is blanked (a forwarding destination does not need to be specified). Since notification processing is not performed in the event action of data ID=X1, the notification processing field is blanked.

By this entry, in the distributed data processing server DDS, when measured data of data ID=X1 is received, as event occurrence and action, unit conversion from Centigrade scale to Fahrenheit scale is performed to produce secondary data of data ID=X2 and input it to the data ID extractor IDE.

Next, the entry of the produced secondary data is set in the event-action table EATB as data ID=X2. An example of event condition is that when the value of data (Fahrenheit) inputted from the action executer ACE exceeds 60, an event is generated. As action executed based on this event occurrence, Email notification is set in the notification processing field. The address of Email notification destination is set in the parameter field of the notification processing field. The content of Email is set in advance; for example, "Temperature is too high" is set.

By this entry, in the distributed data processing server DDS, when secondary data of data ID=X2 is inputted to the ID extractor IDE, if the value of the data exceeds 60° F., the action to transmit Email to a specified notification destination is performed.

By the above-mentioned two entries, as shown in FIG. 49, on receiving Centigrade measured data, the distributed data processing server DDS generates secondary data converted into Fahrenheit, and further can perform the indicated action based on the value of the secondary data. That is, if the measured data received by the distributed data processing server DDS is defined as primary data, and secondary data generated based on the primary data as secondary data, the distributed data processing server DDS generates secondary and tertiary data from the primary data in the event-action table EATB, and can perform forwarding and notification processing for the individual data in parallel.

Figures 51, 52:
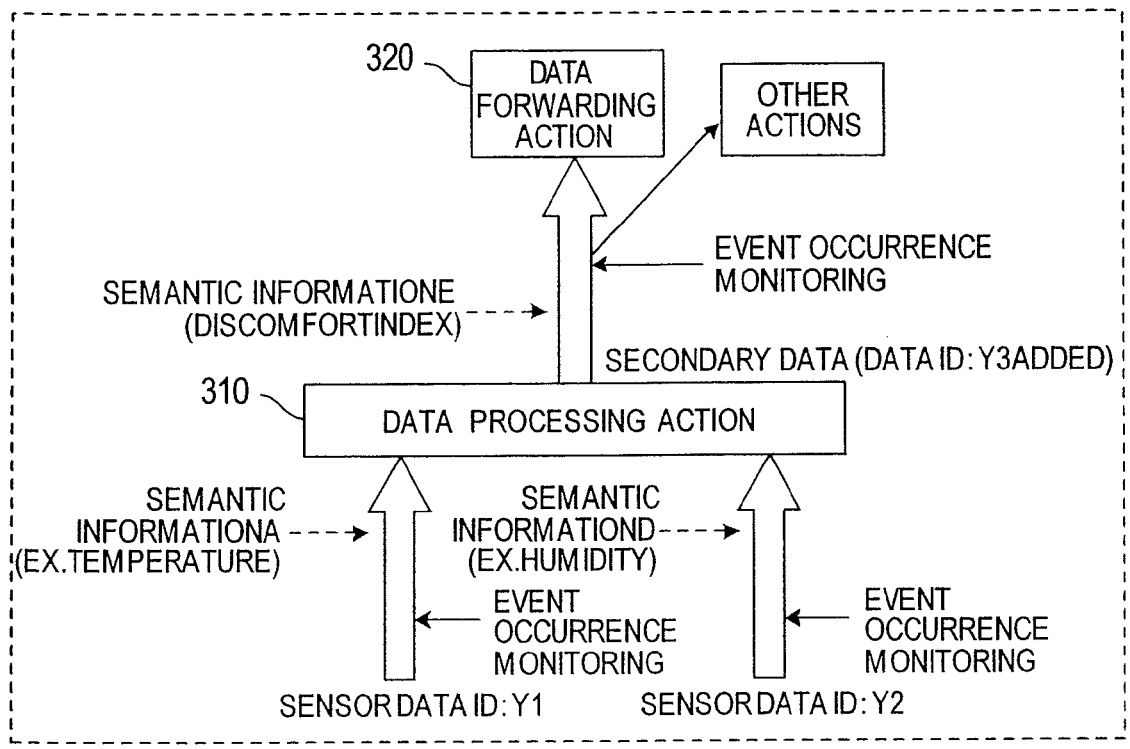
FIG. 51 shows a third embodiment and is an explanatory diagram illustrating the flow of generating secondary data from plural pieces of measured data.
FIG. 52 shows a third embodiment and is an explanatory diagram illustrating an example of an event-action table at the time of generation of secondary data from plural pieces of measured data.

An example of executing events and actions from one piece of measured data in a chain has been described above. As shown in FIGS. 51 and 52, one distributed data processing server DDS can generate secondary data (secondary data) from plural pieces of measured data (primary data).

For example, in FIG. 51, discomfort index can be generated from output of a temperature sensor and a humidity sensor. Data ID=Y1 is measured data whose semantic information A is temperature, and data ID=Y2 is measured data whose semantic information D is humidity. On receiving these measured data, the distributed data processing server DDS generates secondary data Y3 whose semantic information E is discomfort index from the measured data of temperature and humidity (data processing action 310), and further forwards the secondary data Y3 (data forwarding action 320).

As an example of the processing of FIG. 51, the event-action table EATB is set as shown in FIG. 52. In the entry of data ID=Y1, data arrival (receive) is set in the event condition field, and the data processing field of the action field is specified so that if measured data indicating temperature is received from a sensor node, the measured data is held. The data holding denotes updating the value of the latest data memory LDM each time measured data Y1 arrives.

In the entry of data ID=Y2 indicating humidity, data arrival (receive) is set in the event condition field, and the data processing field is specified so that if measured data indicating humidity is received from a sensor node, the measured data Y1 indicating temperature and the measured data DY2 indicating humidity are added to generate secondary data indicating discomfort index as data ID=Y3. Furthermore, loop-back is set in the forwarding field.

In the entry of data ID=Y3 indicating discomfort index, data arrival (input) is set in the event condition field, and the forwarding field is specified so that if secondary data indicating discomfort index is received, the secondary data Y3 is forwarded to the destination IP address "B."

By setting the event-action table EATB as described above, secondary data can be obtained from plural pieces of measured data (primary data), and further events and actions can be executed based on the secondary data (secondary data).

Thus, in the event-action table EATB, ID (data ID) of a virtual sensor node is added to processed data, and an event action is defined for the ID of the virtual sensor node. By inputting (looping back) the output of the action executer AEC to the sensing data ID extractor IDE, plural actions can be executed in a chain from one piece of measured data to obtain secondary and tertiary data, or perform other processing.

By this construction, in one distributed data processing server DDS, since plural actions can be executed based on the reception of measured data, it does not need to issue an inquiry to the directory server DRS each time an event occurs, and can perform processing independently of other distributed data processing servers DDS. As a result, the directory server DRS and the network NWK-1 can be further reduced in load. In short, even in a sensor network that includes a lot of distributed data processing servers DDS, the load on communications between the directory server DRS and the distributed data processing servers DDS can be reduced, and at the same time the load (traffic) on the network NWK-1 can be reduced, so that a large-scale sensor network can be smoothly managed.

The processing of FIG. 51 can be performed jointly by plural distributed data processing servers DDS. For example, as shown in FIG. 53, each of three distributed data processing servers DDS-1 to DDS-3 may perform one event action.

Figure 53:
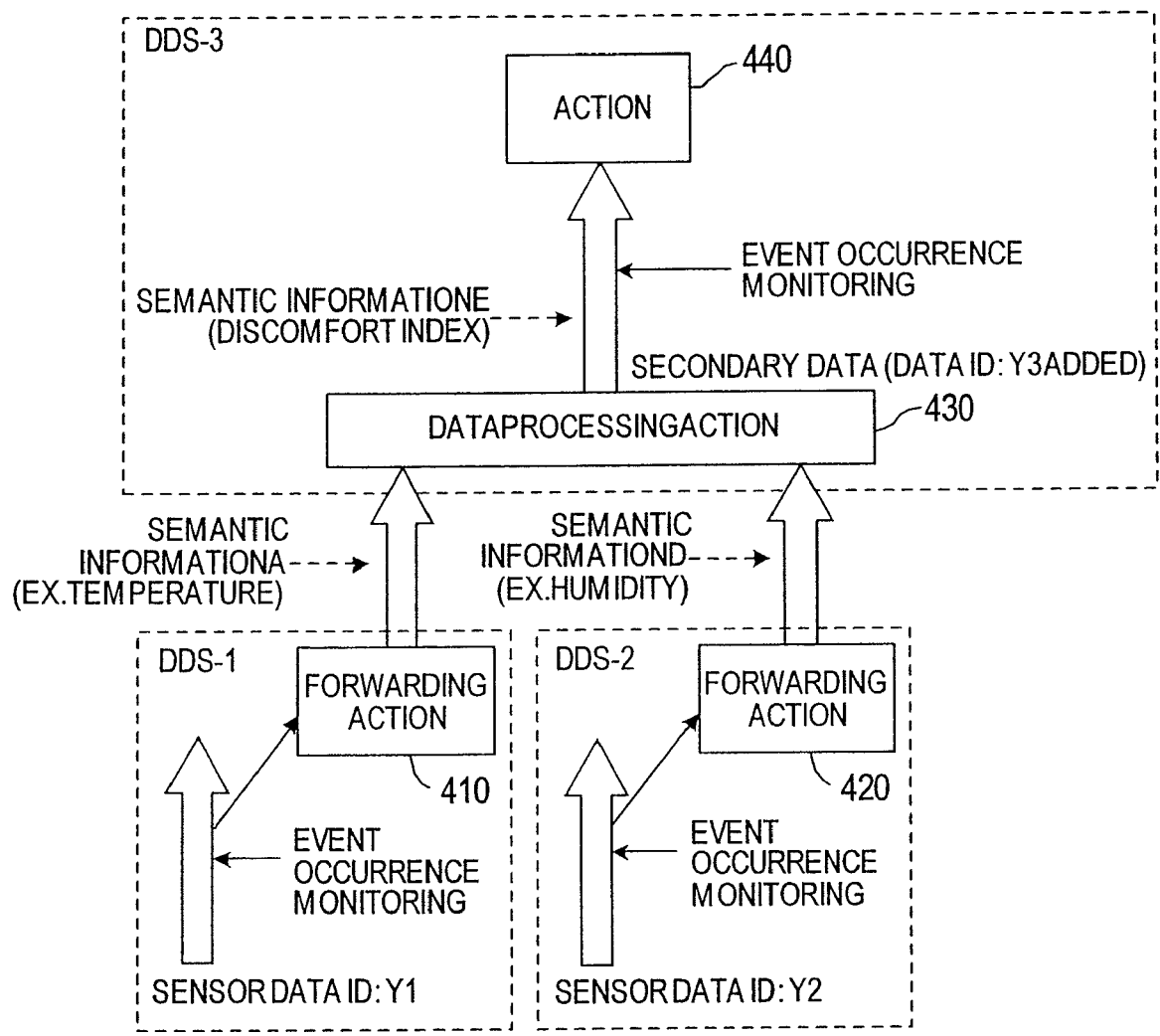
FIG. 53 shows a third embodiment and is an explanatory diagram illustrating the flow of generating secondary data from plural pieces of measured data by plural distributed data processing servers.

In FIG. 53, the distributed data processing server DDS-1, to execute forwarding action 410, monitors measured data (ID=Y1) from a sensor node that measures temperatures, and on receiving measured data Y1, forward it to the distributed data processing server DDS-3. The distributed data processing server DDS-2, to execute forwarding action 420, monitors measured data (ID=Y2) from a sensor node that measures humidity, and on receiving measured data Y2, forwards it to the distributed data processing server DDS-3.

The distributed data processing server DDS-3, like the entries of data ID=Y1 to Y3 in FIG. 52, holds measured data Y1 if receiving Y1, obtain the sum of the measured data Y1 and Y2 when receiving Y2 as discomfort index, and can execute other event and action 440 using secondary data of data ID=Y3.

In this way, by acquiring plural pieces of data from other distributed data processing servers DDS and generating secondary data, the distributed data processing servers DDS that perform data processing, forwarding, and notification processing can be flexibly set or reconfigured, resulting in efficient resource utilization in the sensor network.

Fourth Embodiment

Figure 54:
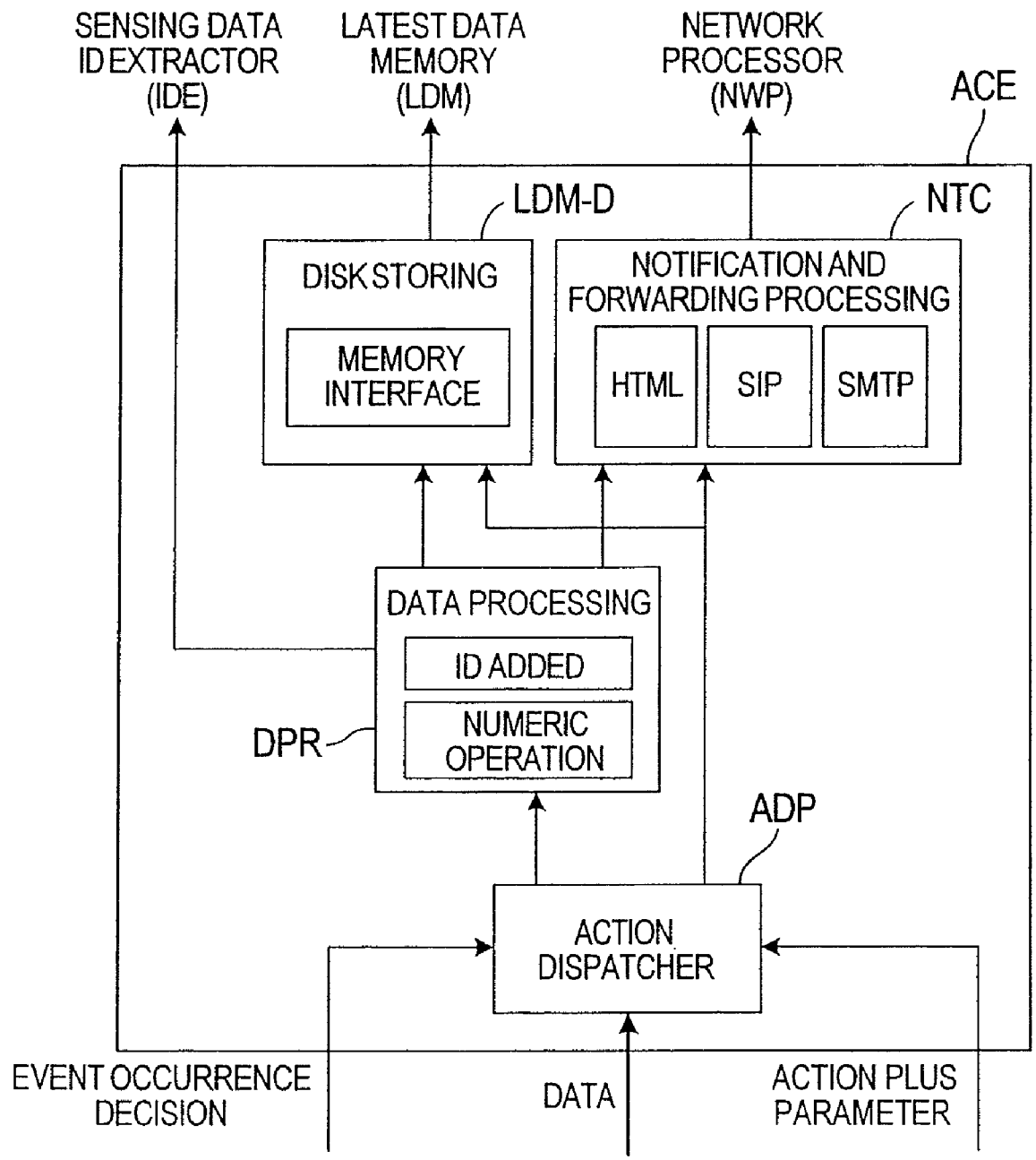
FIG. 54 shows a fourth embodiment and is a block diagram of an action executer ACE of an event-action controller.
Figure 55:
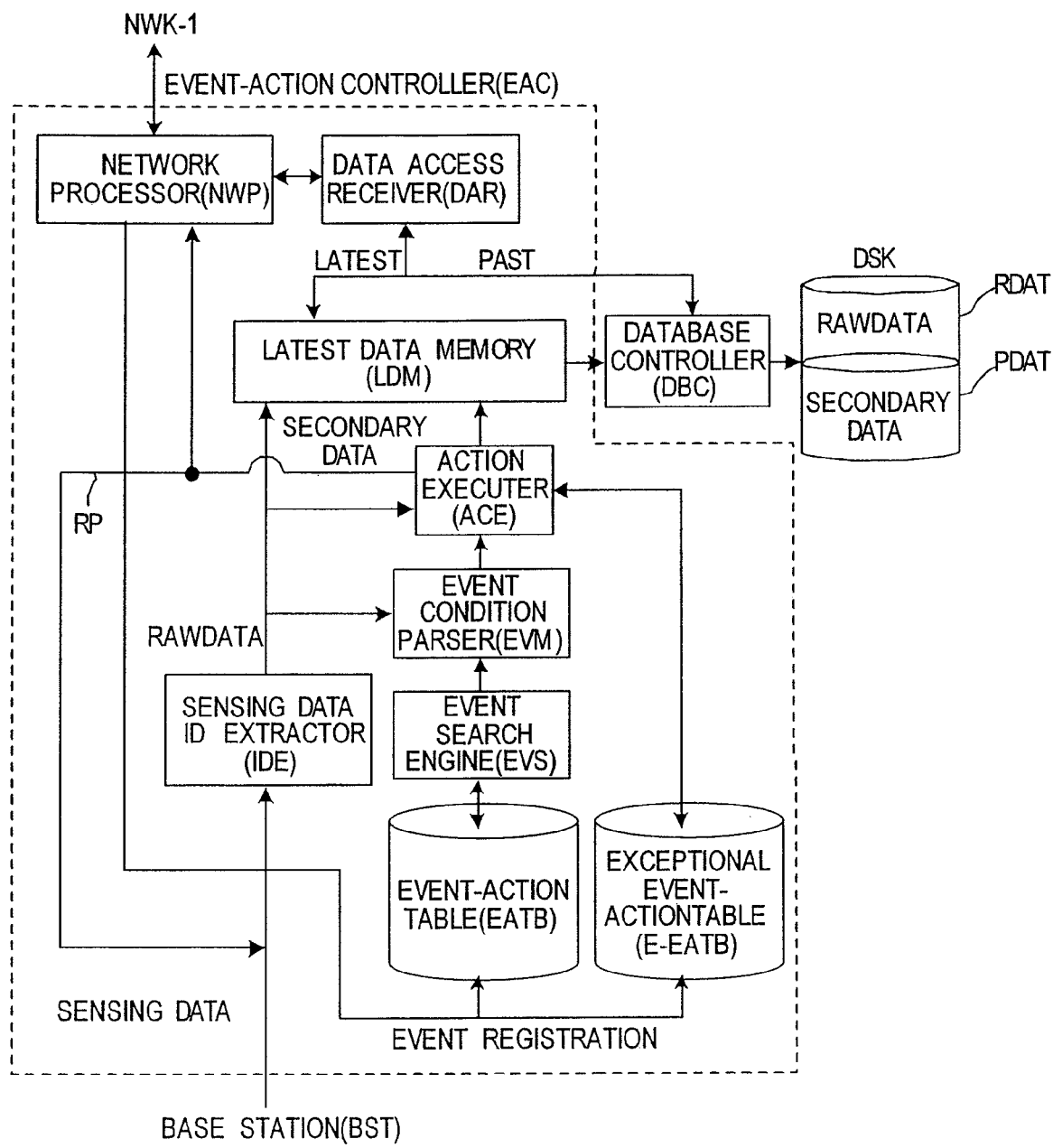
FIG. 55 shows a fifth embodiment and is a block diagram showing an event-action controller of a distributed data processing server DDS.

FIG. 54 shows a fourth embodiment. The fourth embodiment is the same as the third embodiment, except that the construction of the action executer ACE constituting the event-action controller EAC in the distributed data processing server DDS is modified.

Output of the secondary data processor DPR that processes measured data or secondary data is inputted to the data ID extractor IDE like the third embodiment, and also inputted to the notification and forwarding processor NTC and the disk storing processor LDM-D. Commands and data from the action dispatcher ADP are inputted to the secondary data processor DPR, the notification and forwarding processor NTC, and the disk storing processor LDM-D.

Since the notification and forwarding processor NTC and the disk storing processor LDM-D are provided in subsequent stages of the secondary data processor DPR, one occurrence of event enables plural actions to be executed. For example, in the event-action table EATB, like FIG. 50, three actions of data processing, data forwarding, and notification processing as well as parameters corresponding to the actions are defined. When an event occurs by receiving proper measured data, the action dispatcher ADP commands the secondary data processor DPR to take action of data processing, commands the notification and forwarding processor NTC to take action of secondary data forwarding, and commands the disk storing processor LDM-D to store secondary data.

The secondary data processor DPR processes data, and outputted secondary data is inputted to the notification and forwarding processor NTC, the disk storing processor LDM-D, and the data ID extractor IDE. The notification and forwarding processor NTC transfers secondary data to a specified address, and the disk storing processor LDM-D writes the secondary data into the disk DSK.

By thus connecting in series processors of the action executer ACE, one occurrence of event enables plural actions to be executed so that actions can be executed at high speed. By providing other processors in subsequent stages of the secondary data processor DPR, actions such as forwarding and storing for secondary data, which is generated after data processing action, can be executed at one occurrence of event.

Fifth Embodiment

FIGS. 55 to 58 show a fifth embodiment. The fifth embodiment is the same as the third embodiment, except that the event-action controller EAC of the distributed data processing server DDS is provided with an exceptional event-action table E-EATB that sets exceptional actions so that the action executer ACE refers to the exceptional event-action table E-EATB.

The event-action table EATB is provided with an exception handling field as shown in FIG. 56. The exception handling field includes fields of processing content and parameter. Processing content enables the execution of program processing such as script processing that can execute complicated processing that cannot be performed by simple processing such as the above-mentioned data processing, forwarding, and notification processing. In the option field, a file name for which processing is described is set.

A file name set in the option field should be stored previously in the event-action table EATB and the exceptional event-action table E-EATB. An example of exception handling described in XML script is shown in FIG. 57.

FIG. 57 shows an XML script file having a file name of C. Data of data ID=Z1 indicating temperature is acquired from a sensor node, and if the value of the data is not in the range of 10 to 20 degrees, a message "It is too hot. The air-conditioner is on" is transmitted to a specified transmission destination (IP address=133.144.xx.xx), and further an "activate" command to turn on the cooler is transmitted to equipment designated as "cooler.com."

Figure 58:
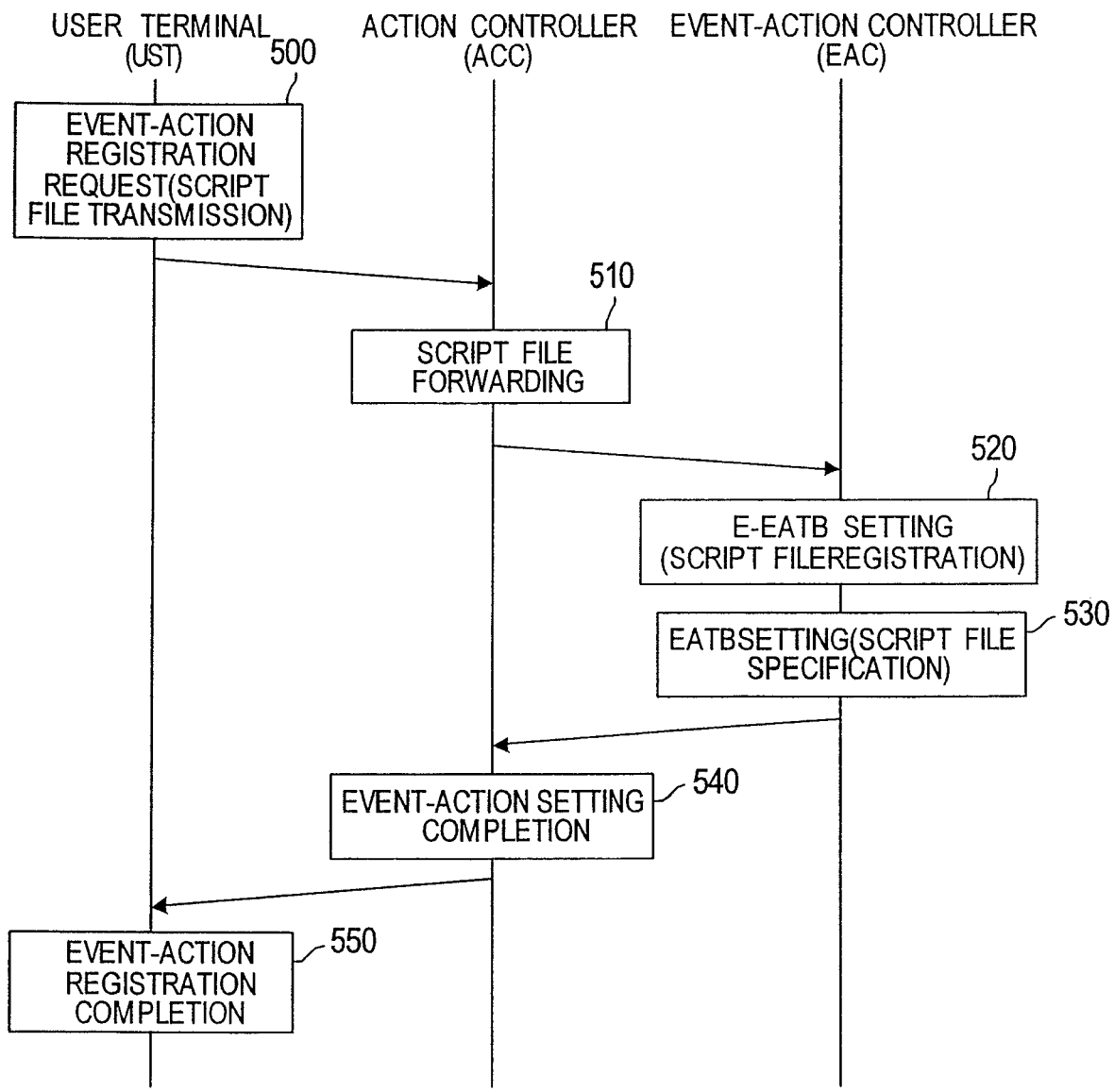
FIG. 58 shows a fifth embodiment and is a time chart showing the flow of setting of exception event action.

FIG. 58 shows a flow of processing describing the above-mentioned exception handling. A request to register an event action is issued to the directory server DRS from a user terminal UST, and at the same time a script file prepared in advance is sent there (500).

In the directory server DRS, the action controller ACC receives the request to register an event-action, and acquires a script file. The action controller ACC analyzes requested semantic information referring the real-world model table MTB, as shown in FIG. 33 of the first embodiment, and sends the request to register an event-action and the script file to a corresponding distributed data processing server DDS (510).

In the distributed data processing server DDS, the event-action controller EAC registers the received script file in the exceptional event-action table E-EATB (520), and sets the requested event-action and a script file name registered in the parameter field of the exception handling field in the event-action table EATB (530). It notifies the directory server DRS of registration completion (540).

The directory server DRS notifies the user terminal UST of the registration completion of the event-action based on the notification from the distributed data processing server DDS (550).

According to the event-action table EATB set as described above, the following processing is executed in the distributed data processing server DDS.

The event-action controller EAC monitors the data of data ID=Z1 from the sensor node. On receiving the data of Z1, to execute the script processing of the exception handling field, it reads the XML script file of the file name C set in the option field from the exceptional event-action table E-EATB, and executes it in the action executer ACE.

In the case of the script shown in FIG. 57, the action executer determines whether the data of data ID=Z1 indicating temperatures is in the range of 10 to 20 degrees, that is, an event occurs. When it is determined that an event occurs, according to the script, the action of forwarding the message "It is too hot. The air-conditioner is on" and the action of activating the air-conditioner are executed.

As described above, complex processing can be performed by using program processing such as script. Therefore, complex and flexible processing can be flexibly attained using measured data from sensor nodes.

The above-mentioned program processing is not limited to scripts; it may be an executable file, etc.

An example of providing the exceptional event-action table E-EATB in a distributed data processing server DDS has been shown above. However, the exceptional event-action table E-EATB may be provided in the action controller ACC of the directory server DRS. In this case, in the action controller ACC of the directory server DRS, it becomes possible to execute complex processing involving plural distributed data processing servers DDS.

<First Variant>

Figure 59:
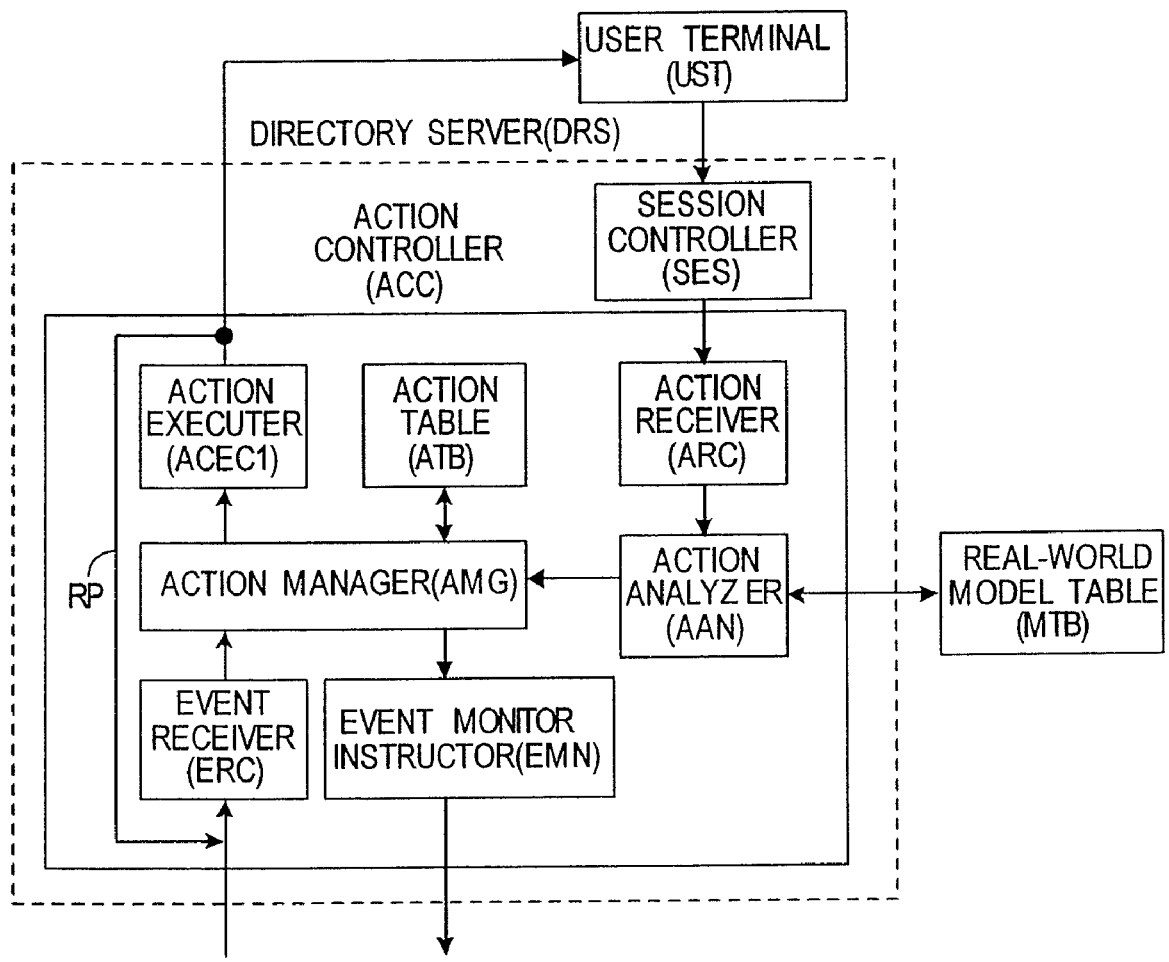
FIG. 59 shows a first variant and is a block diagram showing an action controller ACC of a directory server DRS.
Figure 60:
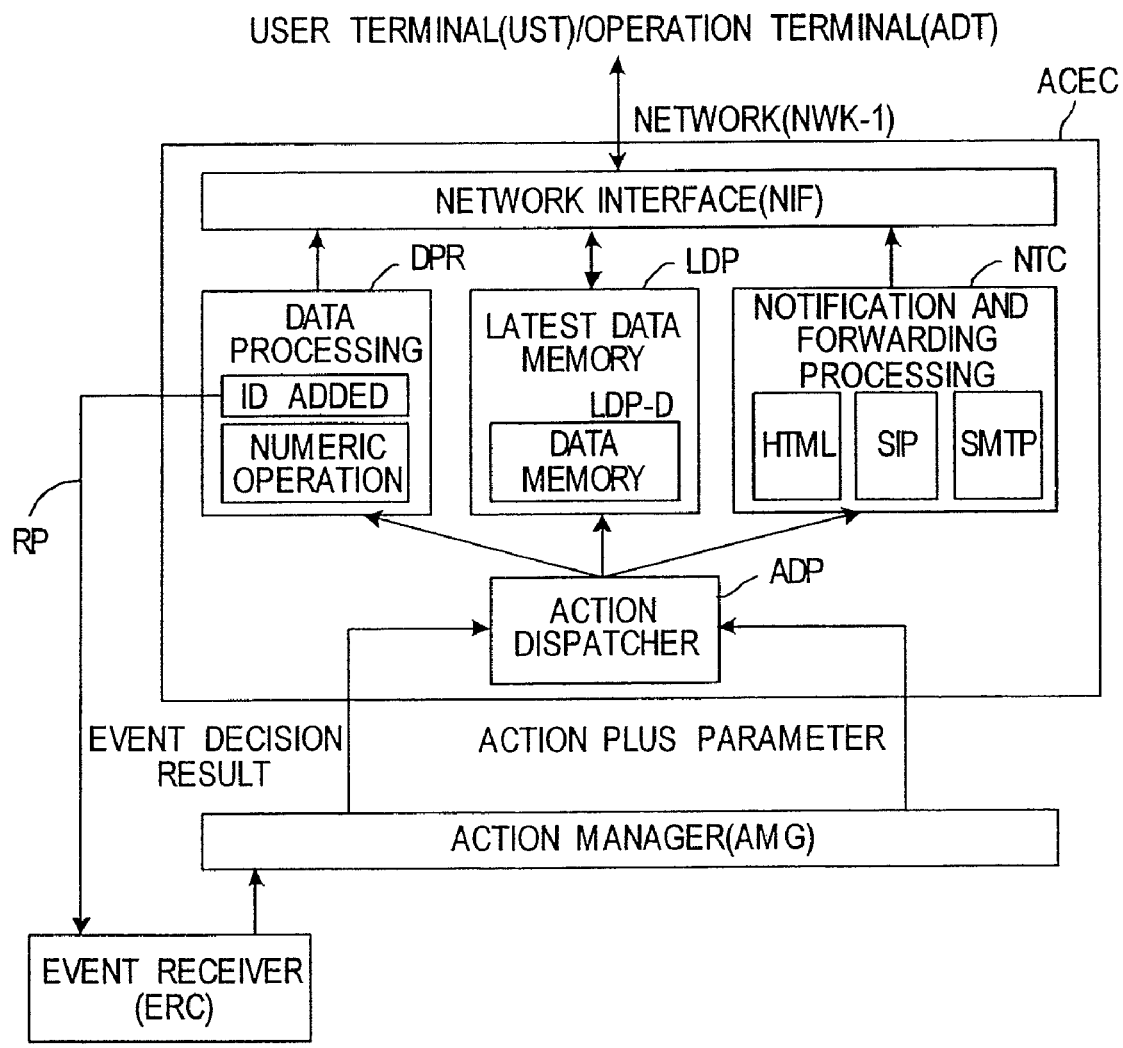
FIG. 60 shows the first variant and is a block diagram showing an action executer ACEC constituting an action controller ACC.

FIGS. 59 and 60 show a first variant. In the action controller ACC of the directory server DRS shown in the first embodiment, as shown in the third or fourth embodiment, actions based on acquired data (or event) are performed in a chain. Other constructions are the same as those of the first embodiment.

Output of the action executer ACEC is transmitted to not only the user terminal UST but also the event receiver ERC. Specifically, the action executer ACEC is constructed as shown in FIG. 60, and is different from that of FIG. 27 of the first embodiment in that output of the secondary data processor DPR is connected to the event receiver ERC by a loopback path RP. Other constructions are the same as those of FIG. 27.

A virtual data ID (or an event ID) is added to secondary data generated in the secondary data processor DPR, and is sent to the network interface NIF and the event receiver ERC.

On receiving the secondary data in the event receiver ERC, the action dispatcher ADP acquires action previously set from the action table ATB based on a virtual data ID and issues a command to a proper processor.

In this way, the action controller ACC of the directory server DRS can execute action for data generated based on executed action.

<Second Variant>

Figure 61:
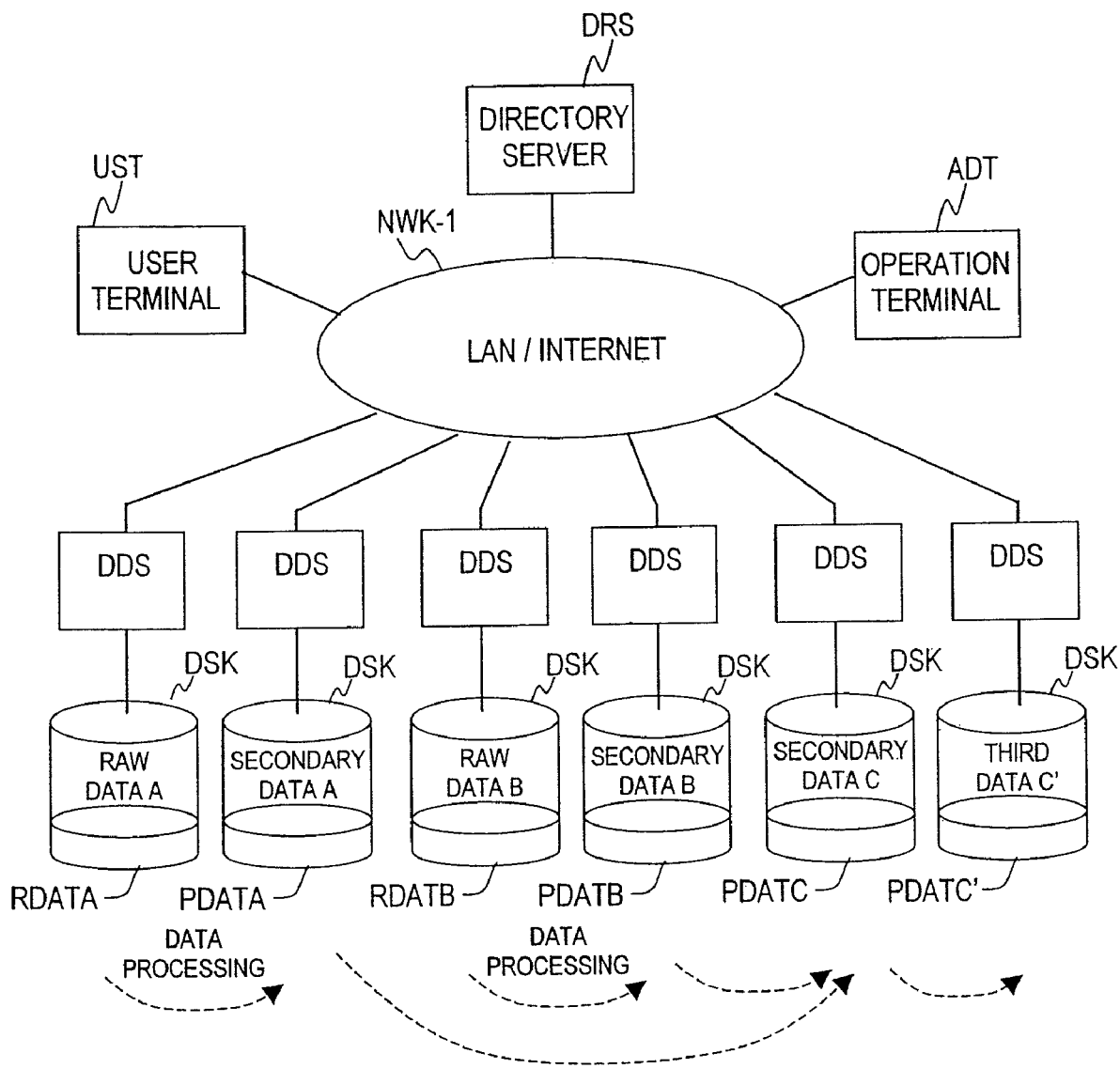
FIG. 61 is a block diagram showing the system of a sensor network representing a second variant.
Figure 62:
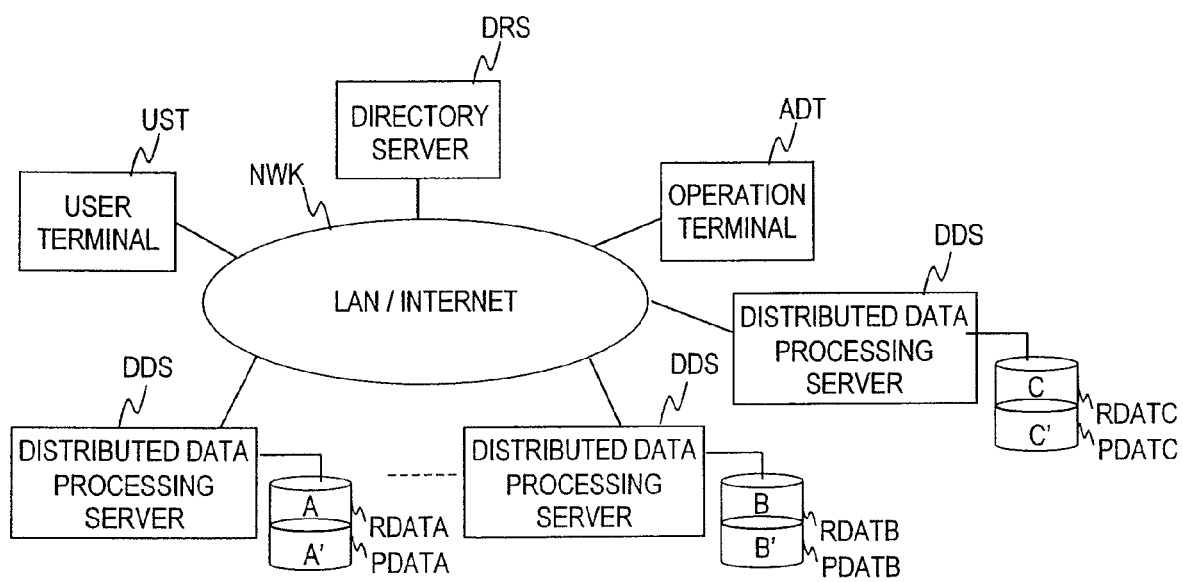
FIG. 62 is also a block diagram showing the system of a sensor network representing the second variant.

FIGS. 61 and 62 show a second variant that is a variant of the above-mentioned first or second embodiment. In this variant, measured data from a certain sensor node is stored in a specified distributed data processing server DDS as raw data A, and measured data from a different sensor node is stored in a specified distributed data processing server DDS as raw data B.

Distributed data processing servers DDS subject processing (e.g., average value of unit time) to raw data A (RDATA) and raw data B and store the processing results in distributed data processing servers DDS as data A' (PDATA) and data B' (PDATB), respectively. The timing of processing the raw data A and B may be performed as actions based on specified conditions (time elapse) in the directory server DRS or each distributed data processing server DDS. When the processing of raw data is performed in distributed data processing servers DDS, data storage destinations may be added to the event-action table EATB shown in FIG. 44.

Moreover, a distributed data processing server DDS calculates third data C (RDATC) from the processed secondary data A' (PDATA) and B' (PDATB) as a specified action, and stores new secondary data in a distributed data processing server DDS. The result of processing on the third data C is stored as tertiary data C' (PDATC).

For example, when raw data A is temperature and raw data B is humidity, secondary data A and B are the average temperature and average humidity of unit time, respectively. Moreover, discomfort index determined from average temperature and average humidity can be obtained as third data C, and the average value of third data C of unit time can be obtained as tertiary data C'.

Though measured data is used as the timing of event occurrence in the above-mentioned first or second embodiment, event generation and action execution can be performed from the secondary data A and B, third data C, and tertiary data C' as described above.

As shown in FIG. 62, if measured data (raw data) and secondary data are stored in one distributed data processing server DDS, the construction of the real-world model table MTB in the directory server DRS can be simplified. In this case, the third data C obtained from the secondary data A and B can be handled as raw data, and the tertiary data C' can be handled as secondary data.

When operations from raw data to secondary data are performed in the directory server DRS shown in the first embodiment, like the first variant, output of the action executer ACEC of the directory server DRS may be inputted to the event receiver ERC to add a virtual data ID to the secondary data.

<Third Variant>

Figure 63:
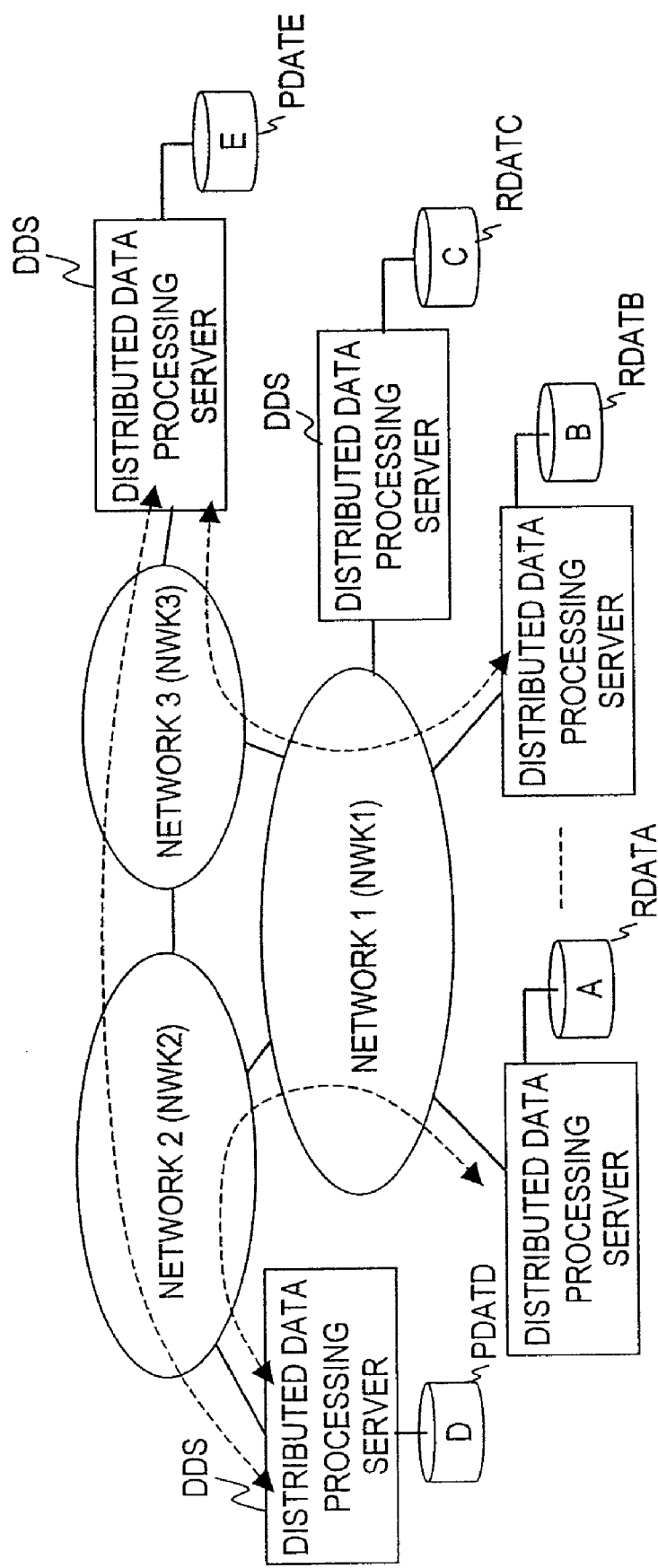
FIG. 63 is a block diagram showing the system of a sensor network representing a third variant.

FIG. 63 shows a third variant. In the second or third embodiment, plural sensor networks (NWK1 to NWK3) are connected and data is processed among distributed data processing servers DDS in different sensor networks.

In FIG. 63, distributed data processing servers DDS1-1 to DDS1-3 are connected to a network NWK1. Plural sensor nodes (not shown in the drawing) are connected to the distributed data processing servers DDS1-1 to DDS1-3, respectively.

A distributed data processing server DDS2-1 is connected to a network NWK2. A distributed data processing server DDS3-1 is connected to a network NWK3. Plural sensor nodes are connected to each distributed data processing server DDS.

The event-action table EATB of the distributed data processing server DDS1-1 in the network NWK1 is set so that measured data RDATA is stored in a disk when received, and forwarded to the distributed data processing server DDS2-1 in the network NWK2.

The event-action table EATB of the distributed data processing server DDS2-1 in the network NWK2 is set so that measured data RDATA, when received, is subjected to specified processing to generate secondary data PDATD, and the secondary data PDATD is stored in a disk and forwarded to the distributed data processing server DDS3-1 in the network NWK3.

The event-action table EATB of the distributed data processing server DDS1-2 in the network NWK1 is set so that measured data RDATB is stored in disk when received, and forwarded to the distributed data processing server DDS3-1 in the network NWK3.

The event-action table EATB of the distributed data processing server DDS3-1 in the network NWK3 is set so that secondary data PDATE is calculated from the secondary data PDATD from the distributed data processing server DDS2-1 and the measured data RDATB from the distributed data processing server DDS1-2, and stored in a disk.

By the settings described above, the measured data RDATA measured in a sensor node in the network NWK1 is forwarded to the distributed data processing server DDS2-1 in the network NWK2 and processed as secondary data PDATD, and then the secondary data PDATD is forwarded to the distributed data processing server DDS3-1 in the network NWK3.

The measured data RDATB measured in a sensor node in the network NWK1 is forwarded to the distributed data processing server DDS3-1 in the network NWK3.

The distributed data processing server DDS3-1 in the network NWK3 calculates secondary data PDATE from the measured data RDATB from the network NWK1 and the secondary data PDATD from the network NWK2, and stores it in a disk.

By thus defining the transmission and reception of data to and from external networks NWK and data processing in the event-action table EATB, data can be processed one after another while forwarding data among different sensor networks.

This construction, by extracting only necessary ones from among measured data of an enormous number of sensor nodes in each sensor network and performing necessary processing in each sensor network, enables efficient transmission and reception of data by coupling plural sensor networks.

<Fourth Variant>

In the first or second embodiment described above, the data link pointer corresponding to the model name was set as the information link pointer in the real-world model list MDL of the directory server DRS. However, the latest value of data may be stored in addition to the information link pointer.

In this case, the data traffic between the directory server DRS and the distributed data processing server DDS increases as the number of objects increases. In view of the fact that, however, the data acquired from each sensor is collected in a fixed frequency by the distributed data processing server DDS, an excessive increase of the load for the network NWK-1 is prevented, and it will be possible to respond quickly to the request for data from the user terminal UST, resulting in further improvement in response.

As described above, according to this invention, the directory server manages collectively the location of data, plural distributed data processing servers for collecting the data from the sensor nodes in real time are provided and are distributed on the network, information of desired sensor nodes can be monitored real time by events and actions, it has become possible to use efficiently data received from a huge number of sensor nodes. Thus, this invention can be applied to a sensor network having a large number of sensor nodes.

While the present invention has been described in detail and pictorially in the accompanying drawings, the present invention is not limited to such detail but covers various obvious modifications and equivalent arrangements, which fall within the purview of the appended claims.

What is claimed is:

1. A sensor network system, comprising:
a model list that stores preset model names;
an event table that stores monitoring conditions of data transmitted from sensor nodes;
an event generator that receives data corresponding to the model names from the sensor nodes, and notifies an occurrence of an event when receiving data satisfying the monitoring conditions from the sensor nodes; and
an event-action controller including an action executer that executes processing previously specified when the occurrence of an event is indicated from the event generator.

2. The sensor network system according to claim 1, wherein the action executer executes the processing previously specified when a first occurrence of an event is indicated from the event generator and the second occurrence of an event is indicated from the event generator.

3. The sensor network system according to claim 1, comprising:
a semantic interpretation list that stores semantic information corresponding to the data;
an action receiver that receives a model name from a user terminal;
an action analyzer that selects data to be monitored based on the received model name, selects semantic information corresponding to the data to be monitored, and decides a monitoring condition based on the selected semantic information, and the decided monitoring condition is stored in the event table.

4. The sensor network system according to claim 1, comprising:
an ID extractor that extracts identifiers from data received from the sensor nodes;
an event search engine that searches the event table for the monitoring condition based on the extracted identifiers, and
the event generator compares the searched monitoring condition with the data to determine whether the monitoring condition is satisfied, and when the monitoring condition is satisfied, generates an event.

5. The sensor network system according to claim 4, wherein the action executer, when processing stored in the event table is processing that processes data transmitted from the sensor nodes, processes the data, adds an identifier to the processed data, and inputs the processed data to the ID extractor.

6. The sensor network system according to claim 4, comprising:
an exceptional event-action table that stores files describing processing to be executed, and
the event table stores file names of the files describing the processing to be executed corresponding to the identifiers,
the action executer executes processing of files stored in the exceptional event-action table based on file names stored in the event table based on the identifiers.

7. The sensor network system according to claim 6, wherein when executing a file stored in the exceptional event-action table, the action executer compares the monitoring condition with the data in place of the event generator to determine whether the condition is satisfied, and decides processing to be executed when the condition is satisfied.

8. The sensor network system according to claim 7, wherein the processing described in the files is script processing.

9. A sensor network system, comprising:
a model list that stores preset model names;
a first event-action table that stores monitoring conditions of data transmitted from sensor nodes and stores file name of file describing processing to be executed;
a second event-action table that stores the file describing the processing to be executed;
an event-action controller including an action executer that executes processing of file stored in the second event-action table, based on file name stored in the first event-action table when receiving data satisfying the monitoring conditions from the sensor nodes.

10. The sensor network system according to claim 9,
wherein when executing a file stored in the second event-action table, the action executer compares the monitoring condition with the data to determine whether the condition is satisfied, and decides processing to be executed when the condition is satisfied.

11. The sensor network system according to claim 9,
wherein the processing described in the file is script processing.

12. The sensor network system according to claim 9, comprising:
a semantic interpretation list that stores semantic information corresponding to the data;
an action controller that receives a model name and the file from a user terminal, selects data to be monitored based on the received model name, selects semantic information corresponding to the data to be monitored, and decides monitoring condition based on the selected semantic information, and
the decided monitoring condition and the file name are stored in the first event-action table, and
the file is stored in the second event-action table.

13. The sensor network system according to claim 9, comprising:
an ID extractor that extracts identifiers from data received from the sensor nodes;
an event search engine that searches the event table for the monitoring condition based on the extracted identifiers, and
the action executer compares the searched monitoring condition with the data to determine whether the monitoring condition is satisfied.

14. A sensor network system, comprising:
a model list that stores preset model names;
an event table that stores monitoring conditions that indicates predetermined data arrival from sensor nodes;
an event generator that receives data corresponding to the model names from the sensor nodes, and notifies an occurrence of an event when receiving data satisfying the monitoring conditions from the sensor nodes; and
an event-action controller including an action executer that executes processing previously specified when the occurrence of an event is indicated from the event generator;
wherein the event generator notifies the occurrence of the event, when the first and second predetermined data are arrived, the action executer generates secondary data based on the first and second predetermined data.

15. The sensor network system according to claim 14,
wherein the action executer holds the first predetermined data when the first predetermined data are arrived, and adds the first predetermined data and the second predetermined data when the second predetermined data are arrived.

16. The sensor network system according to claim 15,
wherein the first predetermined data holding denotes updating the value of the latest data.

17. The sensor network system according to claim 14, comprising:
a semantic interpretation list that stores semantic information corresponding to the data;
an action receiver that receives a model name from a user terminal;
an action analyzer that selects data to be monitored based on the received model name, selects semantic information corresponding to the data to be monitored, and decides a monitoring condition based on the selected semantic information, and
the decided monitoring condition is stored in the event table.

18. The sensor network system according to claim 14, comprising:
an ID extractor that extracts identifiers from data received from the sensor nodes;
an event search engine that searches the event table for the monitoring condition based on the extracted identifiers, and
the event generator compares the searched monitoring condition with the data to determine whether the monitoring condition is satisfied, and when the monitoring condition is satisfied, generates an event.

19. The sensor network system according to claim 18,
wherein the action executor adds an identifier to the secondary data, and inputs the secondary data to the ID extractor.

* * * * *